United States Patent
Kanaya et al.

(10) Patent No.: US 6,493,675 B1
(45) Date of Patent: *Dec. 10, 2002

(54) APPARATUS AND SYSTEM FOR MANAGING WORK FLOW, AND COMPUTER-READABLE STORAGE MEDIUM FOR STORING WORK FLOW MANAGEMENT PROGRAM

(75) Inventors: Nobuyuki Kanaya, Kanagawa (JP); Hirotaka Hara, Kanagawa (JP); Hiroyuki Akamatsu, Kanagawa (JP); Tsuyoshi Ebata, Kanagawa (JP); Junji Ikeda, Kanagawa (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 204 days.

(21) Appl. No.: 09/191,128

(22) Filed: Nov. 13, 1998

(30) Foreign Application Priority Data

Nov. 19, 1997 (JP) .............................. 9-317922
Jul. 9, 1998 (JP) ........................... 10-193881

(51) Int. Cl.⁷ .............................................. G06F 17/00
(52) U.S. Cl. ...................................................... 705/7
(58) Field of Search ...................... 705/7, 8, 9, 10, 705/11, 12; 700/99, 100, 102

(56) References Cited

U.S. PATENT DOCUMENTS

| | | | | |
|---|---|---|---|---|
| 5,357,632 A | * | 10/1994 | Pian et al. | 395/650 |
| 5,535,322 A | * | 7/1996 | Hecht | 705/1 |
| 5,734,837 A | * | 3/1998 | Flores et al. | 705/7 |
| 5,771,291 A | * | 6/1998 | Newton et al. | 380/25 |
| 5,799,297 A | * | 8/1998 | Goodridge et al. | 707/1 |
| 5,826,239 A | * | 10/1998 | Du et al. | 705/8 |
| 5,832,455 A | * | 11/1998 | Hayashi et al. | 705/7 |
| 5,870,545 A | * | 2/1999 | Davis et al. | 709/201 |
| 5,884,322 A | * | 3/1999 | Sidhu et al. | 707/200 |
| 5,893,128 A | * | 4/1999 | Nauckhoff | 707/511 |
| 5,937,388 A | * | 8/1999 | Davis et al. | 705/8 |
| 5,940,829 A | * | 8/1999 | Tsuiki et al. | 707/10 |

(List continued on next page.)

FOREIGN PATENT DOCUMENTS

EP 0774725 A2 * 5/1997
JP 02001282970 A * 10/2001

OTHER PUBLICATIONS

Cole, B. "Recognition's workflow system runs across distribution servers", Network World. v. 12, issue 32, p. 29+, Aug. 1995.*

(List continued on next page.)

Primary Examiner—James P. Trammell
Assistant Examiner—Pierre E. Elisca
(74) Attorney, Agent, or Firm—Staas & Halsey LLP

(57) ABSTRACT

A system for managing a work flow functions efficiently at a high speed. To attain this, the system includes a plurality of work flow support units, and a work flow support unit management unit. The work flow support unit management unit determines which work flow support unit is to manage a work flow. At this time, the work flow support unit management unit refers to the load condition of each work flow support unit to instruct the work flow support unit indicating the smallest load state to manage work flows, thereby preventing the process load from concentrating on a specific work flow support unit.

16 Claims, 63 Drawing Sheets

U.S. PATENT DOCUMENTS

| | | | | |
|---|---|---|---|---|
| 5,946,464 A | * | 8/1999 | Kito et al. | 395/200.32 |
| 5,951,300 A | * | 9/1999 | Brown | 434/236 |
| 5,960,404 A | * | 9/1999 | Chaar et al. | 705/8 |
| 5,960,420 A | * | 9/1999 | Leymann et al. | 707/1 |
| 5,974,392 A | * | 10/1999 | Endo | 705/8 |

OTHER PUBLICATIONS

Zhao et al., "Data management issues for large scale, distributed workflow systems on the internet", Database for Advances in Information Systems, v. 29, issue 4, pp. 22–32, 1998.*

Anderson, M., "Workflow engine interoperabiity: What's in it for users?", Document World, v. 2, issue 3, pp. 51–53, 1997.*

Kingsbury, N., "Maximising your investment in workflow", Document World, v. 2, issue 6, p. 7+, 1997.*

Fuji Xerox Co Ltd Derwent–ACC–No:200–651487.*

* cited by examiner

| WORK ID | STATE | WORK FLOW LIST | | | | | |
|---|---|---|---|---|---|---|---|
| | | WORK FLOW ID | WORK FLOW NAME | PERSON-IN-CHARGE ID | NEXT WORK ACTIVITY | ID OF ENGINE IN CHARGE |
| 0 | COMPLETION OF WORK | WORK FLOW 0 | ORDER | PERSON IN CHARGE 0 | WORK FLOW 0 | 0 |
| | | WORK FLOW 1 | PRODUCTION REQUEST | PERSON IN CHARGE 1 | WORK FLOW 1 | 0 |
| | | WORK FLOW 2 | PRODUCTION | PERSON IN CHARGE 2 | COMPLETION | 5 |
| 1 | WORK FLOW 0 | WORK FLOW 0 | ORDER | PERSON IN CHARGE 0 | WORK FLOW 0 | 0 |
| | | WORK FLOW 1 | PRODUCTION REQUEST | PERSON IN CHARGE 1 | WORK FLOW 1 | 0 |
| | | WORK FLOW 2 | PRODUCTION | PERSON IN CHARGE 2 | COMPLETION | 5 |
| 2 | WORK FLOW 1 | WORK FLOW 0 | ORDER | PERSON IN CHARGE 0 | WORK FLOW 0 | 0 |
| | | WORK FLOW 1 | PRODUCTION REQUEST | PERSON IN CHARGE 1 | WORK FLOW 1 | 0 |
| | | WORK FLOW 2 | PRODUCTION | PERSON IN CHARGE 2 | COMPLETION | 5 |

F I G. 6

| WORK FLOW ENGINE ID | LOAD | STATE (FLAG) | WORK ID CORRESPONDENCE LIST |
|---|---|---|---|
| 0 | 3 | NORMAL | WORK 0 / WORK 3 / WORK 6 |
| 1 | 3 | NORMAL | WORK 1 / WORK 4 / WORK 7 |
| 2 | 2 | NORMAL | WORK 2 / WORK 5 |

WORK FLOW ENGINE MANAGEMENT TABLE

EXAMPLE OF WORK ITEM

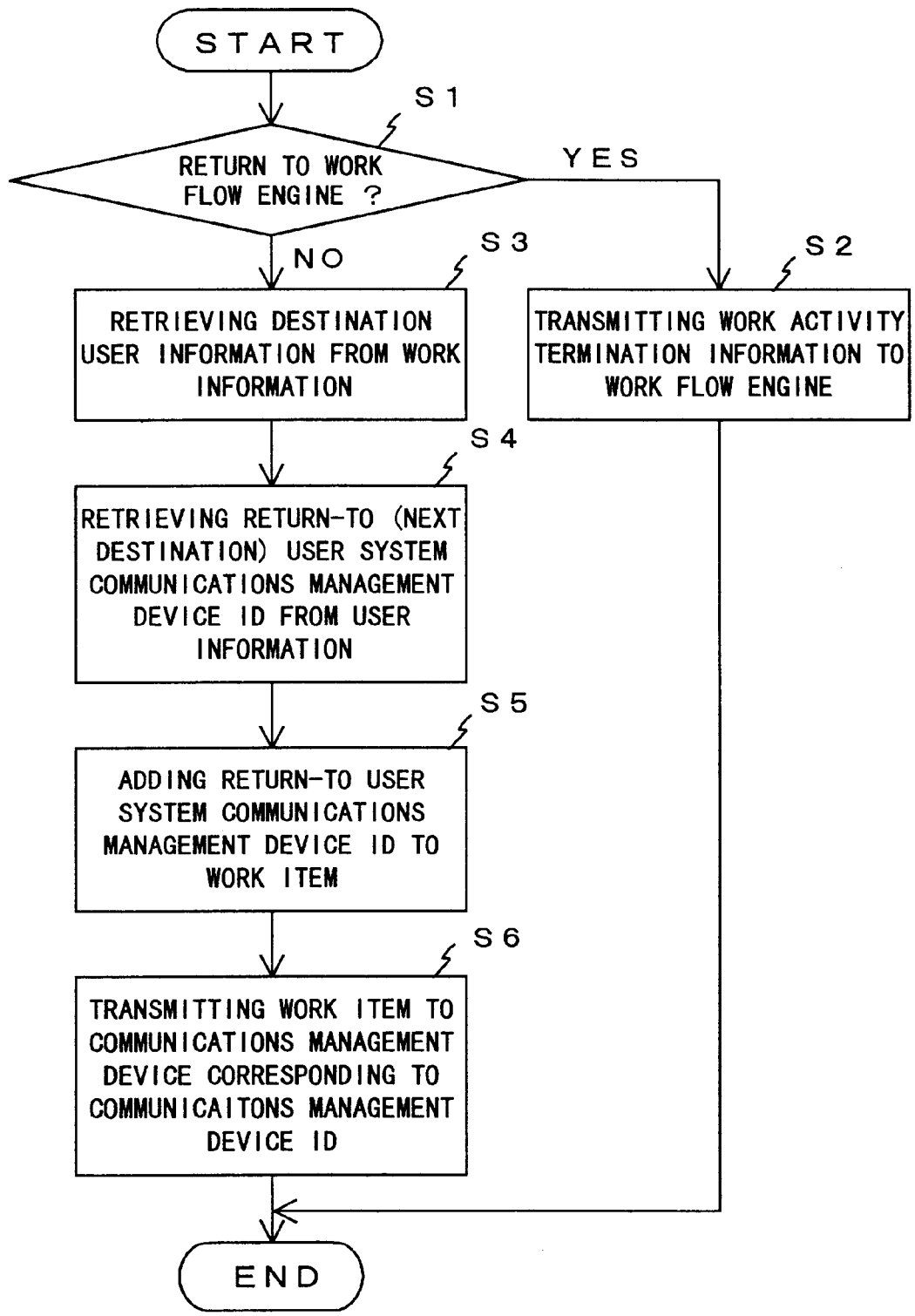
F I G. 10

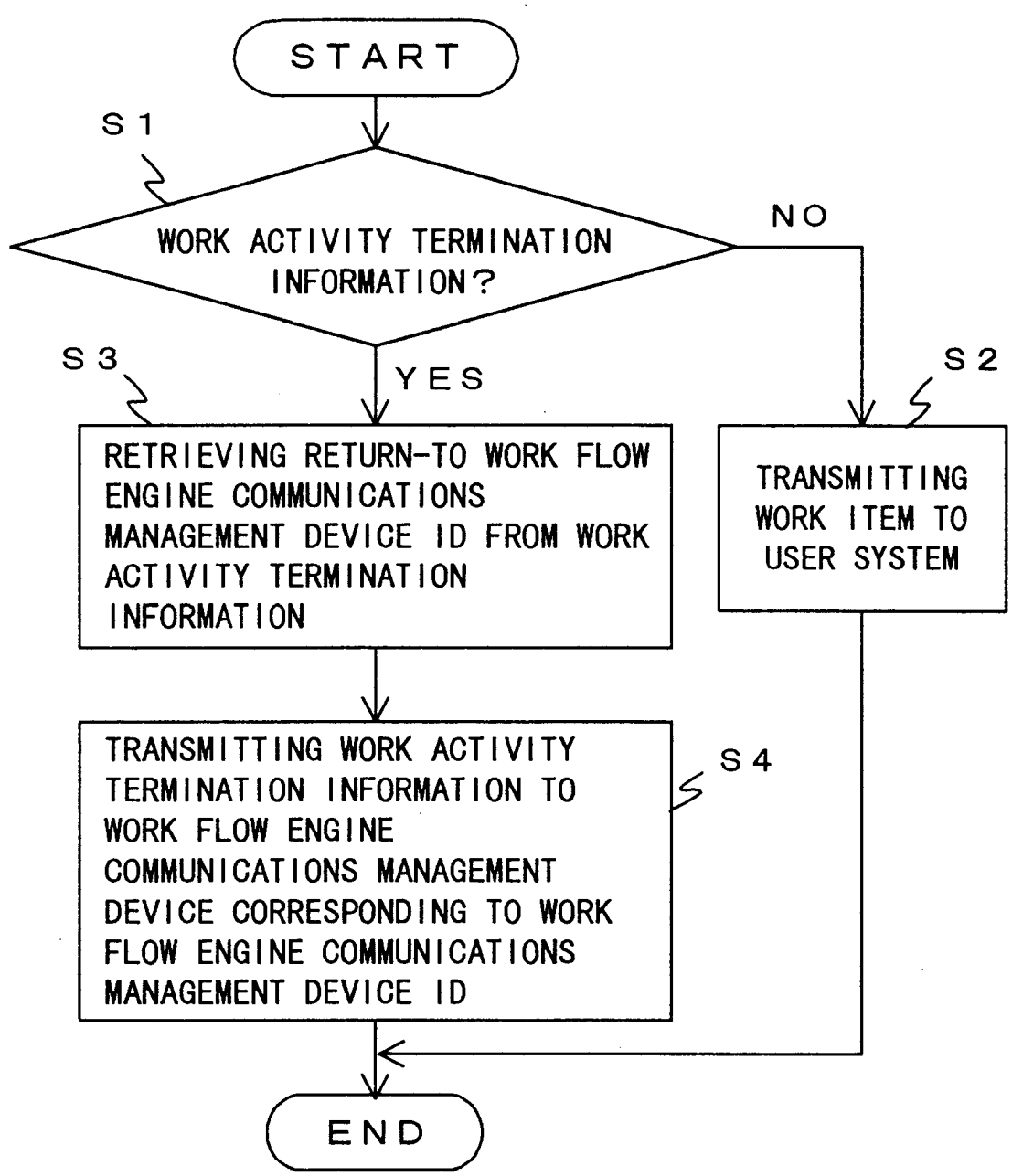
F I G. 1 1

| WORK TYPE ID | WORK FLOW LIST | | | |
|---|---|---|---|---|
| | WORK FLOW ID | WORK FLOW NAME | PERSON-IN-CHARGE ID | NEXT WORK ACTIVITY |
| a | WORK FLOW 0 | ORDER | PERSON-IN-CHARGE 0 | WORK FLOW 1 |
| | WORK FLOW 1 | PRODUCTION REQUEST | PERSON-IN-CHARGE 1 | WORK FLOW 2 |
| | WORK FLOW 2 | PRODUCTION | PERSON-IN-CHARGE 2 | COMPLETION |
| b | WORK FLOW 0 | ORDER | PERSON-IN-CHARGE 0 | WORK FLOW 1 |
| | WORK FLOW 1 | PRODUCTION REQUEST | PERSON-IN-CHARGE 1 | WORK FLOW 2 |
| | WORK FLOW 2 | PRODUCTION | PERSON-IN-CHARGE 2 | COMPLETION |
| c | WORK FLOW 0 | ORDER | PERSON-IN-CHARGE 0 | WORK FLOW 1 |
| | WORK FLOW 1 | PRODUCTION REQUEST | PERSON-IN-CHARGE 1 | WORK FLOW 2 |
| | WORK FLOW 2 | PRODUCTION | PERSON-IN-CHARGE 2 | COMPLETION |

FIG. 22

| WORK ID | WORK TYPE ID | STATE | WORK FLOW LIST ||||| 
| --- | --- | --- | --- | --- | --- | --- | --- |
| | | | WORK FLOW ID | WORK FLOW NAME | PERSON-IN-CHARGE ID | NEXT WORK ACTIVITY | ID OF ENGINE IN CHARGE |
| 0 | b | COMPLETION OF WORK | WORK FLOW 0 | ORDER | PERSON-IN-CHARGE 0 | WORK FLOW 1 | 0 |
| | | | WORK FLOW 1 | PRODUCTION REQUEST | PERSON-IN-CHARGE 1 | WORK FLOW 2 | 0 |
| | | | WORK FLOW 2 | PRODUCTION | PERSON-IN-CHARGE 2 | COMPLETION | 0 |
| 1 | a | WORK FLOW 0 | WORK FLOW 0 | ORDER | PERSON-IN-CHARGE 0 | WORK FLOW 1 | 0 |
| | | | WORK FLOW 1 | PRODUCTION REQUEST | PERSON-IN-CHARGE 1 | WORK FLOW 2 | 0 |
| | | | WORK FLOW 2 | PRODUCTION | PERSON-IN-CHARGE 2 | COMPLETION | 0 |
| 2 | c | WORK FLOW 1 | WORK FLOW 0 | ORDER | PERSON-IN-CHARGE 0 | WORK FLOW 1 | 0 |
| | | | WORK FLOW 1 | PRODUCTION REQUEST | PERSON-IN-CHARGE 1 | WORK FLOW 2 | 0 |
| | | | WORK FLOW 2 | PRODUCTION | PERSON-IN-CHARGE 2 | COMPLETION | 0 |

FIG. 23

| USER ID | USER NAME | PASSWORD | ID OF HOME SERVER IN CHARGE |
|---|---|---|---|
| 0 | 山田一郎 | aaa | 0 |
| 1 | 山田二郎 | bbb | 0 |
| 2 | 山田三郎 | ccc | 1 |
| 3 | 山田四郎 | ddd | 1 |
| 4 | 山田五郎 | eee | 1 |
| 5 | 山田六郎 | fff | 2 |
| 6 | 山田七郎 | ggg | 3 |
| 7 | 山田八郎 | hhh | 3 |

FIG. 24

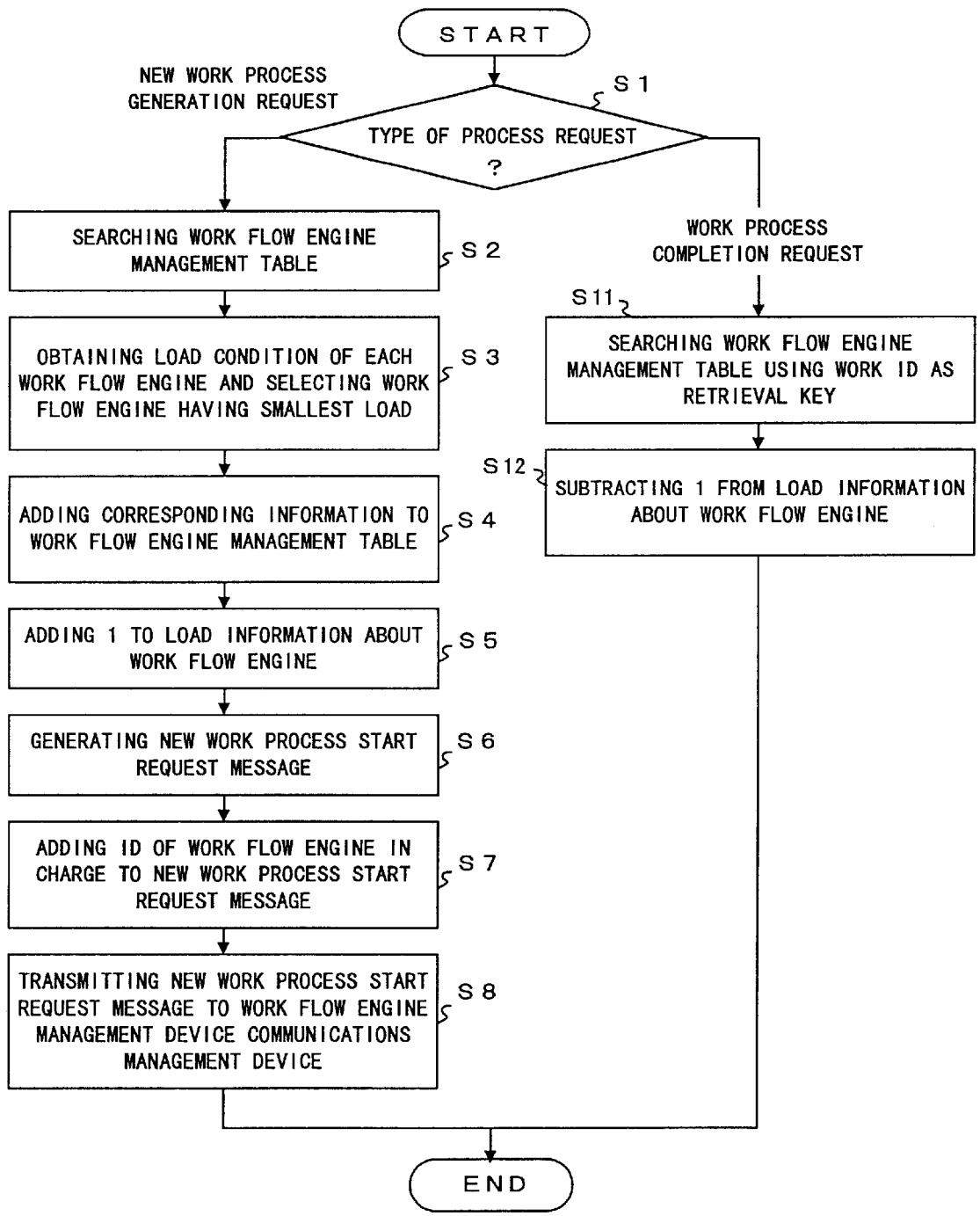
F I G. 2 5

| WORK ID | STATE | WORK FLOW NAME | PERSON-IN-CHARGE ID | NEXT WORK ACTIVITY | ID OF ENGINE IN CHARGE |
|---|---|---|---|---|---|
| 0 | WORK FLOW 0 | ORDER | PERSON-IN-CHARGE 0 | WORK FLOW 1 | 0 |
| 1 | WORK FLOW 0 | ORDER | PERSON-IN-CHARGE 0 | WORK FLOW 1 | 1 |
| 2 | WORK FLOW 1 | PRODUCTION REQUEST | PERSON-IN-CHARGE 1 | WORK FLOW 2 | 5 |
| 3 | WORK FLOW 0 | ORDER | PERSON-IN-CHARGE 2 | WORK FLOW 1 | 2 |
| 4 | WORK FLOW 1 | PRODUCTION REQUEST | PERSON-IN-CHARGE 0 | WORK FLOW 2 | 3 |
| 5 | WORK FLOW 2 | PRODUCTION | PERSON-IN-CHARGE 1 | COMPLETION OF WORK | 5 |
| 7 | WORK FLOW 2 | PRODUCTION | PERSON-IN-CHARGE 2 | COMPLETION OF WORK | 4 |
| 9 | WORK FLOW 2 | PRODUCTION | PERSON-IN-CHARGE 2 | COMPLETION OF WORK | 3 |
| 10 | WORK FLOW 1 | PRODUCTION REQUEST | PERSON-IN-CHARGE 2 | WORK FLOW 2 | 5 |

FIG. 30

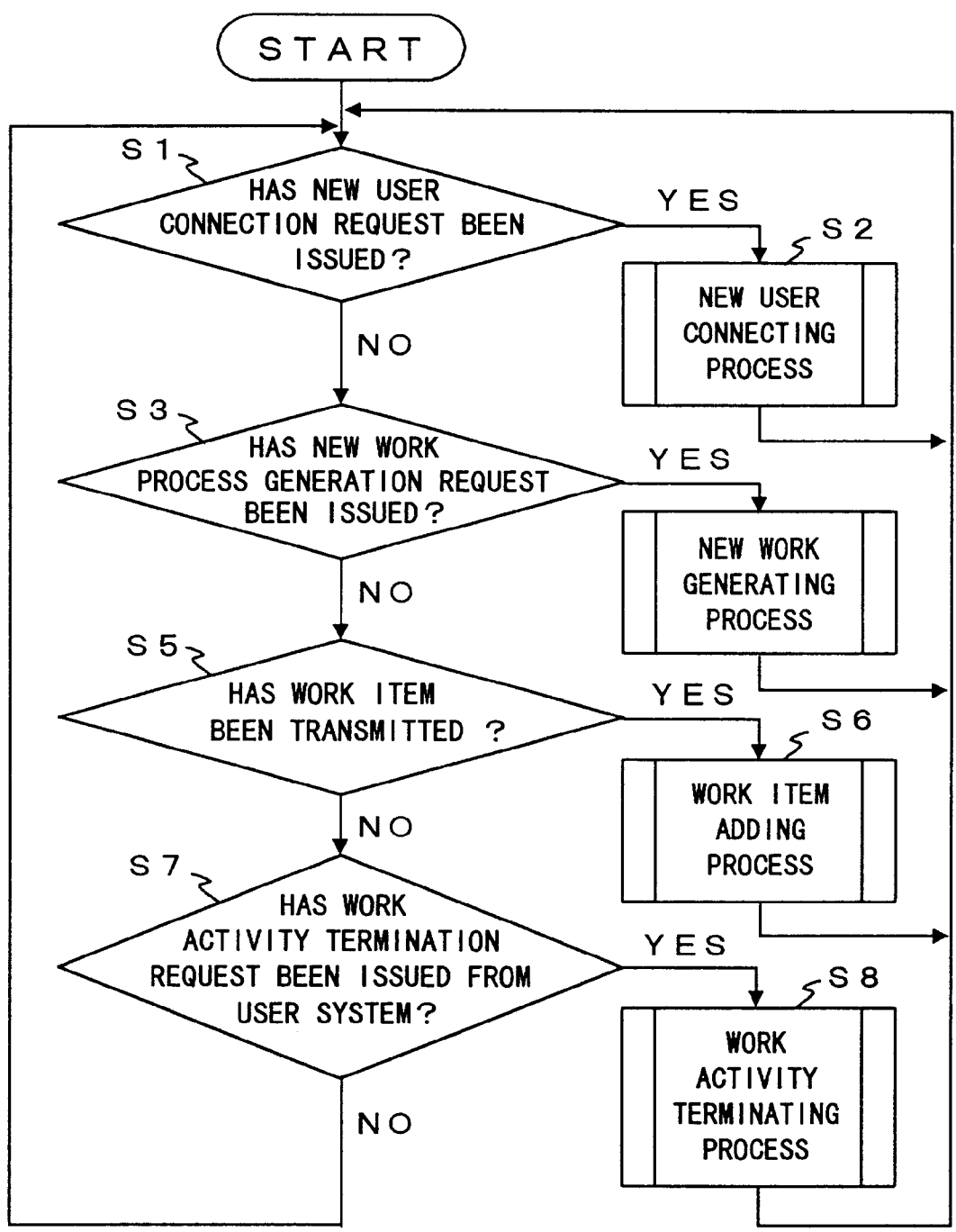
F I G. 3 1

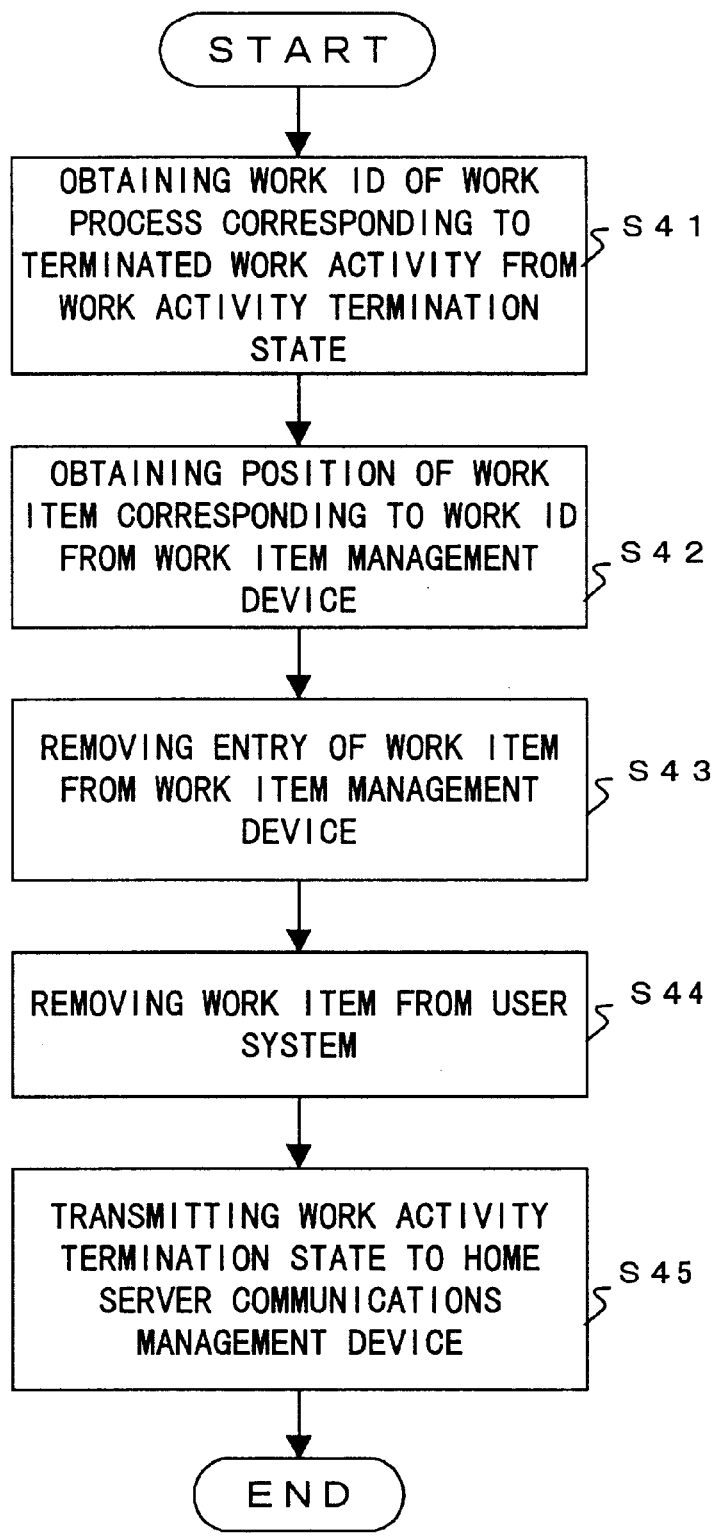
F I G. 35

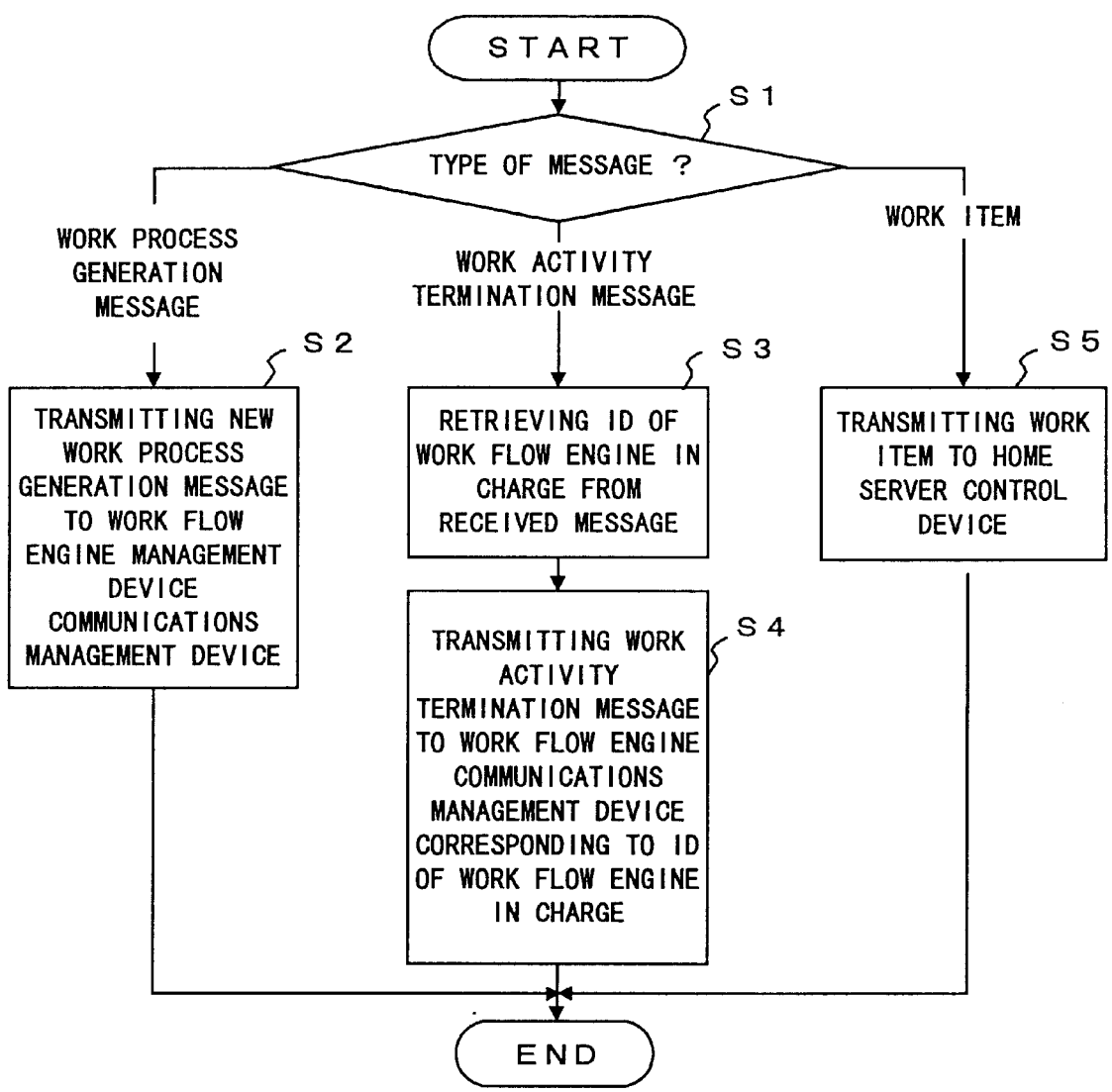
F I G. 36

F I G. 40

| WORK ID | STATE | WORK FLOW NAME | PERSON-IN-CHARGE ID | PROCESS STATE |
|---|---|---|---|---|
| 0 | WORK FLOW 0 | ORDER | PERSON IN CHARGE 0 | IN PROCESS |
| 1 | WORK FLOW 0 | ORDER | PERSON IN CHARGE 1 | IN SUSPENSION |
| 2 | WORK FLOW 1 | PRODUCTION REQUEST | PERSON IN CHARGE 2 | IN PROCESS |
| 3 | WORK FLOW 0 | ORDER | PERSON IN CHARGE 0 | SUSPENSION |

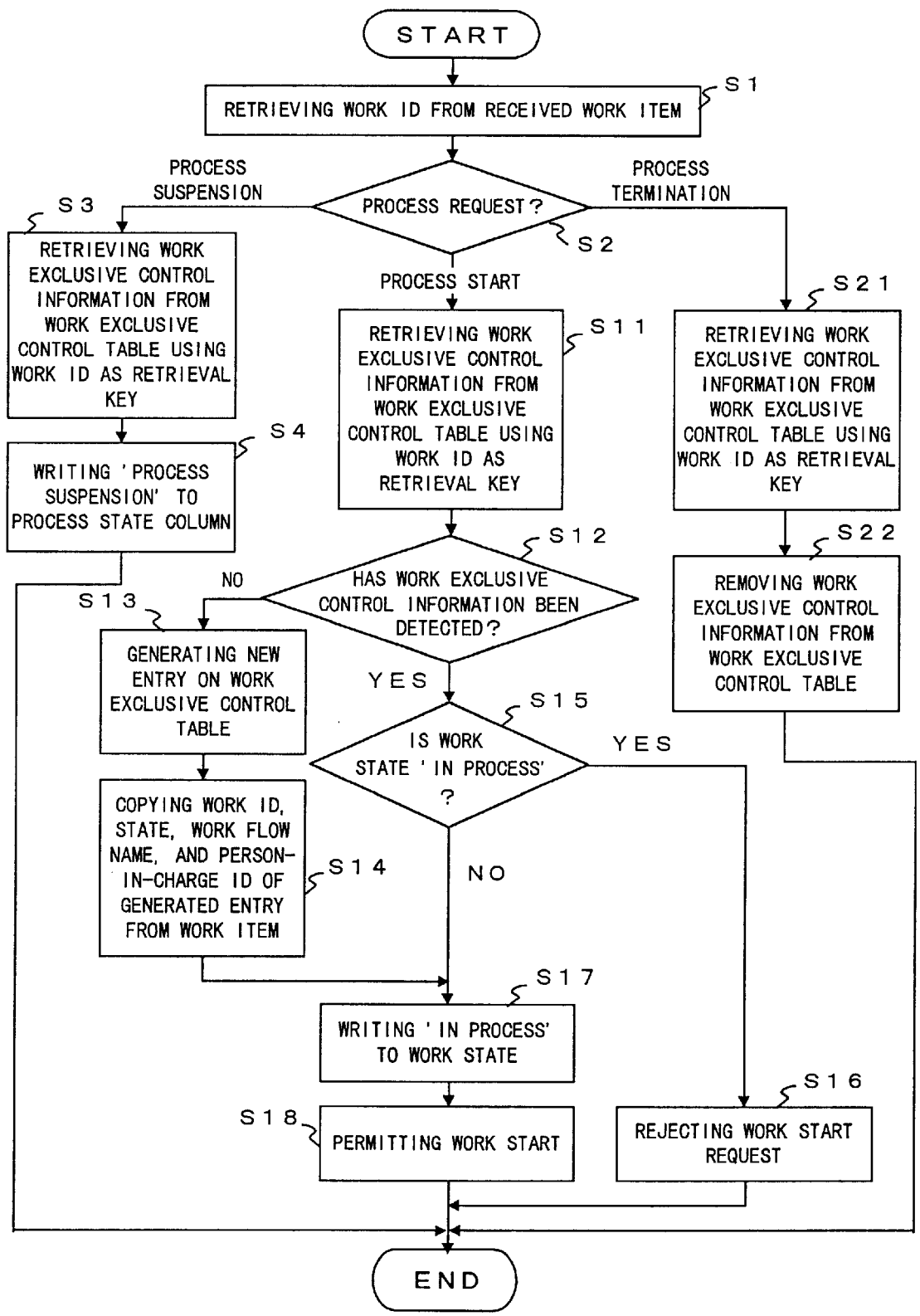
F I G. 4 1

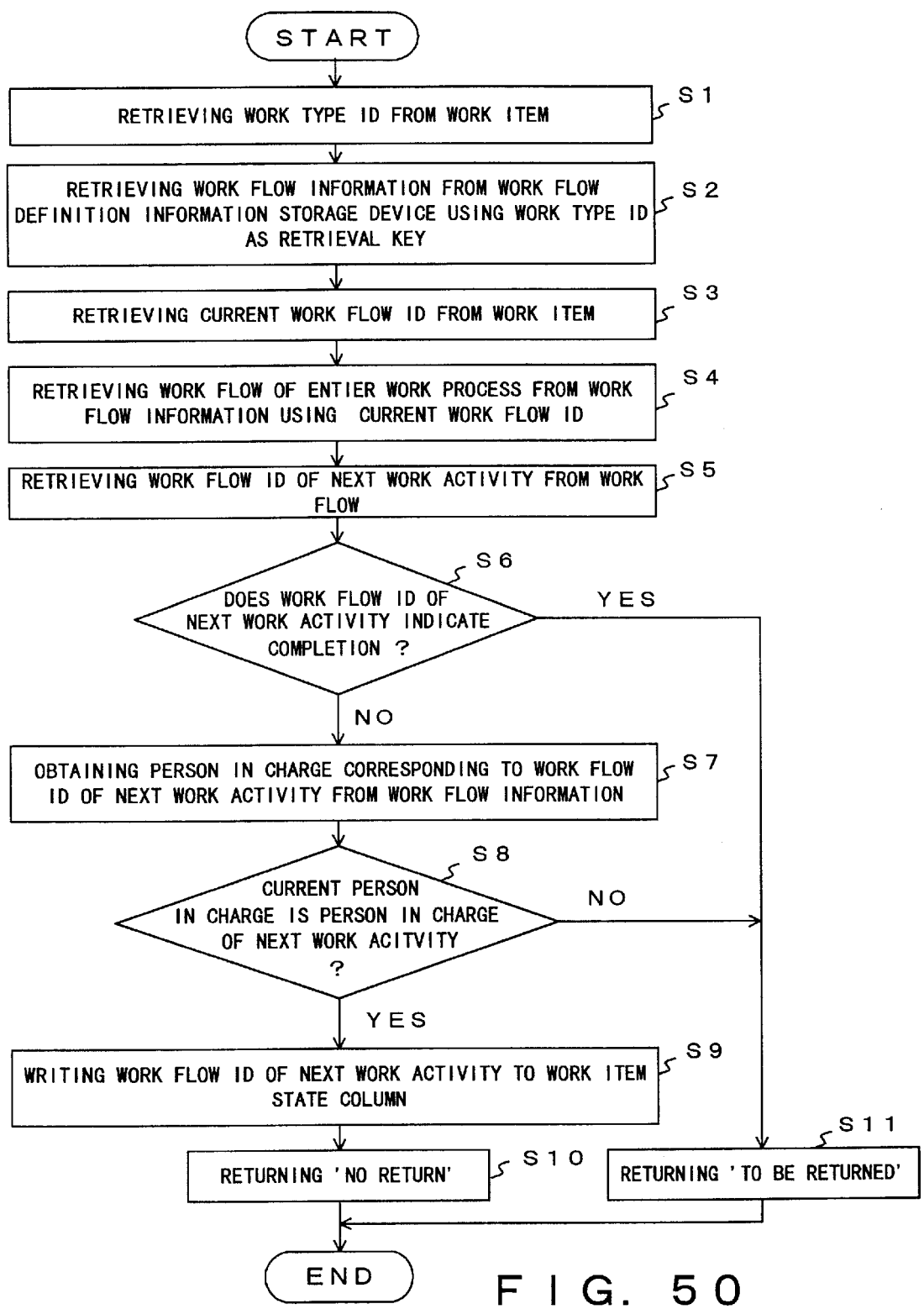
F I G. 5 0

| WORK ID | STATE | WORK FLOW NAME | PERSON-IN-CHARGE ID | ID OF ENGINE IN CHARGE | HISTORY NUMBER |
|---|---|---|---|---|---|
| 0 | WORK FLOW 0 | ORDER | PERSON IN CHARGE 0 | 0 | 0 |
| 1 | WORK FLOW 0 | ORDER | PERSON IN CHARGE 1 | 1 | 1 |
| 2 | WORK FLOW 1 | PRODUCTION REQUEST | PERSON IN CHARGE 2 | 5 | 2 |
| 2 | WORK FLOW 0 | ORDER | PERSON IN CHARGE 0 | 2 | 3 |
| 1 | WORK FLOW 1 | PRODUCTION REQUEST | PERSON IN CHARGE 1 | 3 | 4 |
| 0 | WORK FLOW 2 | PRODUCTION | PERSON IN CHARGE 2 | 5 | 5 |
| 2 | WORK FLOW 2 | PRODUCTION | PERSON IN CHARGE 2 | 4 | 6 |
| 3 | WORK FLOW 2 | PRODUCTION | PERSON IN CHARGE 2 | 3 | 7 |
| 3 | WORK FLOW 1 | PRODUCTION REQUEST | PERSON IN CHARGE 2 | 5 | 8 |

F I G. 5 5

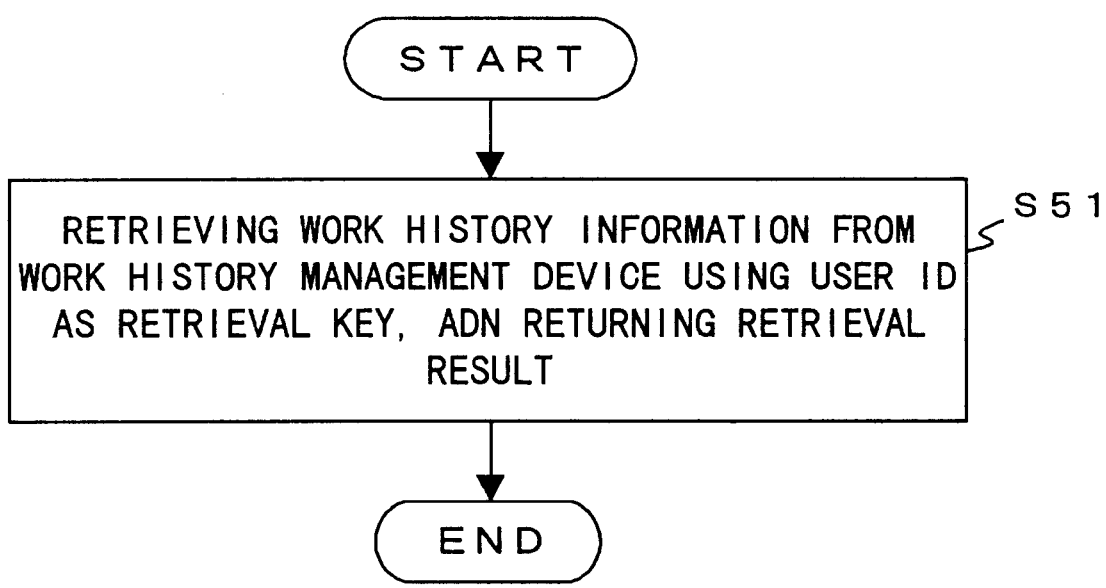
F I G. 6 1

APPARATUS AND SYSTEM FOR MANAGING WORK FLOW, AND COMPUTER-READABLE STORAGE MEDIUM FOR STORING WORK FLOW MANAGEMENT PROGRAM

BACKGROUND OF THE INVENTION

1. Field of the Invention

The present invention relates to an apparatus and a system for managing a series of operations according to a predetermined work flow, and supporting the successful performance of the series of operations by a plurality of users, and also relates to a storage medium for storing a program used to direct a computer to manage the operations and support the successful performance of the operations.

2. Description of the Related Art

There has been a system called a work flow management system for managing information about, for example, persons to be assigned to respective jobs, the term limit of each job, etc. which are necessary in performing a process based on the work flow of a series of predetermined jobs. FIG. 1 shows the configuration of the conventional work flow management system.

In FIG. 1, a server 111 is provided with a work flow engine 112 for managing a work flow.

A work flow definition information storage device 121 stores a work flow of a series of operations managed by the work flow engine 112. The work flow is stored for each a work process (for example, a series of operations such as production management, personnel management, etc.). For example, when a work process refers to production management, the work flow definition information storage device 121 stores, as a work flow, an order slip issuing operation, an operation of issuing production management information (product specification, etc.), an operation of issuing a production instruction slip, etc. Such operations forming a work flow of a work process are referred to as work activities.

A work information storage device 122 stores work information about, for example, the work flow of a work process being performed. For example, the work information storage device 122 stores the name of a person assigned to each job, a work instruction, the term limit of each job, a work history, etc.

A work database 123 is a product specification database for production management, and is a common database of the server 111.

In this example, a client A 141 belongs to the sales department of a company.

In this example, a client B 142 belongs to the production management department of the company.

In this example, a client C 143 belongs to the production department of the company.

FIG. 2 shows the operation of the conventional work flow management apparatus shown in FIG. 1.

FIG. 2 shows an example of the work flow of the production management work process. In this work flow, the sales department first receives from a customer a request for product delivery, and issues a product order slip to the production management department. Then, the production management department receives the slip, and issues a production request to the production department. The production department receives the production request.

The work flow engine 112 performs a work activity transfer process 114 between clients and a next work activity determining process 115 based on the progress of the work process.

The work flow definition information storage device 121 stores a table 121' showing the work flow for production management.

The work database 123 stores the database of the product specification (including the product specification A 130 of a product specified in a production request) of each product which can be manufactured by the production department. Furthermore, the work database 123 also stores the listing format of each slip transmitted and received among the departments in the company. The format of the slip can be individually generated and used by a user system of each client.

In this example, work information 126 stored in the work information storage device 122 includes necessary information (ordered work information 001, a person A of the sales department as an order receiver, a person B of the production management department as a production request receiver, a person C of the production department as a person in charge of production, and Dec. 11, '99 as the term limit of production) in processing the work process by a user system, together with an order slip 127, a production request slip 128, and a product specification sheet A 129.

The order slip 127 is generated by the person A of the sales department in the client A 141.

The production request slip 128 is generated by the person B of the production management department in the client B 142.

The product specification sheet A 129 refers to the specifications of a product specified in the production request slip generated by the client B 142 based on the product specification A 130 of the product A stored in the work database 123.

An order slip 151 is generated by the person A of the sales department in the client A 141 by inputting data in a corresponding item in a predetermined listing form.

An ordered work item information 152 is the order slip 151 received by the client B 142.

A production request slip 153 is generated by the person B of the production management department in the client B 142 by inputting data in a corresponding item in a predetermined listing form.

A product specification sheet A 154 is generated according to the product specification A 130 of a product A stored in the work database 123. It is the specification of the product specified in the production request, and is generated by the client B 142 and then transferred with the production request slip 153.

A production request slip 155 is the production request slip 153 transferred from the client B 142 and received by the client C 143 in the production department.

A product specification sheet A 156 is attached to the production request slip 155, and transferred with the production request slip 153 by the client B 142.

Described below are the operations shown in FIG. 2.

In the client A 141, the person A of the sales department generates the order slip 151 using an input tool provided in the client A 141. After the slip has been generated, the work flow engine 112 generates the work information 126, refers to the table 121' stored in the work flow definition information storage device 121, and transfers the order slip 151 to the client B 142 based on the work flow indicated by the table 121'. At this time, the work information 126 does not contain the production request slip 128 or the product specification sheet A 129.

In client B 142, the person B of the production management department generates the production request slip 153 using the input tool provided in the client B 142 according to the ordered work item information 152 obtained from the transferred order slip 151. Furthermore, the person B generates the product specification sheet A 154 based on the product specification A 130 of the product specified in the production request stored in the work database 123, attaches it to the production request slip 153, and terminates the production request process.

When the production request process terminates in the client B 142, the work flow engine 112 adds the production request slip 128 and the product specification sheet A 129 to the work information 126 stored in the work information storage device 122, and updates them. Then, the work flow engine 112 refers to the table 121' stored in the work flow definition information storage device 121, and transfers the production request slip 153 and the product specification sheet A 154 to the client C 143 based on the work flow shown in the table 121'.

In the client C 143, when the production request slip 155 and the product specification sheet A 156 are obtained, the person C of the production department confirms them, and notifies the work flow engine 112 of the completion of the entire production management process.

When the work flow engine 112 receives a completion notification of the production management process from the client C 143, it terminates a series of the operations (starting with the generation of the order slip 151) of the work flow management process.

Since the conventional work flow management system functions as described above, access is necessarily gained to the work flow definition information storage device 121 and the work information storage device 122 each time a work activity transfer process is performed. Therefore, when the amount of the work process and the work activities increases, the access is concentrated on the work flow definition information storage device 121 and the work information storage device 122. Thereby, the transfer speed is extremely reduced and the efficiency of the system is deteriorated.

SUMMARY OF THE INVENTION

The present invention aims at quickly managing a work flow with efficiency using a work flow management apparatus/system.

According to one of the embodiments of the present invention, a plurality of work flow support units and a work flow support unit management unit are provided so that the work flow supply unit management unit can determine the work flow support unit for managing each work flow. At this time, to prevent a load from being concentrated on a specific work flow support unit, the state of the load in each work flow support unit is recorded when a work process is started, and the previously recorded state of the load is referred to so that it can be determined based on the information which work flow support unit is to manage the work flow.

Then, each work flow support unit is provided with a work flow definition information storage apparatus and a work information storage unit so that necessary work information (for example, a work activity to be next started) can be specified, among the information stored in the work flow definition information storage apparatus, for the process of each work activity. The work flow support unit is designed to transfer only necessary work information for each work activity.

With this configuration, a load is not concentrated on a specific work flow support unit, thereby keeping a constant load state in each work flow support unit. Therefore, access is not concentrated on a specific work flow definition storage apparatus and a specific work information storage apparatus. As a result, the transfer speed is not extremely lowered even if the amount of the work to be managed increases.

According to another embodiment of the present invention, the system is designed to manage a work flow using a main server and a home server.

The main server includes a work flow support unit provided with the work flow definition storage unit and the work information storage unit so that the work information can be transferred by the work flow support unit to the home server to which the work information is to be transferred and the person in charge belongs.

The home server is designed to have a storage unit for storing work information transmitted from the main server so that the work information for each person in charge can be individually provided at a request from the person in charge belonging to the home server.

With the configuration, a person in charge of a work activity is allowed to start an assigned work activity in any client provided in the home server to which the person belongs. As a result, work activities can be started in parallel by a plurality of persons belonging to the home server, thereby improving the efficiency of the entire work.

BRIEF DESCRIPTION OF THE DRAWINGS

The present invention will be more apparent from the following detailed description, when taken in conjunction with the accompanying drawings, in which:

FIG. 6 shows an example of a work information management table;

FIG. 10 is a flowchart showing the work flow engine communications management device according to the first embodiment of the work flow management apparatus of the present invention;

FIG. 11 is a flowchart showing the user system communications management device according to the first embodiment of the work flow management apparatus of the present invention;

FIG. 22 shows an example of a definition of the work flow stored in the work flow definition information storage device;

FIG. 23 shows an example of work information stored in the work information storage device;

FIG. 24 shows an example of a user information management table;

FIG. 25 is a flowchart showing the work flow engine management device according to the first embodiment of the work flow management system of the present invention;

FIG. 30 shows an example of a work item stored in the work item management device;

FIG. 31 is a flowchart showing the home server control device according to the first embodiment of the home server;

FIG. 35 is a flowchart showing the work activity terminating process shown in FIG. 31;

FIG. 36 is a flowchart showing the home server communications management device according to the first embodiment of the home server;

FIG. 40 shows an example of a work exclusive control table;

FIG. 41 is a flowchart showing the work exclusive control device according to the second embodiment of the home server;

FIG. 50 is a flowchart showing the next work activity detection device according to the fourth embodiment of the home server;

FIG. 55 shows an example of history information stored in the work history management device;

FIG. 61 is a flowchart of the work history retrieving process shown in FIG. 59;

DESCRIPTION OF THE PREFERRED EMBODIMENTS

In the following explanation, generating a new work process or generating a work process refers to that, when a user requests a new work process to another department, he or she specifies the type of the new work process, inputs necessary information (person in charge, term limit, etc.) for the work process, and then activates the work process.

The transfer of a work activity by the work flow support unit (work flow engine) refers to that, after a work process is generated, the work flow support unit (work flow engine) transfers necessary information for each work activity to a user system to which a person in charge of each work activity belongs according to the work flow definition of a specified work process and input work information. The necessary information such as a work instruction, etc. for processing each work activity transferred at this time is referred to especially as a work item in work information. The work item contains various information such as the contents of the work activity to be started, the document necessary for the work activities, the tool activated to process the work activity (for example, a word processor, etc.), and so forth.

A work activity terminating process refers to a process of notifying a work flow support unit (work flow engine) of the termination state of a work activity when the process on the work activity is completed. The work activity termination state is represented by the termination of a work activity, the decisive information about the contents of the work activity such as an approval, a rejection, etc.

The determination and transfer of a next work activity by a work flow engine refers to determining a work activity to be started next from a work activity termination state, work flow definition information, and the work activity whose process has been completed, and transferring a new work item to a person in charge of the next work activity. The above described process is also referred to simply as a transfer process.

Figure 1:
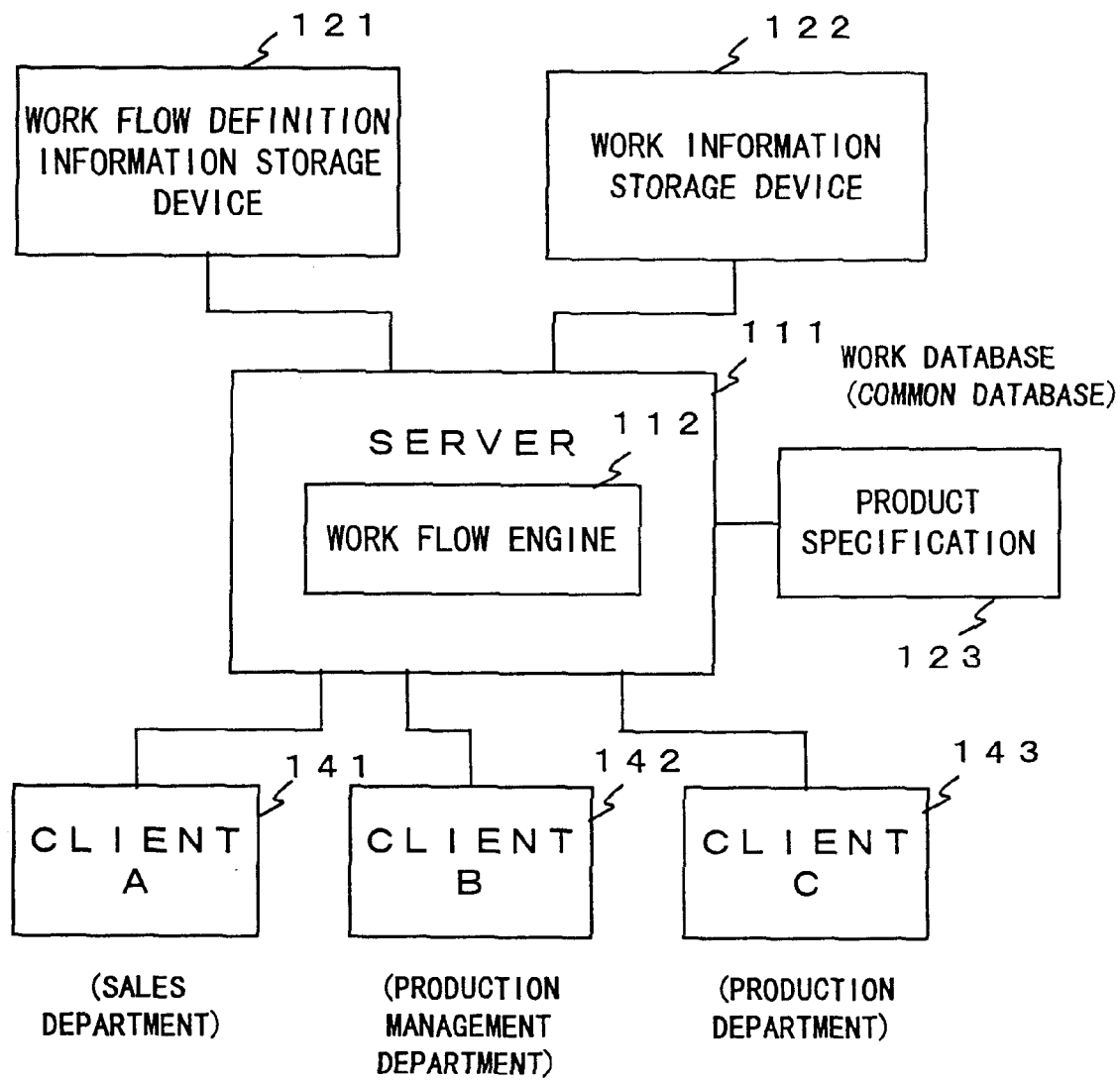
FIG. 1 is a prior art that showing an example of the configuration of the conventional work flow management system.
Figure 2:
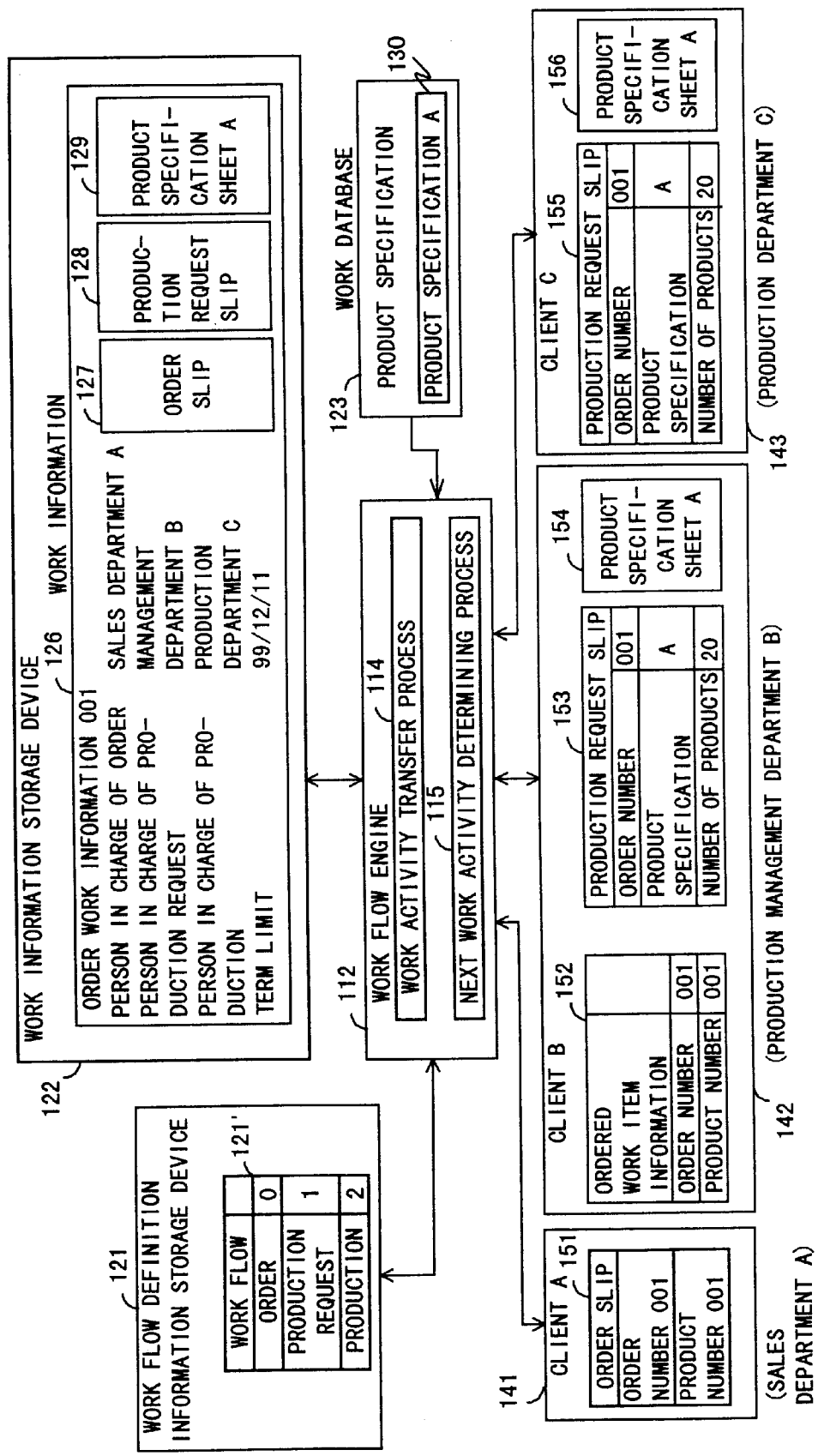
FIG. 2 is a prior art that shows the operations performed using the configuration of the conventional work flow management system shown in FIG. 1.
Figure 3:
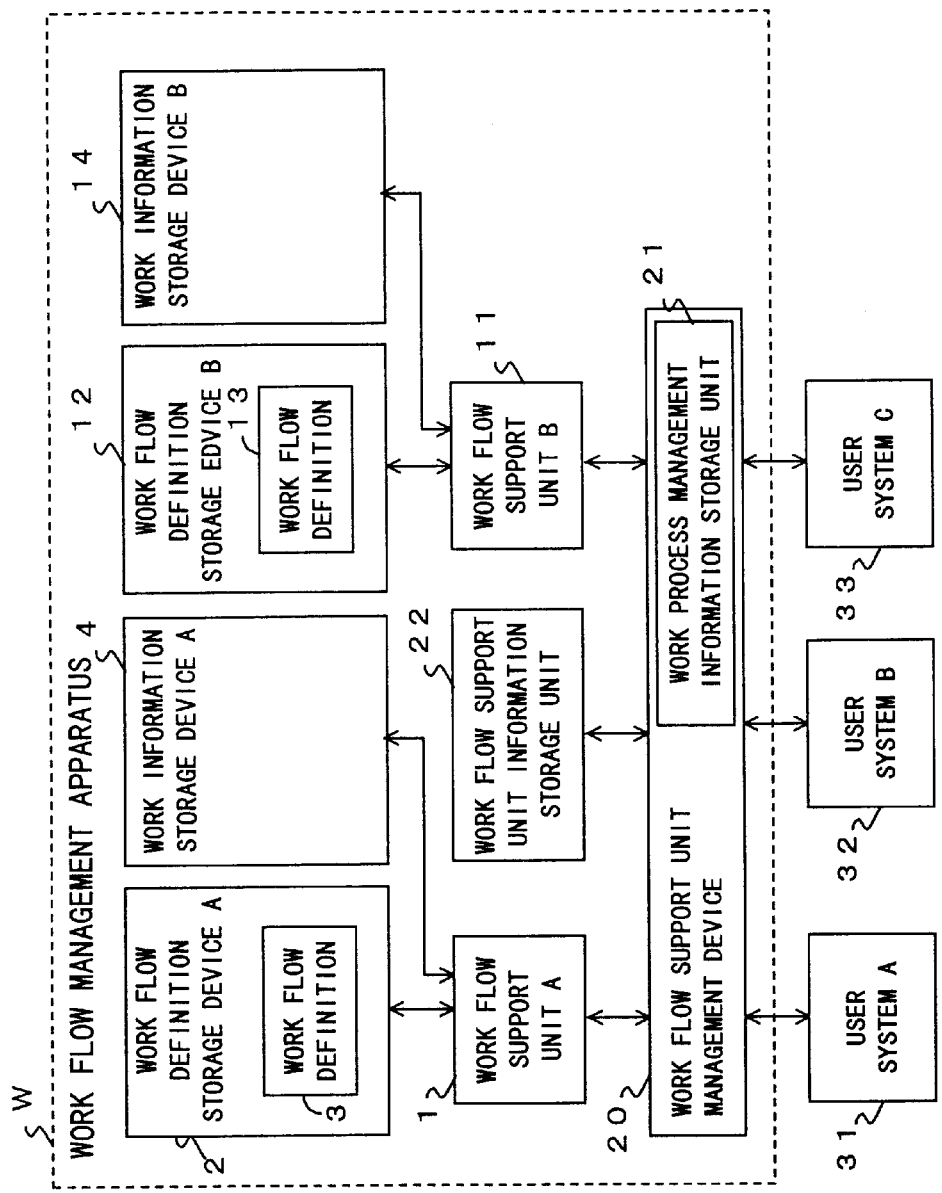
FIG. 3 shows the first basic configuration of the present invention.

FIG. 3 shows the first basic configuration of the present invention.

The internal configuration of the work flow management apparatus W is described first by referring to FIG. 3.

A work flow definition storage device A 2 is connected to a work flow support unit A 1 which stores a work flow definition 3.

The flow of each work activity is defined in a work flow definition 3 for each work process.

Furthermore, a work information storage device A 4 is connected to the work flow support unit A 1. The work information storage device A 4 stores work information necessary for processing each work activity such as the person in charge, the contents, the term limit, the history, etc. of each work activity of a work process managed in the work flow support unit A 1.

A work flow definition storage device B 12 is connected to a work flow support unit B 11 which stores a work flow definition 13.

Furthermore, a work information storage device B 14 is connected to the work flow support unit B 11. The work information storage device B 11 stores work information about the work process being managed by the work flow support unit B 11.

A work flow support unit management device 20 records the load condition of the work flow support unit A 1 and the work flow support unit B 11 in a work flow support unit information storage unit 22. When the new work process is generated, the work flow support unit management device 20 refers to the current load condition recorded in the work flow support unit information storage unit 22, and determines a work flow support unit for managing a new work process.

Each time a work process is generated, a work process management information storage unit 21 provided in the work flow support unit management device 20 stores the type of the work process, the flow of each work activity of the work process, the person in charge of each work process, the work definition required to process each work activity, etc.

The work flow support unit information storage unit 22 stores the load condition, etc. of the work flow support units A and B (1, 11).

In FIG. 3, a user system A 31, a user system B 32, and a user system C 33 are connected to the work flow management apparatus W.

With the configuration shown in FIG. 3, as the first work activity of the work process, a slip, etc. for representation of a work item (contents of work, person in charge, etc.) to another user system is generated in the user system A 31, the user system B 32, or the user system C 33. When the generating process terminates, the termination state of the generating process is transmitted to the work flow support unit management device 20. At this time, as a process of activating a new work process, the work process management information such as the progress of the work process, the work flow, the person in charge of the work activity in progress, etc. is generated, and stored in the work process management information storage unit 21.

When a request to generate a new work process is received from any of the user systems (31, 32, or 33), the work flow support unit management device 20 refers to the work flow support unit information storage unit 22, and determines which work flow support unit (1 or 11) should manage the work process based on the load condition of each work flow support unit. For example, a work flow support unit having a smaller process load is selected to manage the new work process. The work flow support unit management device 20 activates another work flow support unit if necessary. Otherwise, if information about the termination state (process termination of a work activity, and the conclusion of the contents of the process of the work activity such as an approval, a rejection, etc.) of a work activity is transmitted from a user system, the work flow support unit management device 20 refers to the work flow support unit information storage unit 22 to obtain the work flow support unit (1 or 11) for managing a corresponding work process, and transmits the information about the termination state of the work activity to the obtained unit.

Furthermore, the work flow support unit (1, 11) refers to the work flow definition storage device (2, 12) to determine the next work activity in the work flow and transfer the work activity. When a work activity is transferred, work information is generated according to work process management information, the contents of the work management information storage unit 21 is updated to generate a work item, and the work item is transmitted to the user system (31, 32, 33) through the work flow support unit management device 20.

According to the first basic configuration of the present invention, a load is not concentrated on a specific work flow support unit, thereby constantly averaging the load state of each work flow support unit. Therefore, access is not concentrated on the work flow definition storage device or the work information storage device, and the transfer speed does not become lower even if the managing operation volume increases.

Figure 4:
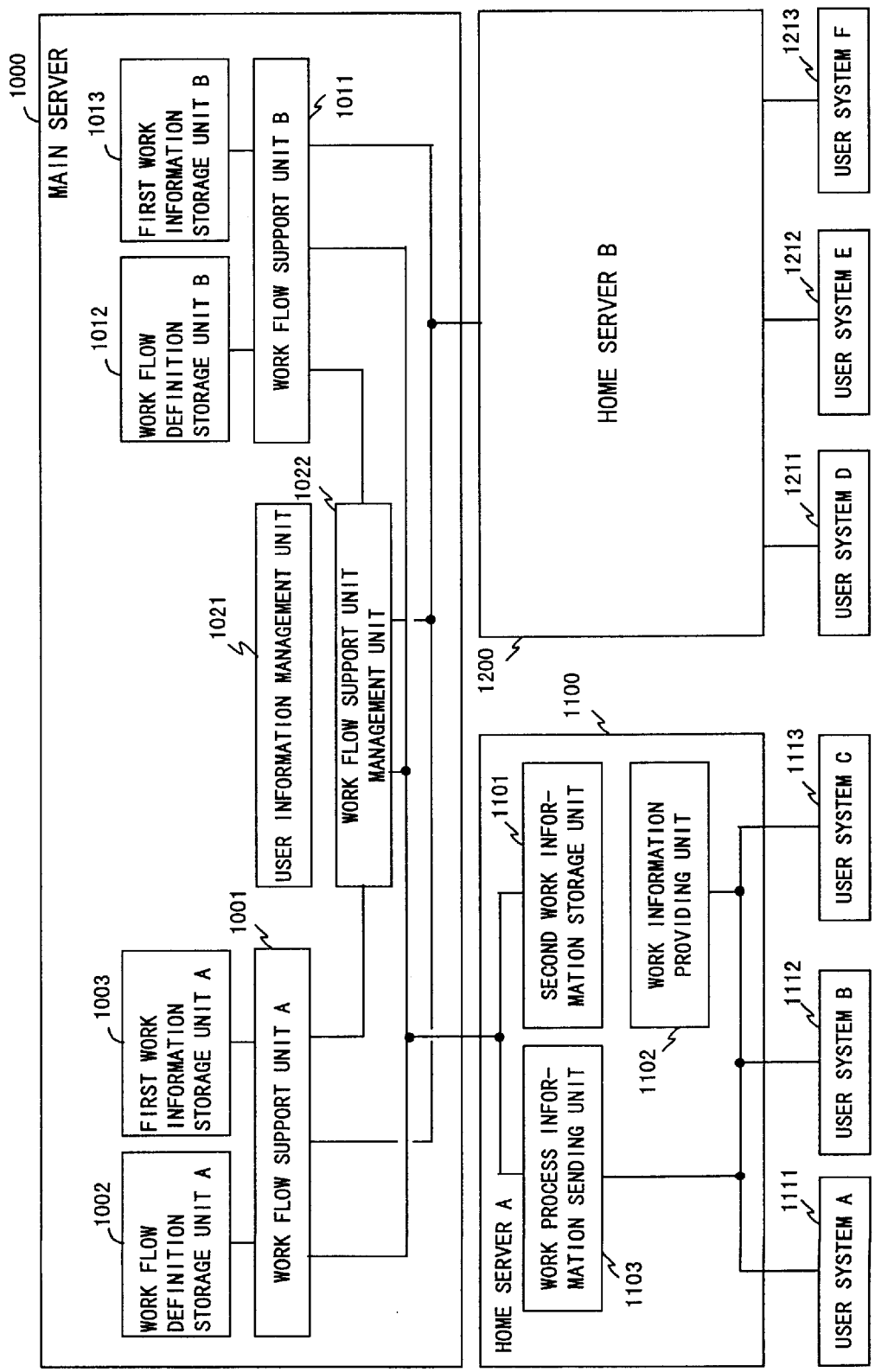
FIG. 4 shows the second basic configuration of the present invention.

FIG. 4 shows the second basic configuration of the present invention.

According to the basic configuration of the work flow management system of the present invention shown in FIG. 4, a main server 1000 and two home servers (1100, 1200) are shown.

The internal configuration of the main server 1000 is first described below by referring to FIG. 4.

The main server 1000 is provided with two work flow support units (1001, 1011). A work flow support unit A 1001 comprises a work flow definition storage unit A 1002 and a first work information storage unit A 1003. A work flow support unit B 1011 comprises a work flow definition storage unit B 1012 and a first work information storage unit B 1013. The number of work flow support units each having a work flow definition storage unit and a first work information storage unit is not limited to two, but can be only one, or three or more.

The same functions are assigned between the work flow support unit A 1001 and the work flow support unit B 1011, the work flow definition storage unit A 1002 and the work flow definition storage unit B 1012, and the first work information storage unit A 1003 and the first work information storage unit B 1013. Therefore, only the function of one of the two units is described below.

The work flow definition storage unit A 1002 stores the work flow of a work process which contains a series of predetermined operations. The work flow is stored for each work type.

The first work information storage unit A 1003 stores work information such as the name of a person in charge of each work activity, a work instruction, a term, a work history, etc. which are necessary to perform a predetermined work process.

A user information management unit 1021 stores and manages user information indicating a home server to which a user in charge of each work activity forming part of a predetermined work process belongs. In FIG. 4, the user information management unit 1021 is provided in the main server 1000 and shared by the two work flow support units (1001, 1011). It is obvious that user information management units having the same user information can be individually provided in a plurality of work flow support units.

The work flow support unit A 1001 generates work information about the next work activities in the work flow of the work process according to the work flow stored in the work flow definition storage unit A 1002, the work information stored in the first work information storage unit A 1003, the user information stored in the user information management unit 1021, and the process information which is obtained as a process result of the work activity performed by a user belonging to the home server, and is transmitted from the home server. The work flow support unit A 1001 transfers the work item which is necessary work information in processing the work activity to the home server to which the user in charge of the work activity belongs.

A work flow support unit management unit 1022 manages the two work flow support units (1001, 1011) such that the load of the process is equally shared by the two units. The work flow support unit management unit 1022 is not necessary when there is only one work flow support unit in the main server 1000.

Described below are the configurations of the two home servers (1100, 1200) shown in FIG. 4.

The internal configurations are similar between a home server A 1100 and a home server B 1200. The number of home servers is not limited to two. That is, only one home server, or three or more home servers can be used. In this case, these home servers can have similar configurations.

The home server A 1100 has three user systems (1111, 1112, 1113), and the home server B 1200 also has three user systems (1211, 1212, 1213). The number of user systems in each home server is optional, not limited to three.

As described above, the home server A 1100 and the home server B 1200 have similar internal configurations. Therefore, the internal configuration of only the home server A 1100 is described here.

The home server A 1100 comprises a second work information storage unit 1101, a work information providing unit 1102, and a work process information sending unit 1103.

The second work information storage unit 1101 stores a work item transferred from the work flow support unit A 1001 or the work flow support unit B 1011 in the main server 1000.

At a request from a user belonging to the home server A 1100 and operating any of the user systems (1111, 1112, 1113) in the home server A 1100, the work information providing unit 1102 provides the user with a work item about the work activity, stored in the second work information storage unit 1101, of which the user takes charge through the user system operated by the user.

The work process information sending unit 1103 transmits to the main server 1000 the process information indicating the process result of the work activity performed by the user according to the work information provided for the user by the work information providing unit 1102.

Assume that a slip, etc. showing work items to another user system is generated as the first step in the work process with the configuration shown in FIG. 4 in, for example, a user system A 1111 in the home server A 1100. When the generating process is completed, the information is transmitted from the work process information sending unit 1103 to the main server 1000.

When a new work process generation request arrives in the main server 1000 from the home server A 1100, the work flow support unit management unit 1022 determines which work flow support unit (1001 or 1011) should manage the work process based on the load condition of each work flow support unit. It is assumed, in this example, that the work flow support unit A 1001 manages the work process.

The work flow support unit A 1001 generates work information for the next work activities in the work flow based on the work flow stored in the work flow definition storage unit A 1002, the work information stored in the first work information storage unit A 1003, the user information stored in the user information management unit 1021, and the process information transmitted from the home server A 1100 after the user operating the user system A 1111 performs the process. Then, the work flow support unit A 1001 transfers as a work item the necessary information for the process of the work activity to the home server to which the user in charge of the next work activity belongs. In this example, it is assumed that the work item is transferred to the home server A 1100.

In the home server A 1100, the transferred work item is stored in the second work information storage unit 1101. When the user in charge of the work activity corresponding to the transferred work item operates, for example, a user system B 1112, the work item of the work activity of which the user takes charge is retrieved from the second work information storage unit 1101, and provided for the user system B 1112 through the work information providing unit 1102. When the user processes the work based on a given work item and terminates the process of the work activity, the information about the termination state of the work activity is transmitted to the main server 1000 by the work process information sending unit 1103 of the home server A 1100.

By repeating the above described process, a work process, a series of operations, that is, a work process, is managed.

With the second basic configuration of the present invention, a user can process a work activity which the user takes charge of through any user system in the home server to which the user belongs.

Units of a main server and a home server with the second basic configuration according to the present invention are also inventions relating to the present invention.

Each embodiment of the work flow management apparatus of the present invention is described below by referring to an example in which a work flow engine is used as a work flow support unit, a work flow engine management device is used as a work flow support unit management device, a work flow engine management table is used as a work flow support unit information storage unit, and a work information management table is used as a work management information storage unit.

Figure 5:
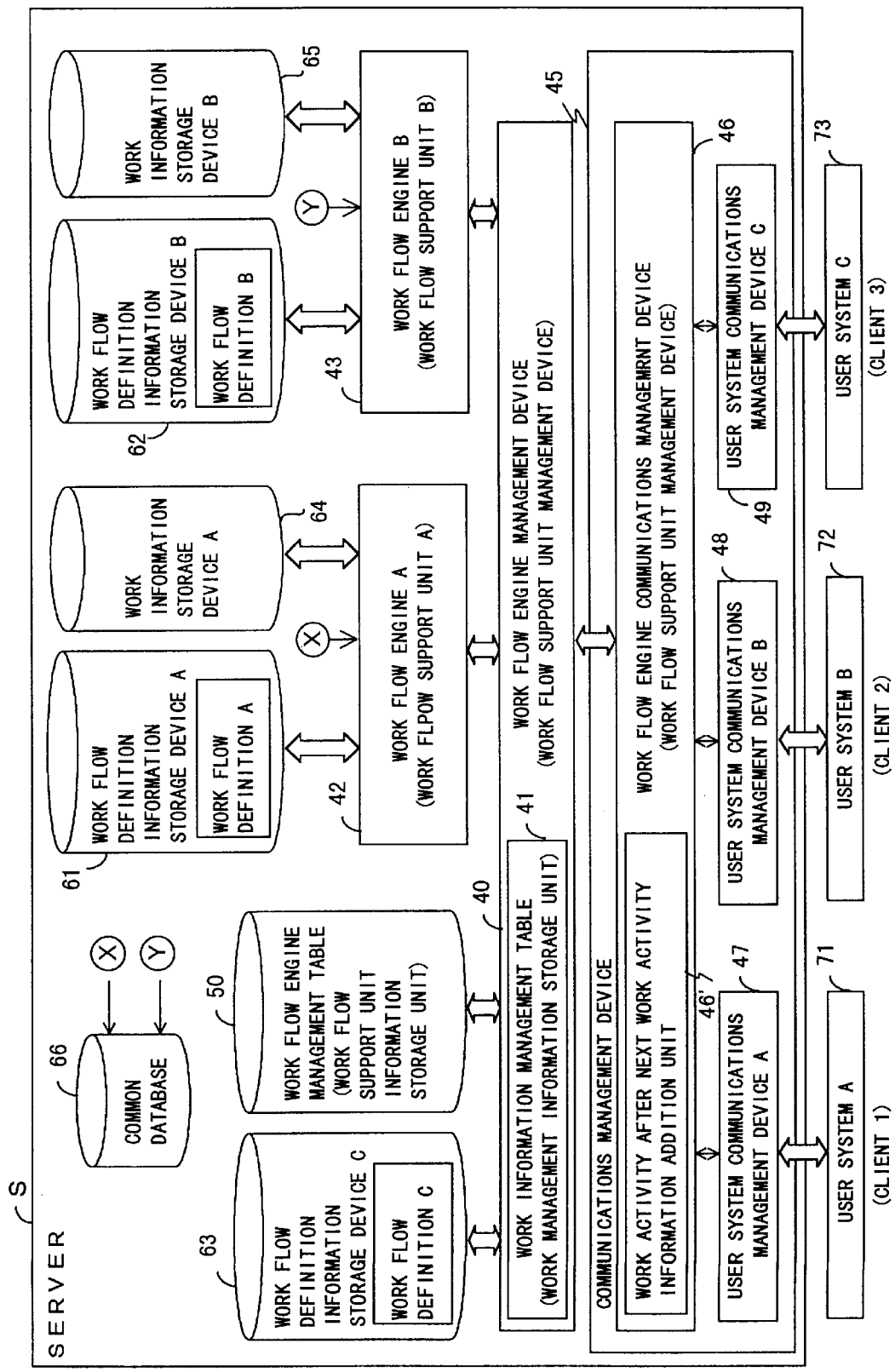
FIG. 5 shows the system configuration according to the first embodiment of the work flow management apparatus of the present invention.

FIG. 5 shows the system configuration according to the first embodiment of the work flow management apparatus of the present invention.

Described below is the internal configuration of the server S shown in FIG. 5.

A work flow engine management device 40 comprises a work information management table 41.

A work flow engine A 42, a work flow engine B 43, and a communications management device 45 are connected to the work flow engine management device 40.

A communications management device 45 comprises a work flow engine communications management device 46, a user system communications management device A 47, a user system communications management device B 48, and a user system communications management device C 49.

The work flow engine communications management device 46 comprises a work activity after next work activity information addition unit 46' which adds to a corresponding work item the destination of the next work activity after the current work activity to be performed in the work flow.

Each user system communications management device manages the communications with each user system connected to a server S. Actually, the user system communications management device A 47, the user system communications management device B 48, and the user system communications management device C 49 control the communications of a user system A (client 1) 71, a user system B (client 2) 72, and a user system C (client 3) 73 respectively.

A work flow engine management table 50 and a work flow definition information storage device C 63 are further connected to the work flow engine management device 40.

The work flow engine management table 50 stores the state of each work flow engine (42, 43) such as a load condition, etc.

The work flow definition information storage device C 63 is a work flow definition storage device about the work flow engine management device 40.

The work flow definition information storage device A 61 and a work information storage device A 64 are connected to the work flow engine A 42.

A work flow definition information storage device A 61 is a work flow definition storage device about the work flow engine management device 40.

The work information storage device A 64 is a work information storage device for the work flow engine A 42, and stores the work information about the work process managed by the work flow engine A 42.

A work flow definition information storage device B 62 and the work information storage device B 65 are connected to the work flow engine B 43.

The work flow definition information storage device B 62 is a work flow definition storage device for the work flow engine B 43.

The work information storage device B 65 is a work information storage device for the work flow engine B 43, and stores the work information about the work process managed by the work flow engine B 43.

A common database 66 is connected to the work flow engine A 42 and the work flow engine B 43. Data can be accessed from either of the work flow engines. The common database 66 stores various data (for example, the specification of a product to be manufactured, the form of each slip, etc.) necessary when a user performs operations.

In FIG. 5, only two work flow engines are provided. However, it is obvious that three or more of them can be provided.

The user systems A, B, C (71, 72, 73) are connected to the server S. They issue instructions about the process of work activities by presenting work items to users, and return the termination states of the work activities to the server S.

With the configuration shown in FIG. 5, the work flow engine management device 40 generates the work information management table 41 according to the work flow stored in the work flow definition information storage device C 63. Each time a new work process generation request or information about the termination state of a work activity is transmitted from each user system (71, 72, 73) is transmitted to the work flow engine management device 40, the work flow definition information storage device C 63 and the work information management table 41 are referred to, and a work item about the next work activity is generated. Then, the work information about the work information management table 41 and the work information storage device (64, 65) is updated.

The communications management device 45 controls the communications between the work flow engine management device 40 and each user system (71, 72, 73), and distributes received information to a destination device. For example, when the user system A 71 generates a work process, the generation request is transmitted to the work flow engine management device 40 through the user system communications management device A 47 and the work flow engine communications management device 46.

The work flow engine management device 40 refers to the work flow engine management table 50 to check the load condition of each work flow engine, and determines the work flow engine for managing a work process. For example, it is determined that the work process is managed by the work flow engine A 42.

The specified work flow engine A 42 refers to the work flow definition information storage device A 61 and the work information storage device A 64, generates work information, and determines the destination of the work item for the next work activity obtained from the work information. Then, the work flow engine A 42 transmits the work item to the user system communications management device in the destination user system through the work flow engine management device 40 and the work flow engine communications management device 46. The user system communications management device receives the work item and transmits the work item to the corresponding user system. In this process, the work flow engine communications management device 46 refers to the user information, determines the destination of the next work activity in the flow, and adds information of the destination to the work item.

In the above described process, when a storage device connected to a specified work flow engine, for example, the work flow engine A 42, does not store the work flow or the work information about the work process to be managed, the necessary work flow and work information are transmitted from the work flow engine B 43 whose storage device stores the work flow and the work information. According to the information, the work flow engine A 42 generates work information, etc., and transmits it to the work flow engine management device 40. The subsequent operations are the same as those described above.

FIG. 6 shows an example of a work information management table used in managing each process of issuing an order, issuing a production request, and manufacturing a product.

The work information management table stores the work process flow of each work activity (issuing an order, issuing a production request, manufacturing a product, etc.) and necessary information (person in charge of the work, a work flow engine to be used, etc.) in each work activity.

In FIG. 6, the work ID indicates a serial number assigned each time a work process is generated. The work flow of each work ID, the name of a work activity, the next work activity are obtained from the work flow definition information received from the work flow definition information storage device. The information of each work ID is generated by the user system issuing a work activity termination report. As shown in FIG. 6, for example, a work ID 1 is generated by the process of the work flow 0 (placing an order) performed by a person having the ID 0 of the person in charge, and refers to the work flow, the person in charge, the engine ID to be used (ID of the work flow engine for management) as shown in FIG. 6.

In FIG. 5, each work flow engine (42, 43) determines the next work activity according to the work flow definition information stored in the work flow definition information storage devices (61, 62) respectively, and transfers the work activity. When the work activity is transferred, the definition of the work activity (issuing an order, issuing a production request, manufacturing a product, etc. specified in the work flow definition information is referred to so that a work item can be generated and transferred to the user systems (71, 72, 73) through the work flow engine management device 40.

Figures 7A, 7B:
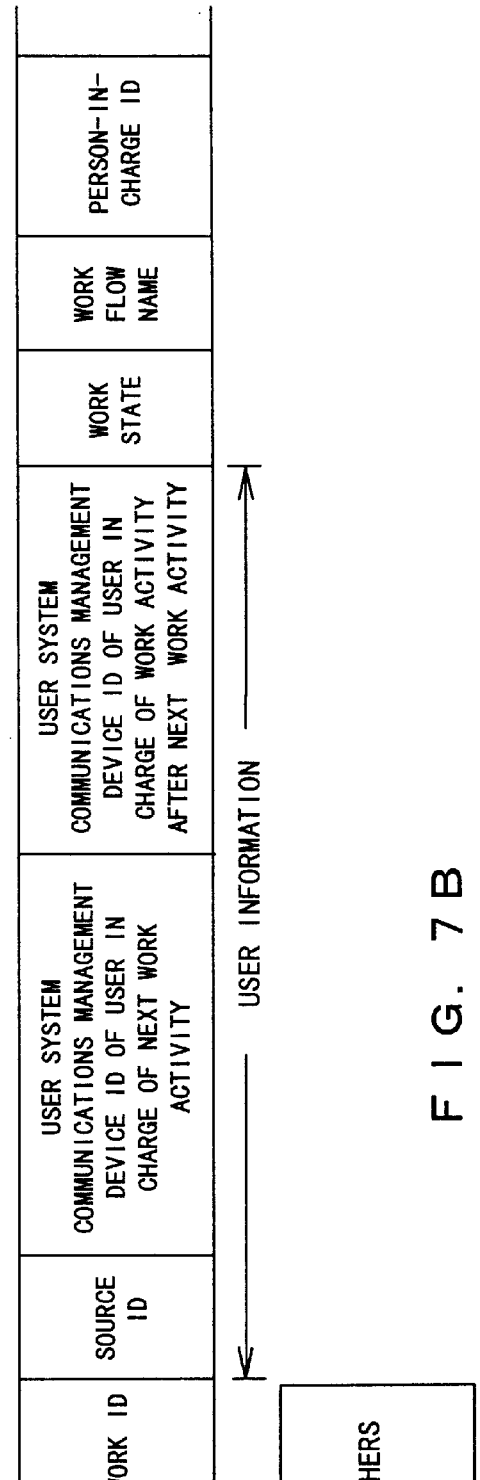
FIG. 7A shows an example of a work flow engine management table.
FIG. 7B shows an example of a work item.

FIG. 7A shows an example of a work flow engine management table showing the case where there are three work flow engines each of which stores the number of loads (size of load), a state (as to whether the operation of a work flow engine is normal or abnormal), and the work ID of the work process being performed.

FIG. 7B shows an example of a work item containing a work ID, a source ID, an ID of a user system communications management device of the user in charge of the next work activity, an ID of a user system communications management device of the user in charge of the work activity after the next work activity, a work state (used for notification of a state such as the generation of a new work process, the termination of a work activity, the completion of a work process, etc. when an inquiry for a work history is received), a procedure name, an ID of a person in charge of a work activity, and other information. Furthermore, a procedure ID corresponding to a procedure name and a procedure ID of the next work activity can be shown as necessary although it is not shown in FIG. 7B.

Figure 8:
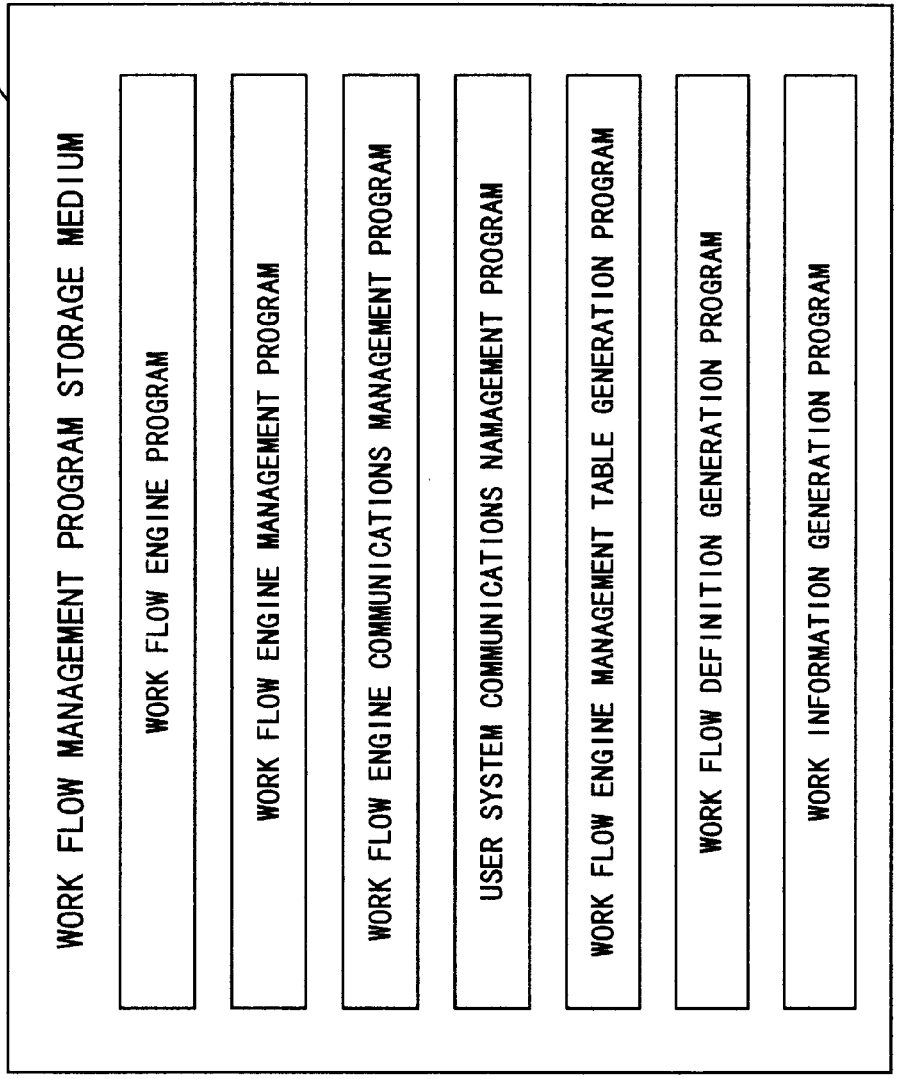
FIG. 8 shows a storage medium for storing a work flow management program.

FIG. 8 shows the work flow management program storage medium according to the present invention.

A work flow management program storage medium 74 can be a magnetic storage device, an optical storage device such as a CD-ROM, etc., and contains a work flow engine program, a work flow engine management program, a work flow engine communications management program, a user system communications management program, a work flow engine management table generation program, a work flow definition generation program, etc. Each program stored in the work flow management program storage medium 74 directs a common computer to perform a process similar to the process performed by each component of the present invention by allowing the common computer to read and execute the program.

Figure 9:
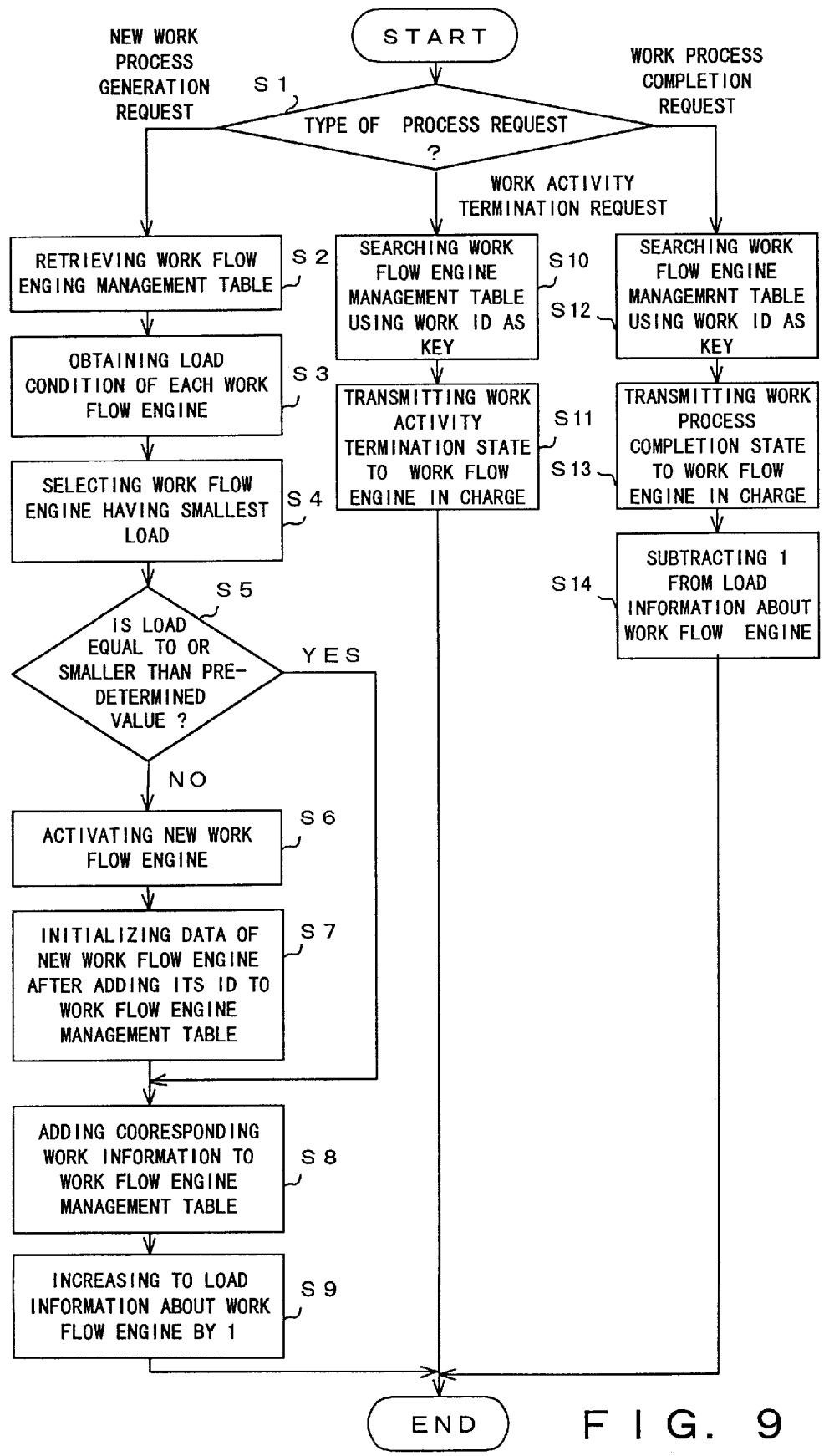
FIG. 9 is a flowchart showing the work flow engine management device according to the first embodiment of the work flow management apparatus of the present invention.

FIG. 9 is a flowchart of the process performed by the work flow engine management device 40 according to the first embodiment of the work flow management apparatus of the present invention. This process is described below by referring to FIG. 9.

First, the work flow engine management device determines the type of a process request issued from the user system (S1). If it receives a new work process generation request from the user system, it performs the processes in and after step S2. If it receives a work activity termination request from the user system, it performs the processes in and after step S10. If it receives a work process completion request, that is, a request for the completion of all work activities of the work process from the user system, it performs the processes in and after step S12.

When the work flow engine management device determines that a new work process generation request is received as a result of the determining process in step S1, it retrieves a work flow engine management table (S2), and then obtains a load condition of each work flow engine (S3).

As a result, the work flow engine management device selects a work flow engine having the smallest load (S4).

The work flow engine management device determines whether or not the selected work flow engine has a load equal to or smaller than a predetermined value (S5). Unless the load is equal to or smaller than the predetermined value as a result of the determination, the processes in and after step S6 are performed. If it is equal to or smaller than the predetermined value, then the processes in and after step S8 are performed.

When the work flow engine management device determines that the value of the load is not equal to or smaller than a predetermined value as a result of the determination in step S5, it activates a new inactivated work flow engine if it exists (S6), adds the ID of the new activated work flow engine to the work flow engine management table, and initializes the data (S7).

The work flow engine management device then adds the work information about the work flow engine to the work flow engine management table (S8), increases the load information (number of loads) about the work flow engine by 1 (S9), and terminates the current process.

When the work flow engine management device determines that it has received a work activity termination request as a result of the determination in S1, it searches the work flow engine management table using the work ID as a key (S10), transmits a work activity termination state (termination of one work activity, that is, the information indicating the termination and the contents of the process performed in a work activity, for example, a notification of approval, rejection, etc.) to the work flow engine which takes charge of the work activity corresponding to the work ID (S11). Then, the device terminates the current process.

When the work flow engine management device determines that it has received a work process completion request as a result of the determination in step S1, it searches the work flow engine management table using the work ID as a key (S12), transmits a work process completion state (termination state of a series of work processes) to the work flow engine which takes charge of the work activity corresponding to the work ID, and terminates all management processes on the corresponding work process performed by the work flow engine (S13).

The work flow engine management device subtract 1 from the load information about the corresponding work flow engine in the work flow engine management table (S14), thereby terminating the current process.

FIG. 10 is a flowchart of a process performed by the work flow engine communications management device 46 according to the first embodiment of the work flow management apparatus of the present invention. This flowchart is similar to the flowchart of the process performed by the work flow engine communications management device according to the second embodiment described later by referring to FIG. 13.

The process is described by referring to FIG. 10.

First, the work flow engine communications management device determines whether or not the received information is to be returned to the work flow engine (S1). If the information is to be returned to the work flow engine as a result of the determination, the process in step S2 is performed. If it is not to be returned to the work flow engine, the process in step S3 is performed.

If the work flow engine communications management device determines as a result of the determination in step S1 that the received information is returned in response to the information about the termination of the work activity to the work flow engine, it transmits the work activity termination information (information indicating the termination of the work activity, and all necessary information such as a slip, a specification, etc.) to the work flow engine (S2), thereby terminating the current process.

If the work flow engine communications management device determines as a result of the determination in step S1 that the received information is not to be returned to the work flow engine, then it retrieves the destination user information (destination of the current work item) from the information (S3).

Then, the work activity after next work activity information addition unit in the work flow engine communications management device retrieves the user system communications management device ID of the destination (destination of the work item about the next work activity in the work flow) from the work flow engine management table (S4), and adds the returned-to user system communications management device ID to the work item (S5).

Then, the work flow engine communications management device transmits the work item to the communications management device corresponding to the communications management device ID (S6), thereby terminating the current process.

FIG. 11 is a flowchart of the process performed by the user system communications management devices (47, 48, 49). This flowchart is prepared such that it can be commonly used for the process performed by the user system communications management device according to another embodiment of the present invention described later. This process is described below by referring to FIG. 11.

First, when the user system communications management device receives information, it determines whether or not the information is work activity termination information (S1). If the received information is not work activity termination information as a result of the determination, then the process in step S2 is performed. If the received information is work activity termination information, then the process in step S3 is performed.

If the user system communications management device determines as a result of the determination in step S1 that the received information is not work activity termination information, then it transmits the work item to the user system (S2), thereby terminating the current process.

On the other hand, if the user system communications management device determines as a result of the determination in step S1 that the received information is work activity termination information, then it retrieves from the information the ID for the work flow engine communications management device (the ID added in step S5 in the flowchart shown in FIG. 10) (S3), and transmits the work activity termination information to the work flow engine communications management device corresponding to the ID (S4). In FIG. 4, there is only one work flow engine communications management device. Therefore, the work activity termination information is transmitted to the work flow engine communications management device. The processes in steps S3 and S4 are the processes performed according to the third embodiment of the present invention as described later. Then, the current process terminates.

Figure 12:
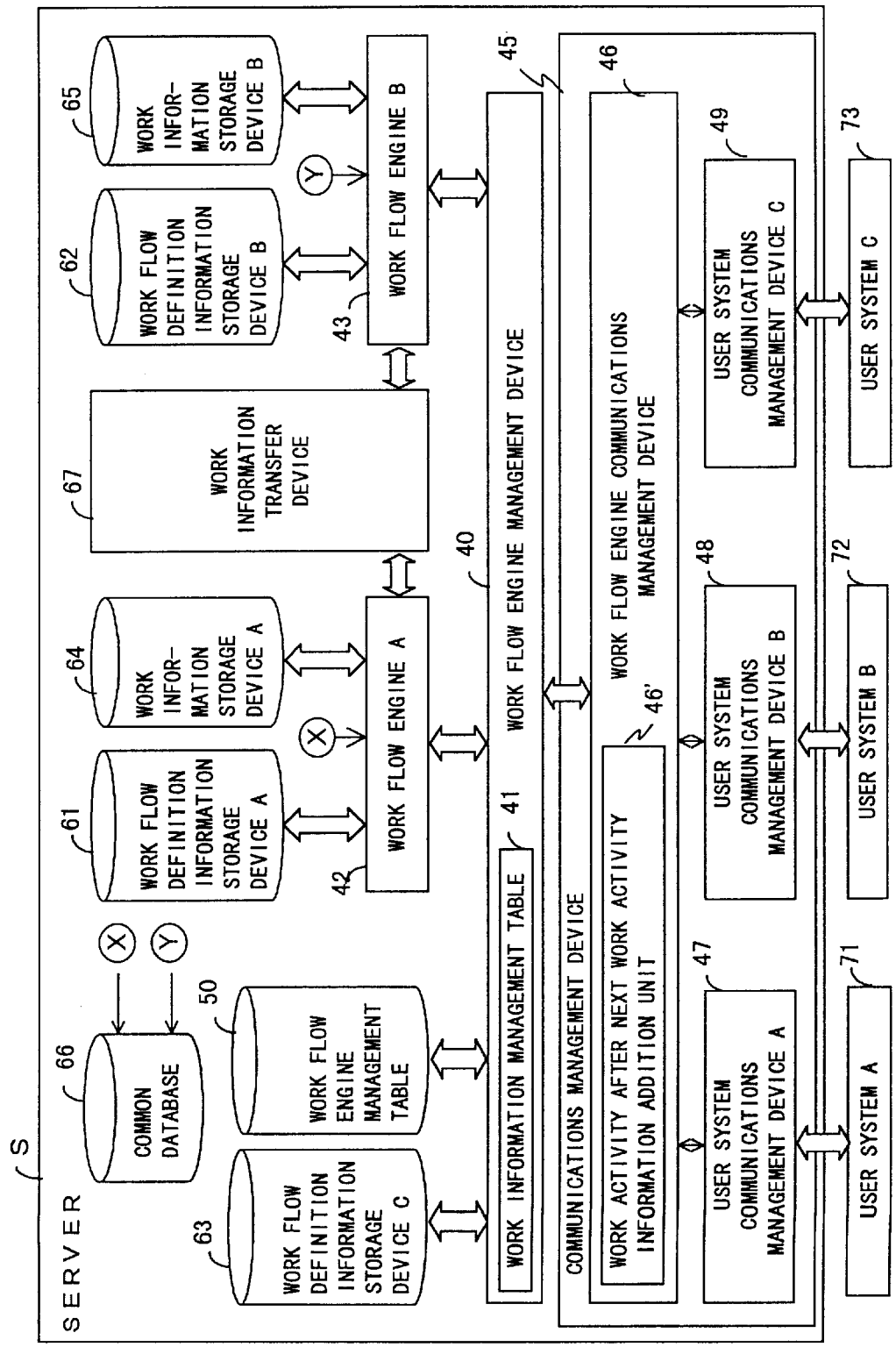
FIG. 12 shows the system configuration according to the second embodiment of the work flow management apparatus of the present invention.

FIG. 12 shows the system configuration according to the second embodiment of the work flow management apparatus of the present invention.

According to the second embodiment of the work flow management apparatus the present invention, the work flow definition and the work information are transmitted to the work flow engine for managing the next work activity when the next work activity is managed by another work flow engine.

If the work activity after the next work activity is managed by another work flow engine, then the next work activity can be managed by the work flow engine for managing the work activity after the next work activity. In this case, the work flow definition and the work information about the next work activity are transmitted to the work flow engine so that the work flow engine can manage the next work activity.

Described below is the internal configuration of the server S shown in FIG. 12.

FIG. 12 is different from FIG. 5 showing the system configuration according to the first embodiment of the work flow management apparatus of the present invention only in that a work information transfer device 67 is added. In FIG. 12, there are only two work flow engines, but there can be three or more engines.

In FIG. 12, the components shown in FIG. 5 are assigned the common identification numbers.

For example, if the load of the work flow engine A 42 is large and the work process being managed by the work flow engine A 42 is to be managed by the work flow engine B 43, then the work information transfer device 67 transfers the work flow definition, the work information, etc. of the work process being managed by the work flow engine A 42 to the work flow engine B 43. Inversely, the work flow definition, the work information, etc. of the work process being managed by the work flow engine B 43 are transferred to the work flow engine A 42. Otherwise, for example, when another work flow engine is used to backup the management process of the work flow engine A42, the work flow definition, the work information, etc. of the work process being managed by the work flow engine A 42 are transferred to the backup side.

Figure 13:
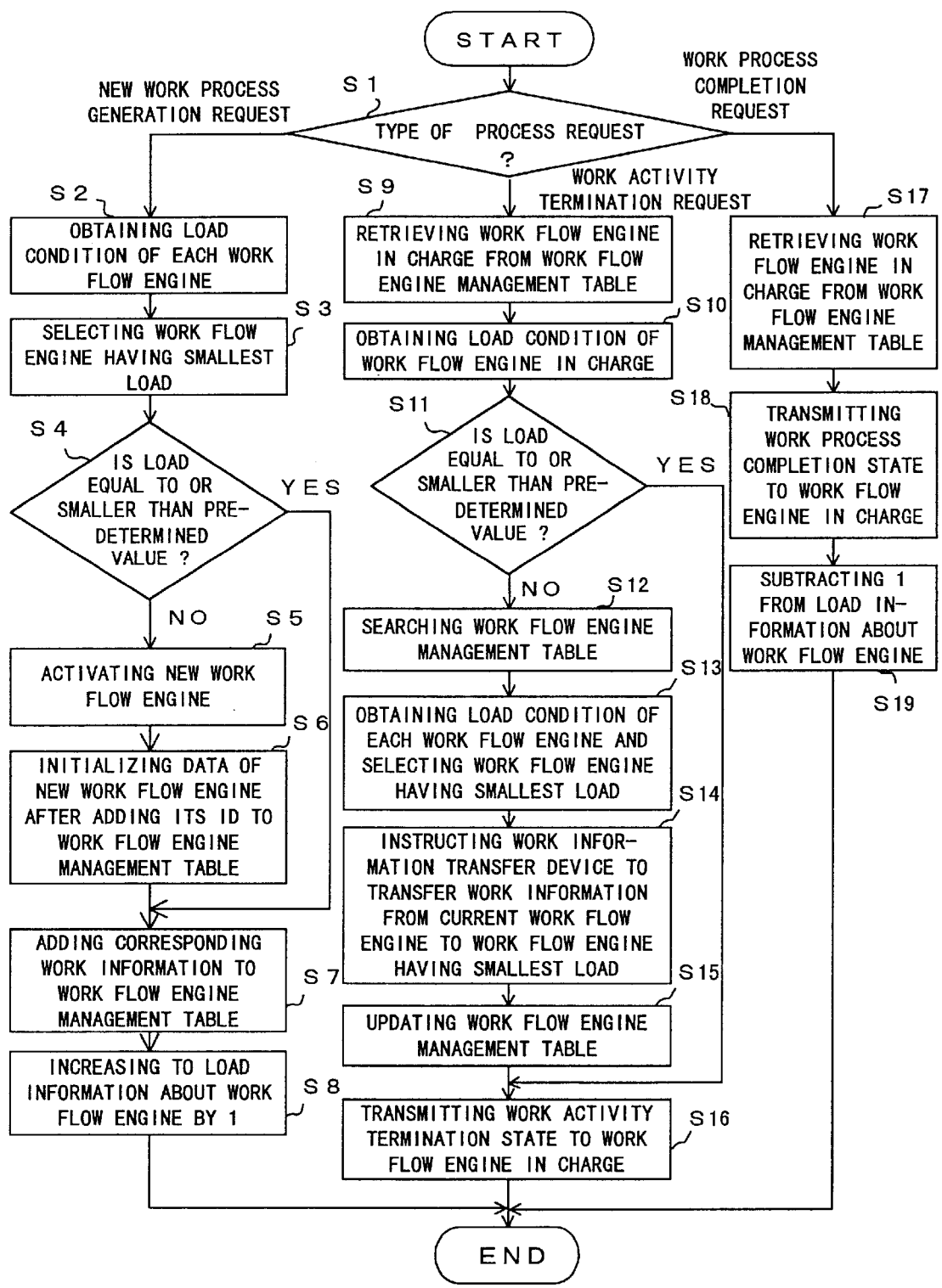
FIG. 13 is a flowchart showing the work flow engine management device according to the second embodiment of the work flow management apparatus of the present invention.

FIG. 13 is a flowchart of the process performed by the work flow engine management device 40 according to the second embodiment of the work flow management apparatus of the present invention. The process is described by referring to FIG. 13.

The work flow engine management device determines the type of process request received from the user system (S1). When it receives a request to generate a new work process from the user system, it performs the processes in and after step S2. When it receives work activity termination information from the user system, it performs the processes in and after step S9. When it receives work process completion information from the user system, it performs the processes in and after step S17.

When the work flow engine management device determines as a result of the determination in step S1 that it has received a new work process generation request, it obtains the load condition of each work flow engine (S2), and selects a work flow engine having the smallest load (S3).

The work flow engine management device determines whether or not the load of the selected work flow engine is equal to or smaller than a predetermined value (S4). If it is not equal to or smaller than a predetermined value as a result of the determination, then the processes in and after step S5 are performed. If it is equal to or smaller than a predetermined value, then the processes in and after step S7 are performed.

When the work flow engine management device determines as a result of the determination in S4 that the load is not equal to or smaller than a predetermined value, it activates a new inactivated work flow engine (S5), adds the ID of the newly activated work flow engine to the work flow engine management table, and initializes the data (S6).

Then, the work flow engine management device adds a work managed by the work flow engine to the work flow engine management table (S7), and adds 1 to the load information (number of loads) about the work flow engine (S8), thereby terminating the current process.

On the other hand, when the work flow engine management device determines as a result of the determination in step S1 that it has received a work activity termination request, it retrieves the work flow engine in charge from the work flow engine management table (S9), and computes the load condition of the work flow engine in charge (S10).

The work flow engine management device determines whether or not the load of the selected work flow engine is equal to or smaller than a predetermined value (S11). If it is not equal to or smaller than a predetermined value as a result of the determination, the processes in and after step S12 are performed. If it is equal to or smaller than a predetermined value, then the processes in and after step S16 are performed.

When the work flow engine management device determines as a result of the determination in step S11 that the load is not equal to or smaller than a predetermined value, it searches the work flow engine management table (S12), obtains the load condition of each work flow engine, and selects a work flow engine having the smallest load (S13).

Then, the work flow engine management device instructs the work information transfer device to transfer the work information from the work flow engine currently in charge to the selected work flow engine having the smallest load (S14).

Then, the work flow engine management device updates the information about the work flow engine in charge on the work flow engine management table when the work information is transferred (S15).

Then, the work flow engine management device transmits the work activity termination state to the work flow engine in charge (S16), thereby terminating the current process.

When the work flow engine management device determines as a result of the determination in step S1 that it has received a work process completion request, it retrieves the work flow engine in charge from the work flow engine management table (S17), transmits a work process completion state to the retrieved work flow engine in charge (S18), subtracts 1 from the load information about the work flow engine, thereby terminating the current process.

Figure 14:
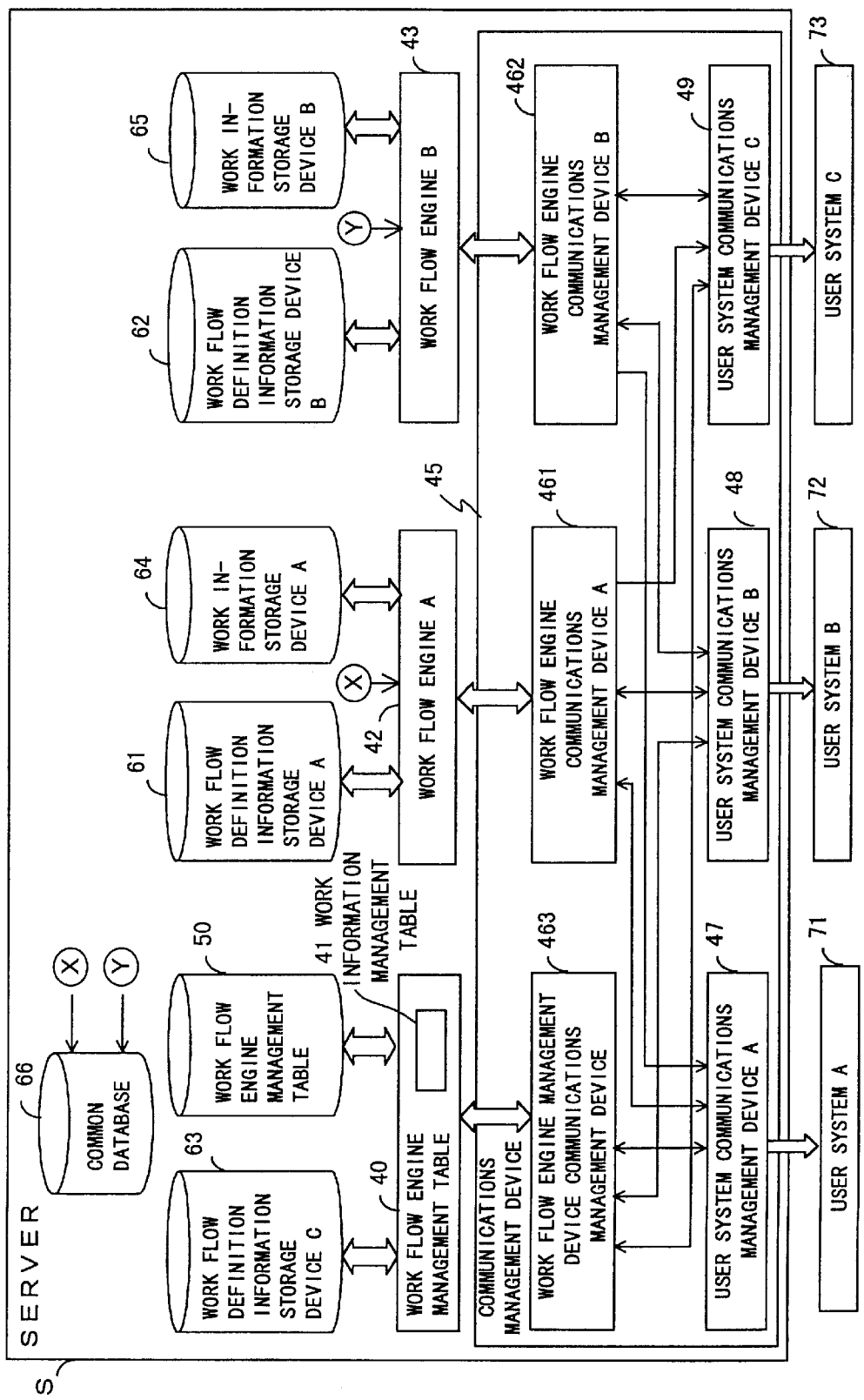
FIG. 14 shows the system configuration according to the third embodiment of the work flow management apparatus of the present invention.

FIG. 14 shows the system configuration according to the third embodiment of the work flow management apparatus of the present invention.

Described below is the internal configuration of the server S shown in FIG. 14.

With the configuration shown in FIG. 14, a work flow engine communications management device (461, 462) are provided for each work flow engine, and a work flow engine management device communications management device 463 is further provided.

In FIG. 14, the components also shown in FIG. 5 are assigned common identification numbers.

The work flow engine communications management device A 461 is a communications management device for a work flow engine A 42.

The work flow engine communications management device B 462 is a communications management device for work flow engine B 43.

The work flow engine management device communications management device 463 is a communications management device for the work flow engine management device 40.

With the configuration shown in FIG. 14, the ID of the destination work flow engine contained in the process information about the work activity transmitted from each of the user systems (71, 72, 73) is read in the user system communications management device (47, 48, 49), and the process information is transferred to the work flow engine communications management device (461, 462) corresponding to the work flow engine indicated by the ID. The work flow engine communications management device (461, 462) transmits the received process information to the corresponding work flow engine (42, 43). As for the work item addressed to each user system (71, 72, 73) from the work flow engine (42, 43), the work flow engine communications management device (461, 462) or the work flow engine management device communications management device (463) reads the user ID (ID of person in charge) contained in the work item and the ID of the destination user system communications management device in the current process. Furthermore, the ID of the next destination user system communications management device is obtained from the work information management table 41, and added to the work item. Then, work item is transmitted to the destination user system communications management device in the current process.

The flowchart of the work flow engine communications management device shown in FIG. 14 is similar to the flowchart shown in FIG. 10. The flowchart of the user system communications management device shown in FIG. 14 is similar to the flowchart shown in FIG. 11.

Figure 15:
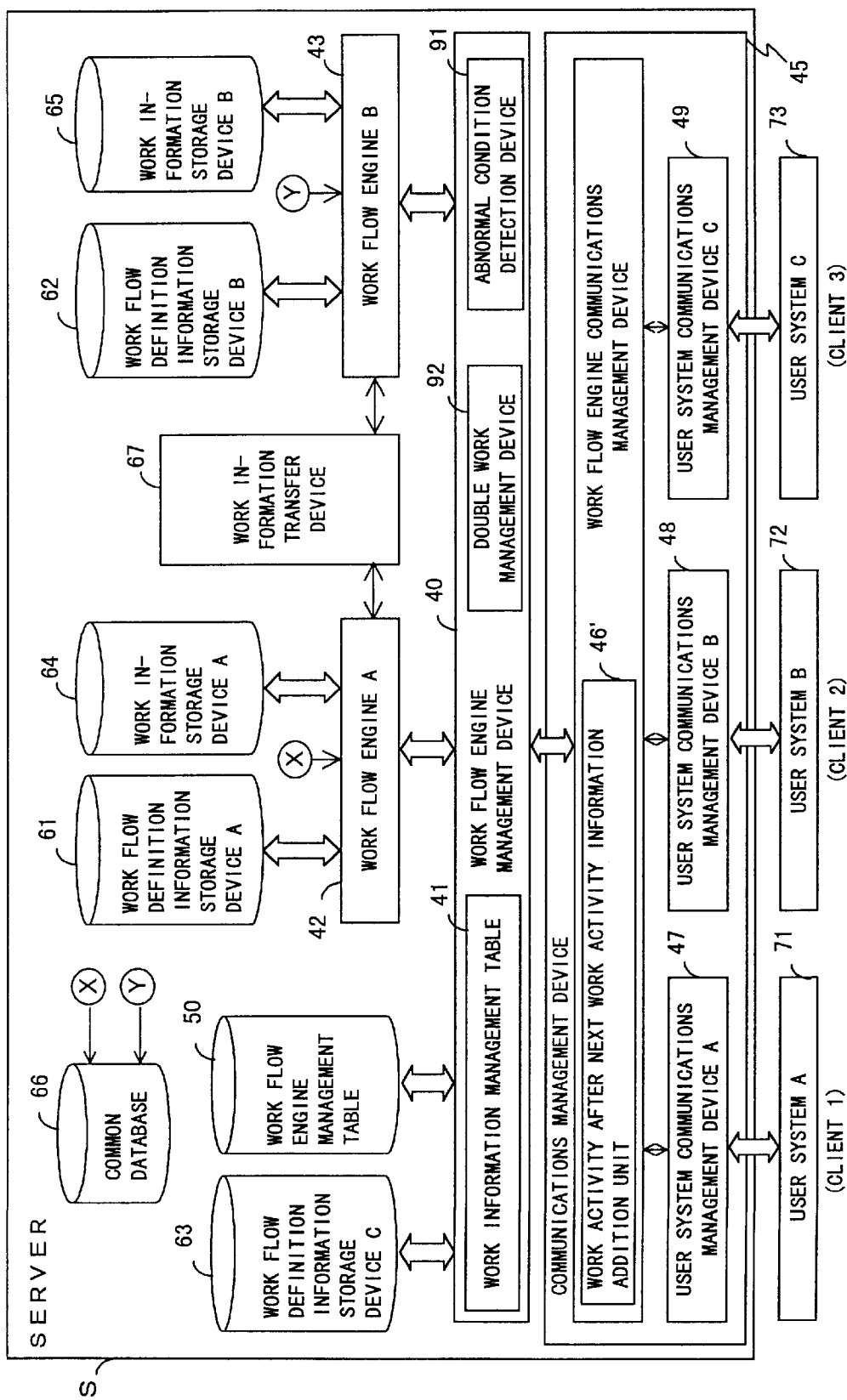
FIG. 15 shows the system configuration according to the fourth embodiment of the work flow management apparatus of the present invention.

FIG. 15 shows the system configuration according to the fourth embodiment of the work flow management apparatus of the present invention.

Described below is the internal configuration of the server S shown in FIG. 15.

FIG. 15 is different from FIG. 12 showing the system configuration according to the second embodiment of the work flow management apparatus of the present invention in that the work flow engine management device 40 comprises an abnormal condition detection device 91 for detecting an abnormal condition of the system and a double work management device 92.

In FIG. 15, the components also shown in FIG. 5 are assigned common identification numbers.

The abnormal condition detection device 91 detects an abnormal operation of a work flow engine.

The double work management device 92 manages information relevant to backup the process of the management of a work flow among work flow engines.

Figure 16:
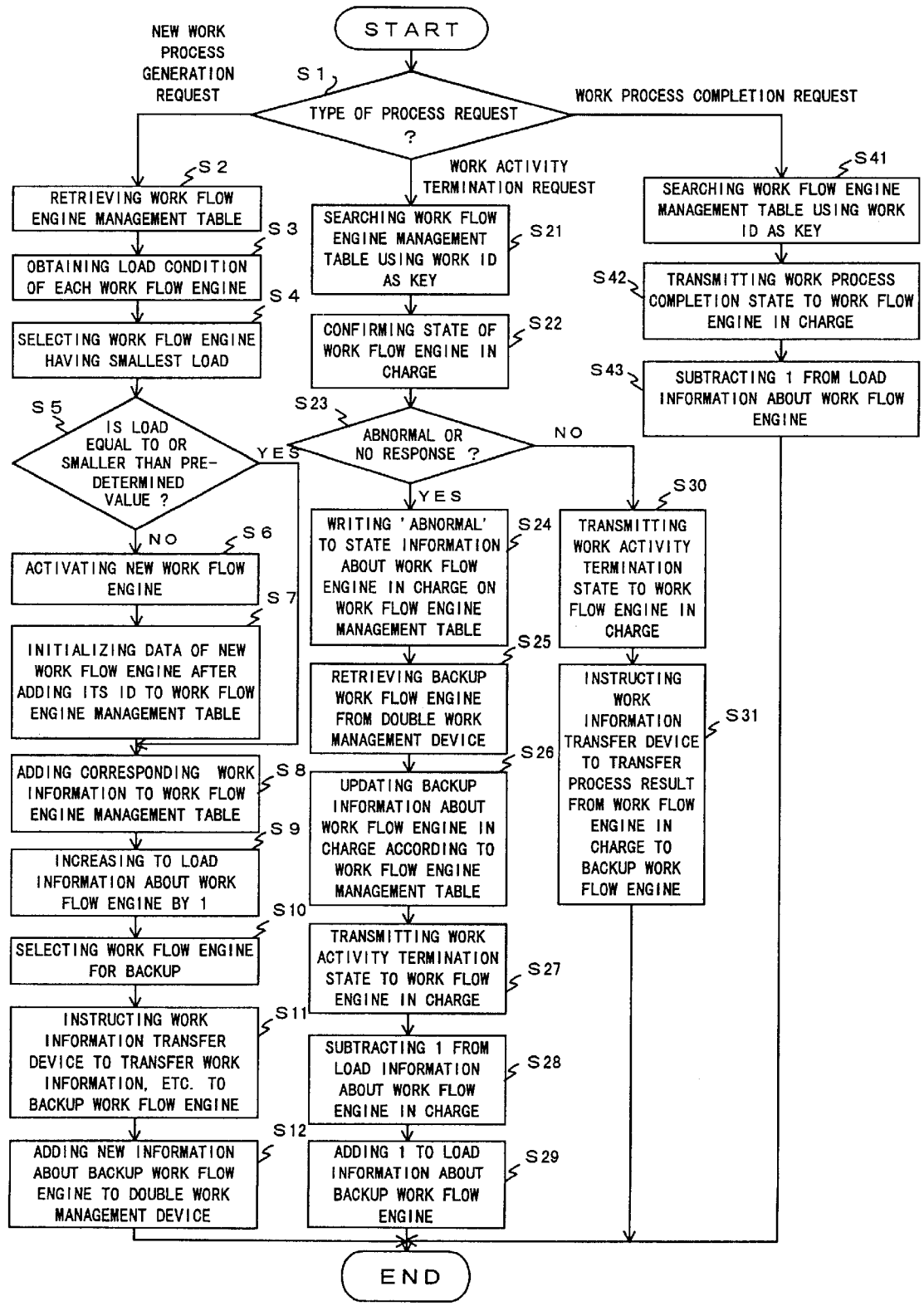
FIG. 16 is a flowchart showing the work flow engine management device according to the fourth embodiment of the work flow management apparatus of the present invention.

FIG. 16 is a flowchart of the process performed by the work flow engine management device 40 according to the fourth embodiment of the work flow management apparatus of the present invention. The process is described below by referring to FIG. 16.

First, the work flow engine management device determines the type of the process request received from the user system (S1). If it has received a new work process generation request from the user system, it performs the processes in and after step S2. If it has received a work activity termination request from the user system, it performs the processes in and after step S21. If it has received a work process completion request from the user system, it performs the processes in and after step S41.

When the work flow engine management device determines that a new work process generation request is received as a result of the determining process in step S1, it retrieves a work flow engine management table (S2), and then obtains a load condition of each work flow engine (S3).

As a result, the work flow engine management device selects a work flow engine having the smallest load (S4).

The work flow engine management device determines whether or not the selected work flow engine has a load equal to or smaller than a predetermined value (S5). Unless the load is equal to or smaller than the predetermined value as a result of the determination, the processes in and after step S6 are performed. If it is equal to or smaller than the predetermined value, then the processes in and after step S8 are performed.

When the work flow engine management device determines that the value of the load is not equal to or smaller than a predetermined value as a result of the determination in step S5, it activates a new work flow engine (S6), adds the ID of the new activated work flow engine to the work flow engine management table, and initializes the data (S7).

The work flow engine management device then adds the work information about the work flow engine to the work flow engine management table (S8), and increases the load information (number of loads) about the work flow engine by 1 (S9).

Then, the work flow engine management device selects a work flow engine for backup (S10), and instructs the work information transfer device to transfer work information, work flow definition, etc. to the selected work flow engine (S11).

Next, the work flow engine management device newly adds the information about the backup work flow engine to the double work management device (S12), thereby terminating the current process.

When the work flow engine management device determines that it has received a work activity termination request as a result of the determination in S1, it searches the work flow engine management table using the work ID as a key (S21).

Then it confirms the state of the work flow engine in charge (S22), checks whether or not the work flow engine in charge is in an abnormal state (S23). If it is in the abnormal state or no check results can be obtained, then the processes in and after step S24 are performed. If a check result that the work flow engine is not in the abnormal state can be obtained, then the processes in and after step S30 are performed.

If the work flow engine management device has recognized any abnormal condition in the work flow engine in charge as a result of the determination in step S23, then it writes 'abnormal' to the work flow engine state information on the work flow engine management table (S24).

Then, the work flow engine management device retrieves a work flow engine for backup from the double work management device (S25).

It updates the backup information according to the work flow engine information on the work flow engine management table (S26), transmits the work activity termination state to the work flow engine in charge (S27), subtracts 1 from the load information about the work flow engine in charge (S28), adds 1 to the load information about the backup work flow engine (S29), thereby terminating the current process.

If the work flow engine management device does not detect an abnormal condition in the work flow engine in charge as a result of the determination in step S23, then it transmits a work activity termination state to the work flow engine in charge (S30), and instructs the work information transfer device to transfer the process result at the work flow engine in charge to the backup work flow engine (S31), thereby terminating the current process.

When the work flow engine management device determines that it has received a work process completion request as a result of the determination in step S1, it searches the work flow engine management table using the work ID as a key (S41), transmits a work process completion state to the work flow engine in charge (S42), subtracts 1 from the load information about the corresponding work flow engine on the work flow engine management table (S43), thereby terminating the current process.

Figure 17:
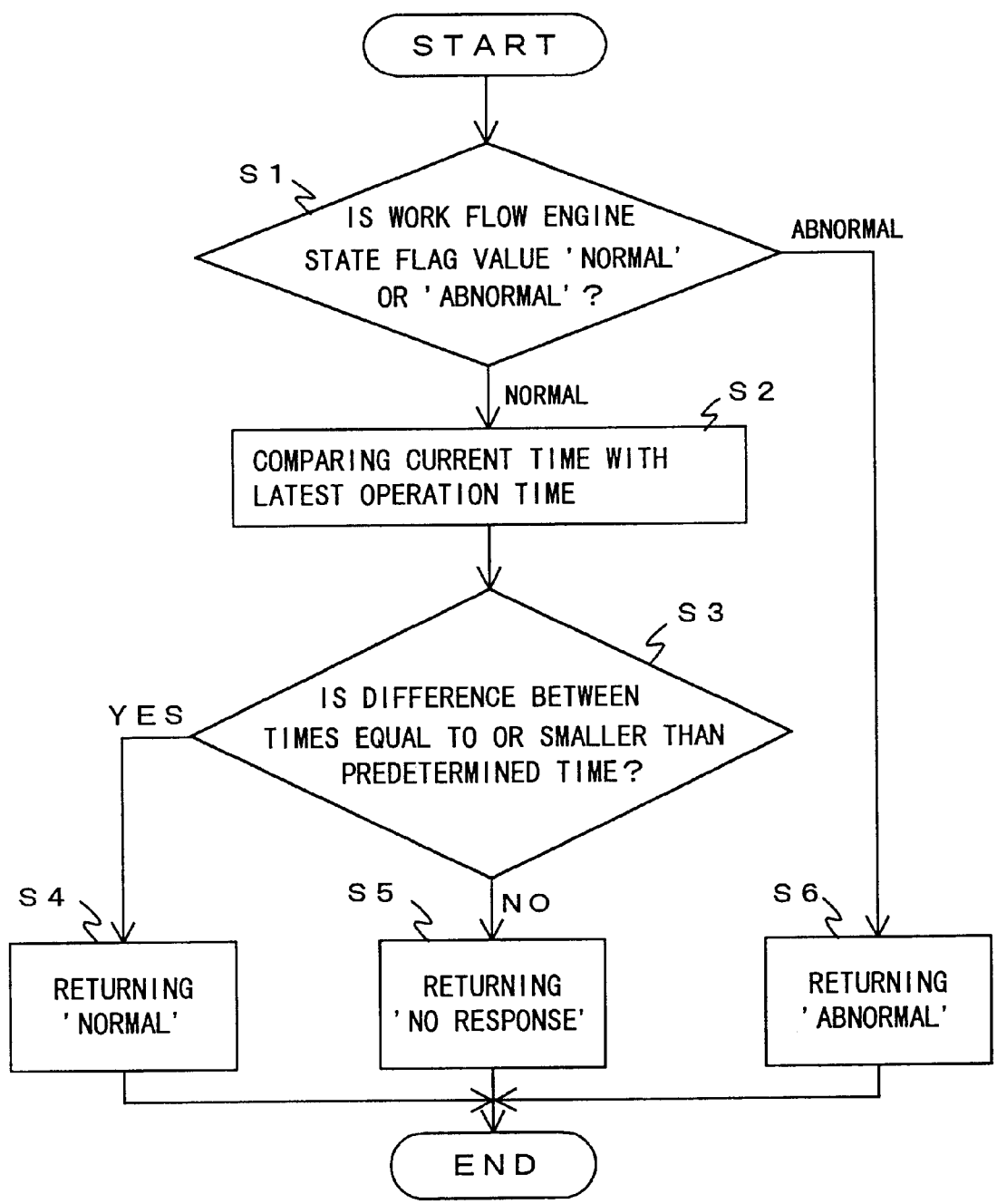
FIG. 17 is a flowchart showing the abnormal condition detection device according to the fourth embodiment of the work flow management apparatus of the present invention.

FIG. 17 is a flowchart of the process performed by the abnormal condition detection device 91 according to the fourth embodiment of the work flow management apparatus of the present invention. This flowchart is followed to perform the process in step S22 of the flowchart shown in FIG. 16 showing the process performed by the work flow engine management device 40. The process is described below by referring to FIG. 17.

First, the abnormal state detection device determines the value of a work flow engine state flag (S1). As described later, the flag is set by a work flow engine. If the value of the flag indicates a normal state as a determination result, then the processes in and after step S2 are performed. If the value of the flag indicates an abnormal state, then the process in step S6 is performed.

When the abnormal condition detection device determines as a determination result in step S1 that the value of the work flow engine state flag indicates a normal state, it compares the current time with the latest operation time at which the work flow engine performed the latest process (S2), and determines whether or not the difference between the times is equal to or smaller than a predetermined time (S3).

If the difference between the current time and the latest operation time is equal to or smaller than a predetermined time as a result of the determination in step S3, then the abnormal condition detection device determines that the work flow engine is in a normal condition, and returns 'normal' as the operation state of the work flow engine to the flowchart shown in FIG. 16 (S4), thereby terminating the current process.

On the other hand, if the difference between the current time and the latest operation time is not equal to or smaller than a predetermined time as a result of the determination in step S3, then the abnormal condition detection device determines that no answer has been received from the work flow engine, and returns 'no response' as the operation state of the work flow engine to the flowchart shown in FIG. 16 (S5), thereby terminating the current process.

If the abnormal condition detection device determines as a determination result in step S1 that the value of the work flow engine state flag indicates an abnormal state, then it returns 'abnormal' as the operation state of the work flow engine to the flowchart shown in FIG. 16 (S6), thereby terminating the current process.

Figure 18:
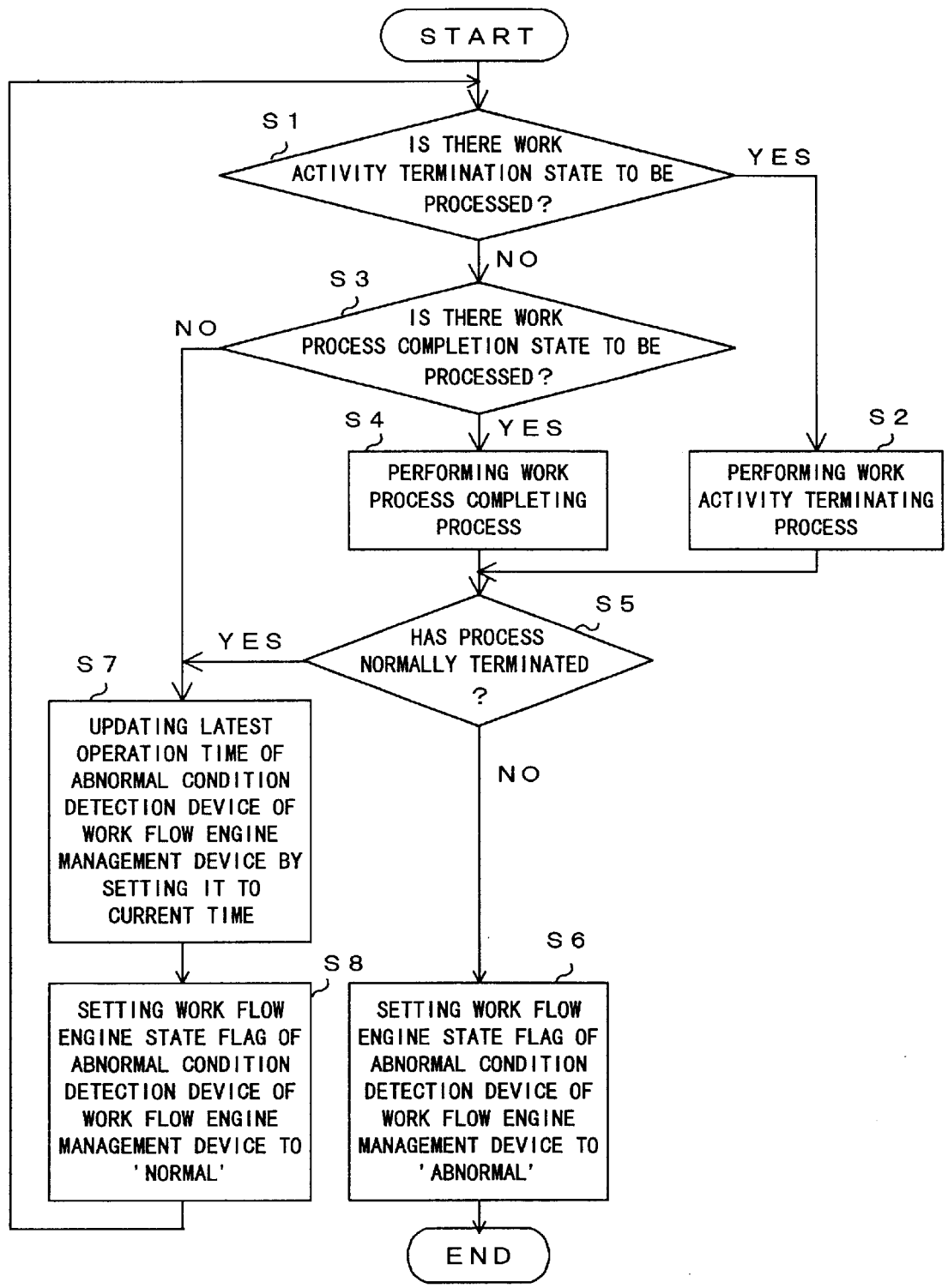
FIG. 18 is a flowchart showing the work flow engine according to the fourth embodiment of the work flow management apparatus of the present invention.

FIG. 18 is a flowchart of the process performed by the work flow engine (42, 43) according to the fourth embodiment of the work flow management apparatus of the present invention. The process is described below by referring to FIG. 18.

First, the work flow engine determines whether or not the termination state of the work activity to be processed exists (S1). If the termination state of the work activity to be processed exists as a result of the determination, then the process in step S2 is performed. On the other hand, if there are no termination states of the work activity to be processed, then the processes in and after step S3 are performed.

If the work flow engine determines as a determination result in step S1 that the termination state of the work activity to be processed exists, then it performs a process for the termination of the work activity (terminating the corresponding work activity and sending necessary information (for admission, rejection, etc.))(S2), and performs the processes in and after step S5.

On the other hand, if the work flow engine determines as a determination result in step S1 that the termination state of the work activity to be processed does not exist, then it determines whether or not a work process completion state (state in which a process can be performed when the work activity in a work process is completed) exists (S3). If the completion state of the work process to be performed exists as a result of the determination, then the processes in and after step S4 are performed. If the completion state of the work process to be performed does not exist, then the processes in and after step S7 are performed.

If the work flow engine determines as a result of the determination in step S3 that the state of the completion of the work process to be performed exists, then the work process completion process is performed (S4).

Then, the work flow engine determines whether or not the work activity terminating process in step S2 or the work process completion process in step S4 has been normally terminated (S5). If the process has been normally terminated as a result of the determination, then the processes in and after step S7 are performed. If the process has not been normally performed, the process in step S6 is performed.

When the work flow engine determines as a result of the determination in step S5 that the process has not been normally terminated, it sets to 'abnormal' the work flow engine abnormal state flag used to announce an abnormal condition using the abnormal condition detection device of the work flow engine management device (S6), thereby terminating the current process.

On the other hand, when the work flow engine determines as a result of the determination in step S5 that the process has been normally terminated, it updates for the current time the latest operation time of the work flow engine set in the abnormal condition detection device of the work flow engine management device (S7), sets the work flow engine state flag of the abnormal condition detection device of the work flow engine management device to 'normal' (S8), and then repeats the predetermined processes in and after step S1.

Figure 19:
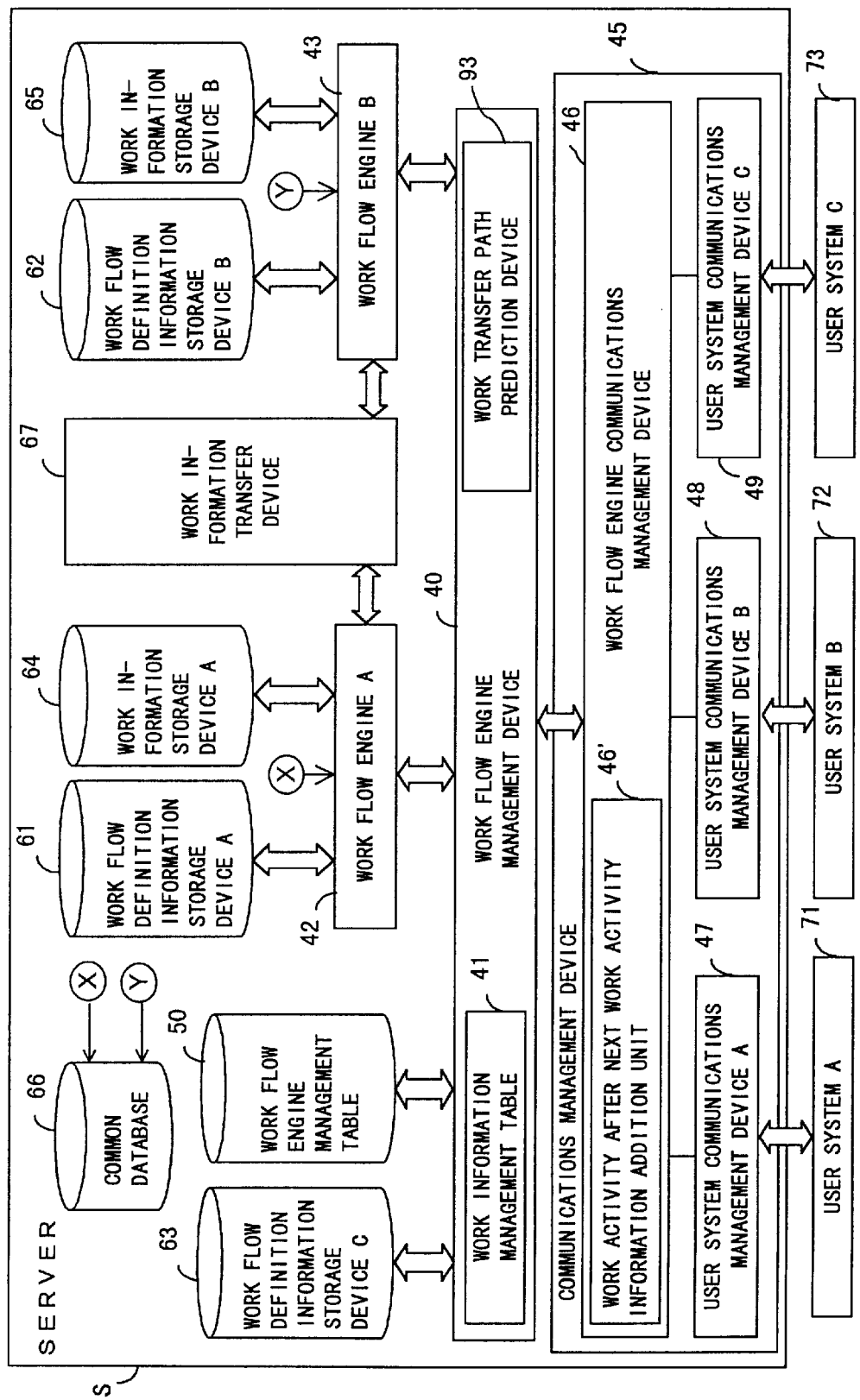
FIG. 19 shows the system configuration according to the fifth embodiment of the work flow management apparatus of the present invention.

FIG. 19 shows the system configuration according to the fifth embodiment of the work flow management apparatus of the present invention.

Described below is the internal configuration of the server S shown in FIG. 19.

FIG. 19 is different from FIG. 12 showing the system configuration according to the second embodiment of the work flow management apparatus of the present invention in that a work transfer path prediction device 93 is provided in the work flow engine management device 40.

In FIG. 19, the components also shown in FIG. 12 are assigned the common identification numbers.

The work transfer path prediction device 93 predicts the work activity after the next work activity.

Figure 20:
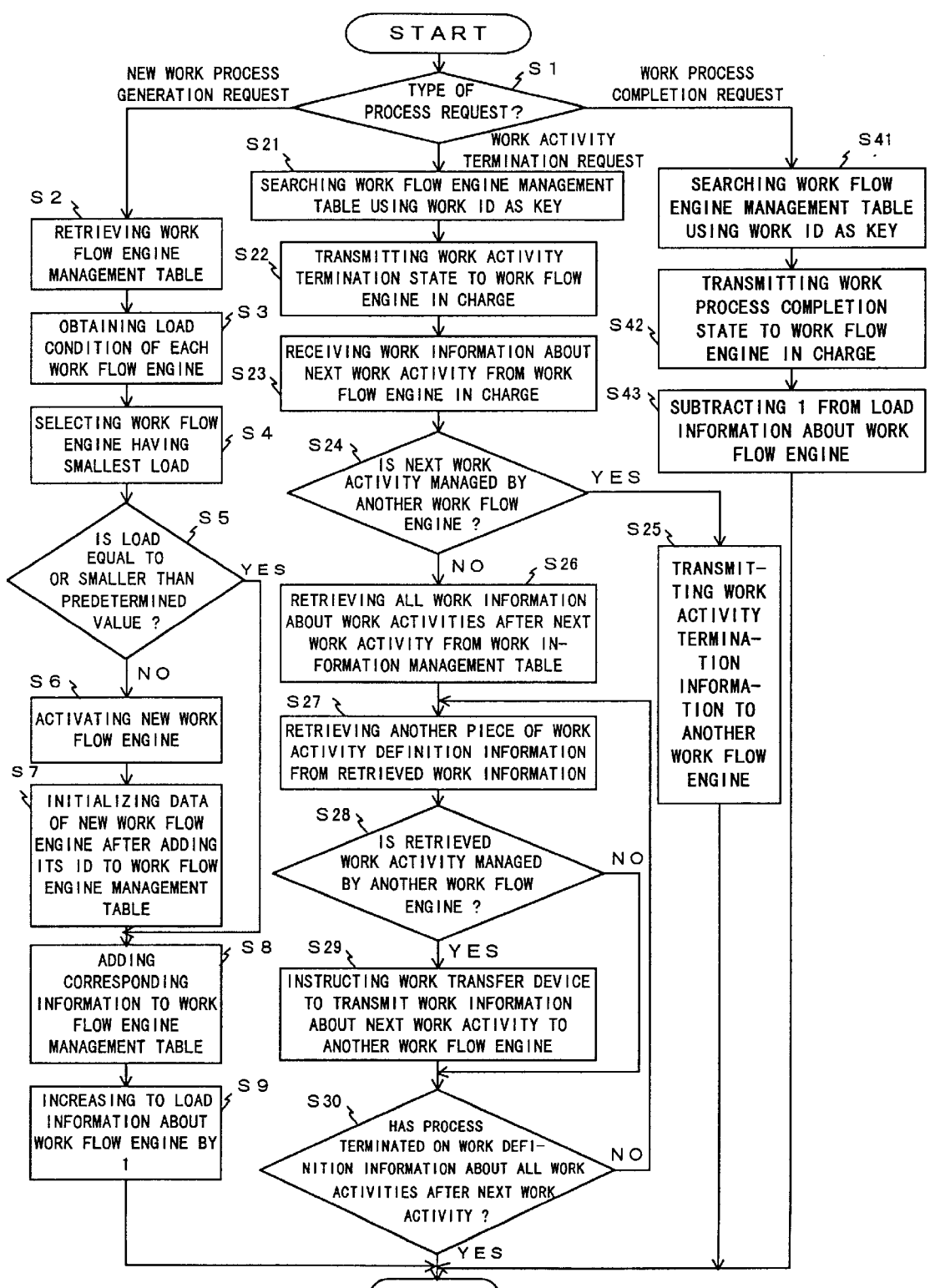
FIG. 20 is a flowchart showing the work flow engine management device according to the fifth embodiment of the work flow management apparatus of the present invention.

FIG. 20 is a flowchart of the process performed by the work flow engine management device 40 according to the fifth embodiment of the work flow management apparatus of the present invention. The process is described below by referring to FIG. 20.

First, the work flow engine management device determines the type of the process request received from the user system (S1). If it has received a new work process generation request from the user system, it performs the processes in and after step S2. If it has received a work activity termination request from the user system, it performs the processes in and after step S21. If it has received a work process completion request from the user system, it performs the processes in and after step S41.

When the work flow engine management device determines that a new work process generation request is received as a result of the determining process in step S1, it retrieves a work flow engine management table (S2), and then obtains a load condition of each work flow engine (S3).

As a result, the work flow engine management device selects a work flow engine having the smallest load (S4).

The work flow engine management device determines whether or not the selected work flow engine has a load equal to or smaller than a predetermined value (S5). Unless the load is equal to or smaller than the predetermined value as a result of the determination, the processes in and after step S6 are performed. If it is equal to or smaller than the predetermined value, then the processes in and after step S8 are performed.

When the work flow engine management device determines that the value of the load is not equal to or smaller than a predetermined value as a result of the determination in step S5, it activates a new work flow engine (S6), adds the ID of the new activated work flow engine to the work flow engine management table, and initializes the data (S7).

The work flow engine management device then adds the work information about the work flow engine to the work flow engine management table (S8), and increases the load information about the work flow engine by 1 (S9), thereby terminating the current process.

When the work flow engine management device determines that it has received a work activity termination request as a result of the determination in S1, it searches the work flow engine management table using the work ID as a key (S21), and transmits a work activity termination state to the work flow engine in charge (S22).

The work flow engine management device then receives the information about the next work activity transmitted from the work flow engine in charge (S23).

The work flow engine management device determines whether or not the next work activity indicated by the received information is managed by another work flow engine (S24). As a result of the determination, it performs the process in step S25 if the next work activity is managed by another work flow engine. It performs the processes in and after step S26 if the next work activity is not managed by another work flow engine.

When the work flow engine management device determines as a result of the determination in step S24 that the next work activity is managed by another work flow engine, it transmits the work activity termination information (information about the termination of the process of the work activity and the slips, specifications, etc. generated in the process of the work activity) to the work flow engine in charge of the next work activity (S25), thereby terminating the current process.

On the other hand, when the work flow engine management device determines as a result of the determination in step S24 that the next work activity is not managed by another work flow engine, it retrieves all management information about the work activity after the next work activity from the work flow engine management table (S26), and newly retrieves a piece of definition information about the work activity from the retrieved information (S27).

Then, the work flow engine management device determines whether or not the retrieved work activity is managed by another work flow engine (S28). If the work activity is managed by another work flow engine as a result of the determination, then the processes in and after step S29 are performed. On the other hand, if the work activity is not managed by another work flow engine, then the process in step S30 is performed.

When the work flow engine management device determines as a result of the determination in step S28 that the work activity is managed by another work flow engine, it instructs the work transfer device to transmit the work information about the next work activity to another work flow engine (S29).

Then, the work flow engine management device determines whether or not all the processes in steps S27 through S29 has been completed according to the work definition information about and after the next work activity (S30). If all these processes have been terminated as a result of the determination, then the current process terminates. On the other hand, if there is any unprocessed work definition information, the processes in and after step S27 are repeated.

If the work flow engine management device determines as a result of the determination in step S1 that a work process completion request has been received, then it searches the work flow engine management table using the work ID as a key (S41), transmits a work process completion state to the work flow engine in charge (S42), and subtracts 1 from the load information about the work flow engine in charge on the work flow engine management table (S43), thereby terminating the current process.

Described below is the work flow management system using a home server.

In the above described work flow management apparatus, a user system available by a user (person in charge of work) is predetermined, and a user-available work station is fixed.

When the user performs work using the user system, it is necessary to obtain information such as the format of a slip, etc. from a common database when the work is started. Since the process of retrieving the information and providing it to the user system is performed by a work flow management apparatus, the speed of the process performed at the start of the work is lowered when a number of users perform their jobs in parallel using the above described work flow management apparatus.

To solve the above described problem, the work flow management system described below has a home server which provides a plurality of user systems available to a user, and which reduces the load of the work flow management apparatus when it starts its work.

Figure 21:
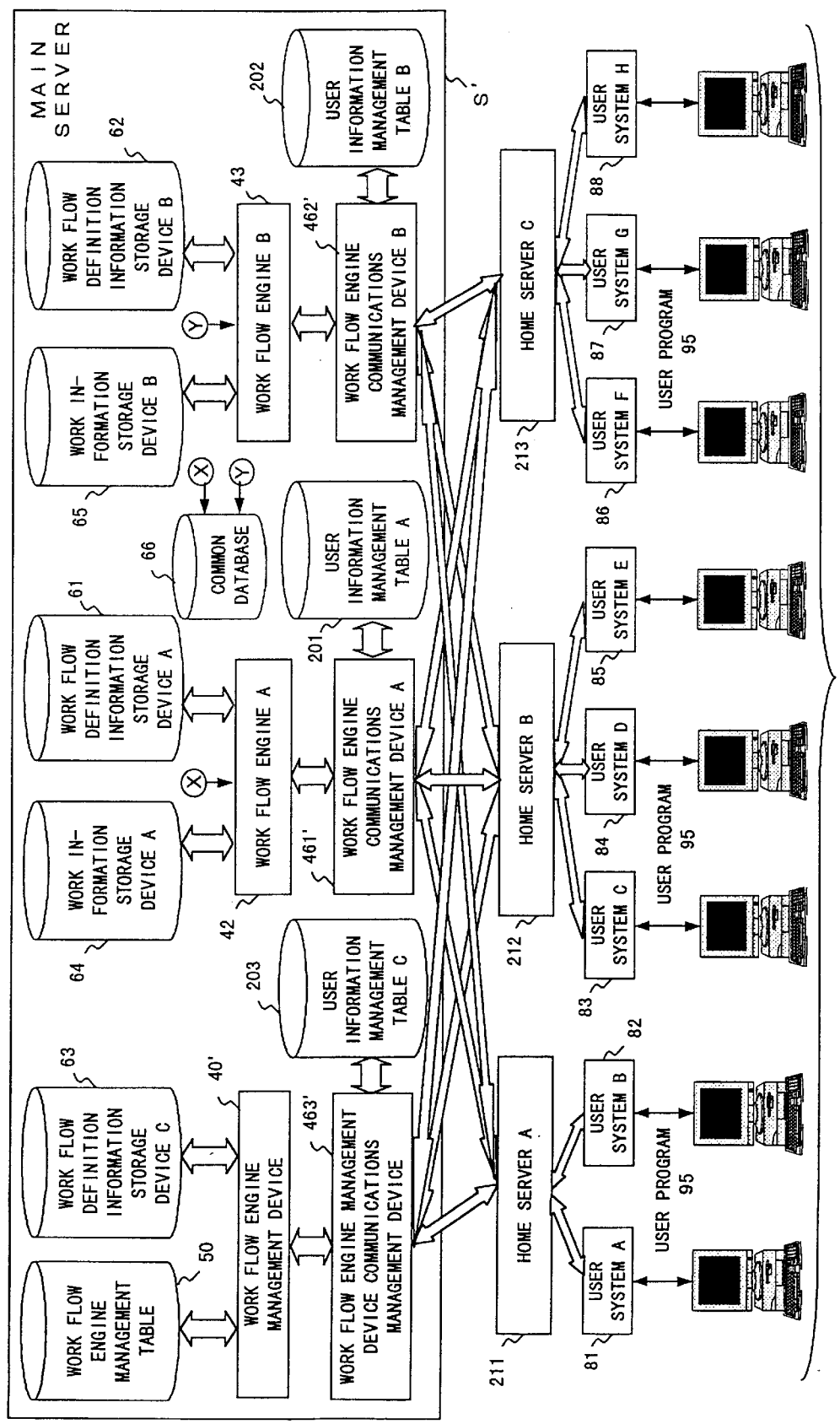
FIG. 21 shows the entire configuration according to the first embodiment of the work flow management system of the present invention.

FIG. 21 shows the entire configuration according to the first embodiment of the work flow management system of the present invention.

In FIG. 21, the components also shown in FIG. 14 are assigned the common identification numbers.

FIG. 22 shows an example of a definition of the work flow stored in each of the work flow definition information storage devices (63, 64, 65) shown in FIG. 21. In the example shown in FIG. 22, the work flow definition contains, for each work type ID assigned to each work process, a work flow ID, a work flow name, an ID of a person in charge of the work activity in the work flow, a work flow ID of the next work activity, etc.

FIG. 23 shows an example of work information stored in the work information storage device (61, 62) shown in FIG. 21. In the example shown in FIG. 23, the work information contains the information for each work ID defined by the work flow definition information storage device (63, 64, 65) about the work type ID corresponding to the work ID, a listing of work flows corresponding to the work type ID, the ID of the work flow engine in charge of the work process of the work ID, and the state of the progress of the work process of each work ID indicated by the work flow ID.

In FIG. 21, three home servers A, B, and C (211, 212, and 213) are connected to the main server S'. Any number of home servers can be connected to the main server S1.

The internal configuration of the main server S' shown in FIG. 21 is similar to the configuration of the server S according to the third embodiment of the work flow management apparatus of the present invention shown in FIG. 14. However, there is difference in the configuration of the communications management device 45 in the server S shown in FIG. 14.

The work flow engine communications management devices A and B (461', 462') control the communications between the work flow engines A and B (42, 43) and the home servers A, B, and C (211, 212, 213), and deliver the received information.

The work flow engine management device communications management device 463' controls the communications between the work information management device 41 and the home servers A, B, and C (211, 212, 213), and delivers the received information.

The work flow engine communications management devices A and B (461', 462') and the work flow engine management device communications management device 463' have respective user information management tables A, B, and C (201, 202, 203). FIG. 24 shows an example of a user information management table. As shown in FIG. 24, the user information management table stores a user ID of each user, the name of the user, the password of the user, and the ID of the home server (home server in charge) to which the user belongs.

Although not clearly shown in FIG. 21, information can be directly transmitted between the work flow engine management device communications management device 463' and the work flow engine A or B (42, 43) or work flow engine communications management device A or B (461', 462').

The home servers A, B, and C (211, 212, 213) are connected to the main server S'. The configurations of the home servers A, B, and C (211, 212, 213) are similarly designed. For example, each of them includes departments of a company such as a sales department, production management department, a production department, etc., and performs a part of the process performed by the work flow engine of the above described work flow management apparatus to attenuate the load of the work flow engine.

In FIG. 21, a home server A 211 has two user systems A and B (81, 82), a home server B 212 has three user systems C, D, and E (83, 84, 85), a home server C 213 has three user systems D, E, and F (86, 87, 88). These home servers are described later in detail, but their user systems are generated in respective home servers at a new connection request to a home server generated when a user executes a user program 95 to process a work activity at a client 90 connected corresponding to the user's home server such as a personal computer, etc. Therefore, the number of user systems of each of the home servers A, B, and C (211, 212, 213) is not limited to the number shown in FIG. 21. This holds true with other embodiments of the home servers described later.

With the configuration shown in FIG. 21, when a user system A 81 generated in the home server A 211 generates a new work process, the information about the generation of the work process is transmitted to the work flow engine management device 40' through the work flow engine management device communications management device 463'. The work flow engine management device communications management device 463' refers to a load state of the work flow engines A and B (42, 43) by referring to the work flow engine management table 50, selects the work flow engine in charge of the generated work process, and updates the work flow engine management table 50. Assume that the work flow engine A 42 has been selected. The selected work flow engine A 42 generates work information by referring to the work flow definition information storage device A 61 to add it to the work information table stored in the work information storage device A 64, generates a work item from the work information and the information stored in the common database 66, and transmits the work item to the home server to which the person in charge of the next work activity in the work flow belongs through the work flow engine A communications management device 461'.

For example, if a work activity termination state is generated in a user system C 83 generated in the home server B 212, then the work activity termination state is transmitted to the work flow engine in charge of the work through the home server B 212. Assuming that the work flow engine in charge is the work flow engine B 43, the work flow engine B 43 refers to the work flow definition information storage device B 62 and the work information storage device B 65 to check the next work activity, updates the work information table stored in the work information storage device B 65, generates the work item about the next work activity from the work information and the information stored in the common database 66, and transmits the work item to the home server to which the person in charge of the work activity belongs through a work flow engine B communications management device 462'. When the termination state of the latest work activity of the work process is transmitted from the user system C 83, no work item is generated or transmitted by the work flow engine B 43, but a work process completion message is transmitted to the work flow engine management device 40'. When the work flow engine management device 40' receives the work process completion message, it updates the work flow engine management table 50.

FIG. 25 is a flowchart of the process performed by the work flow engine management device 40' according to the first embodiment of the work flow management system of the present invention shown in FIG. 21. The process is described below by referring to FIG. 25.

First, the work flow management apparatus determines the type of the process request of the received information (S1). If a new work process generation request is received from a home server, then the processes in and after step S2 are performed. If a work completion request is received from a work flow engine, then the processes in and after step S11 are performed. According to the first embodiment of the work flow management system of the present invention, no work activity termination request is issued to the work flow engine management device.

When the work flow engine management device determines as a result of the determination in step S1 that a new work process generation request has been received, it searches the work flow engine management table (S2), obtains the load condition of each work flow engine, and selects a work flow engine having the smallest load (S3).

Then, the work flow engine management device adds the information of which the selected work flow engine takes charge to the work flow engine management table (S4), and adds 1 to the load information (number of loads) about the selected work flow engine (S5).

Thus, the work flow engine management device generates a new work process start request message (S6), adds to the message the ID of the selected work flow engine selected as the ID of the work flow engine in charge (S7), and transmits the message to the work flow engine management device communications management device (S8), thereby terminating the current process.

When the work flow engine management device determines as a result of the determination in step S1 that a work process completion request has been received, it searches the work flow engine management table using the work ID as a retrieval key (S11), and subtracts 1 from the load information about the work flow engine in charge of the management of the work process corresponding to the work ID on the work flow engine management table (S12), thereby terminating the current process.

Figure 26:
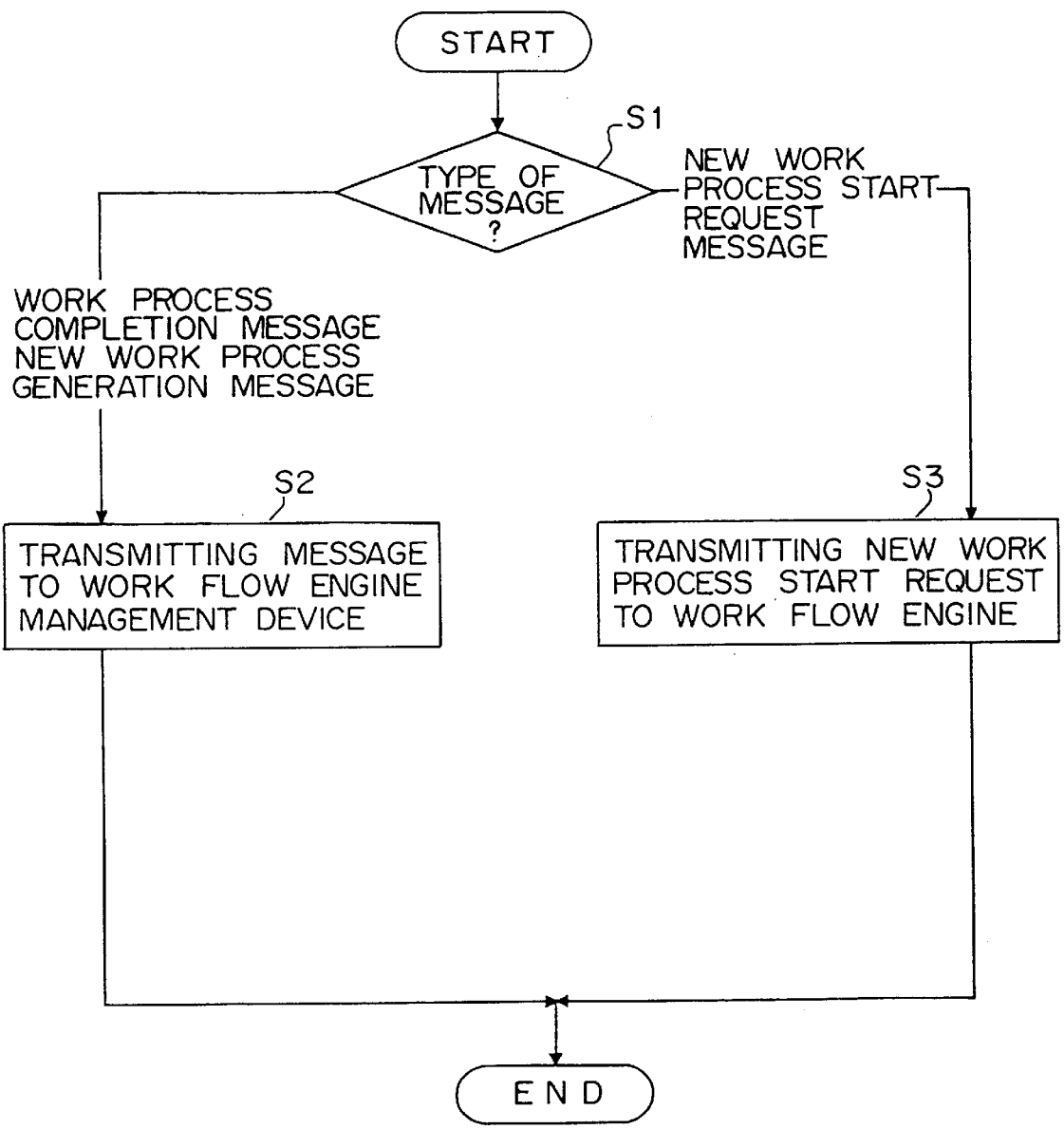
FIG. 26 is a flowchart showing communications management device for the work flow engine management device according to the first embodiment of the work flow management system of the present invention.

FIG. 26 is a flowchart of the process performed by the work flow engine management device communications management device 463' according to the first embodiment of the work flow management system of the present invention shown in FIG. 21. The process is described below by referring to FIG. 26.

First, the work flow engine management device communications management device determines the type of the received message (information) (S1). If, as a result of the determination, the received message is a work process completion message from a work flow engine or a new work process generation message from a home server, then the process in step S2 is performed. If the received message is a new work process start request message from the work flow engine management device, then the process in step S3 is performed.

When the work flow engine management device communications management device determines as a result of the determination in step S1 that the received message is a work process completion message or a new work process generation message, it transmits the message to the work flow engine management device (S2), and terminates the current process.

On the other hand, when the work flow engine management device communications management device determines as a result of the determination in step S1 that the received message is a new work process start request message, it transmits the message to the work flow engine indicated by the ID of the work flow engine in charge specified by the message (S3), and terminates the current process.

Figure 27:
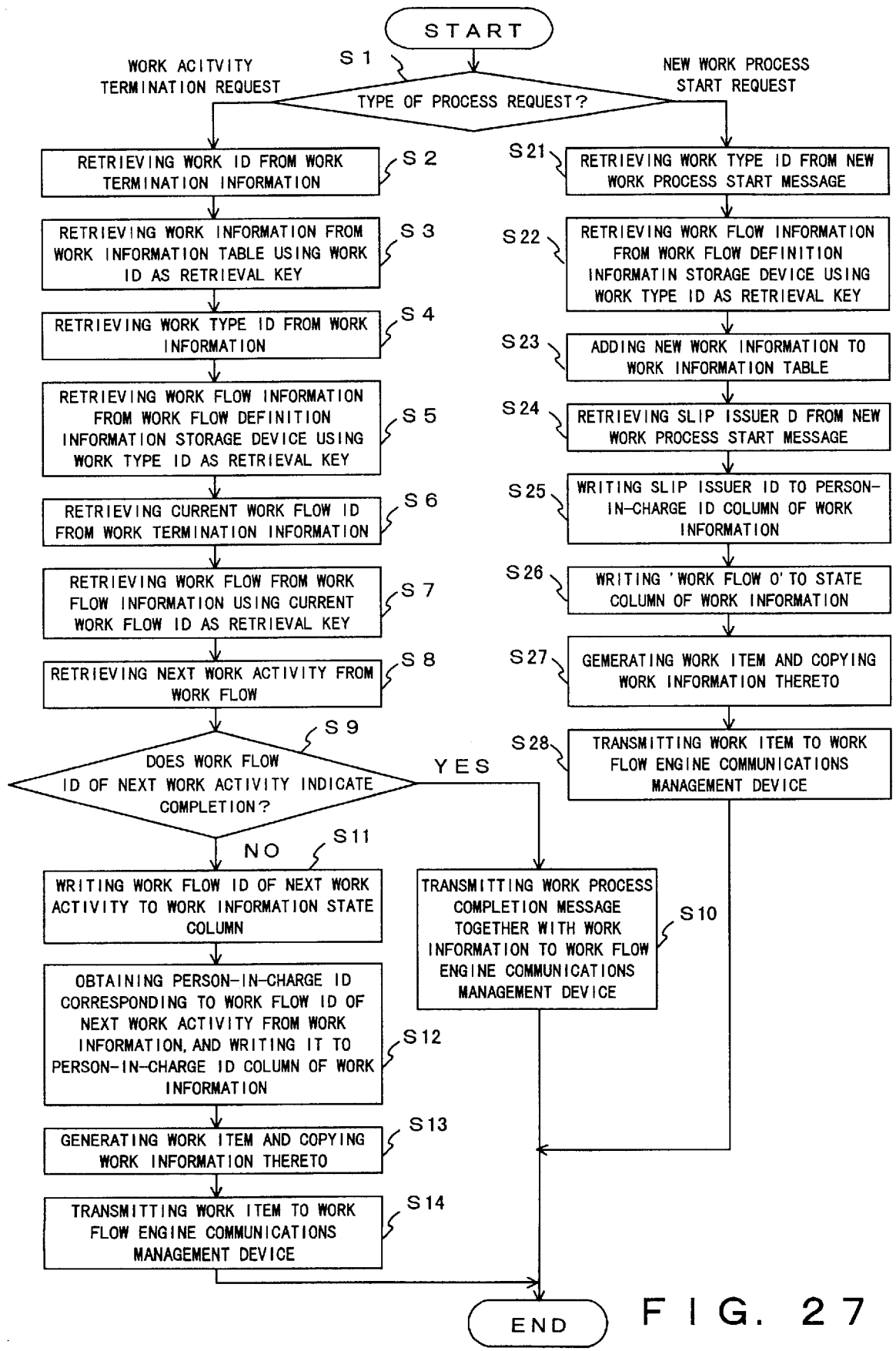
FIG. 27 is a flowchart showing the work flow engine according to the first embodiment of the work flow management system of the present invention.

FIG. 27 is a flowchart of the process performed by the work flow engines A and B (42, 43) according to the first embodiment of the work flow management system of the present invention shown in FIG. 21. The process is described below by referring to FIG. 27.

First, the work flow engine determines the type of the process request of the received information (S1). If it has received a work activity termination request from a user system, then it performs the processes in and after step S2. If it has received a new work process start request from the work flow engine management device, then it performs the processes in and after step S21.

If the work flow engine determines as a result of the determination in step S1 that it has received a work activity termination request, then it retrieves a work ID from the received work activity termination information (S2), and retrieves the corresponding information from the work information table stored in the work information storage device using the work ID as a retrieval key (S3). Furthermore, it retrieves a work type ID from the work information (S4), and then retrieves work flow information from the work flow definition information storage device using the retrieved work type ID as a retrieval key (S5). The work flow information is not retrieved directly from the work information to avoid such a problem that, for example, the work flow information contained in the work information can remain unchanged as the work information before the update even when an amendment is made to the work flow.

Then, the work flow engine retrieves the current work flow ID from the received work termination information (S6), retrieves the work flow of the work activity from the retrieved work flow information using the work flow ID as a retrieval key (S7), and retrieves the next work activity (S8).

The work flow engine determines whether or not the contents of the work of the next work activity corresponding to the retrieved work flow ID refer to the completion of the work process (S9). If the contents of the next work activity refer to the completion of the work process, then the process in step S10 is performed. If the contents of the next work activity do not refer to the completion of the work process, then the processes in and after step S11 are performed.

If the work flow engine determines as a result of the determination in step S9 that the next work activity refers to the completion of the work process, it transmits a work process completion message together with the work information to the work flow engine communications management device (S10), thereby terminating the current process.

In the above described work flow management apparatus, a user system issues a work process completion message. However, in the work flow management system using a home server, the work process completion message is replaced with a message, from a home server, of the termination of the latest work activity of a work process. The work flow engine of the main server recognizes the completion of the work process by detecting the 'completion' of the next work flow ID of the latest work activity.

Described below is the flowchart. When the work flow engine determines as a result of the determination in step S9 that the next work activity does not refer to the completion of the work process, it writes the work flow ID of the next work activity into the 'state' column of the work information indicating the progress of the work process (S11), obtains the ID of the person in charge (that is, the person in charge of the next work activity) corresponding to the work flow ID of the next work activity from the work information, and then writes it into the 'person-in-charge ID' column (S12).

Then, the work flow engine generates a work item by obtaining the information necessary for the next work activity (for example, the format of the slip or the specification of the product to be generated in the next work, etc.) from the work flow definition information storage device or the common database, copies necessary information from the work information to the work item (S13), and transmits the work item to the work flow engine communications management device (S14), thereby terminating the current process.

On the other hand, if the work flow engine determines as a result of the determination in step S1 that a new work process start request has been received, it retrieves a work type ID from the received new work process start message (S21), and retrieves the work flow information from the work flow definition information storage device using the work type ID as a retrieval key (S22).

Then, the work flow engine adds new work information to the work information table (S23), retrieves the ID of the slip issuing person of the work process from the received new work process start message (S24), writes the slip issuer ID into the 'person-in-charge ID' column of the work information (S25), and then writes the work flow ID corresponding to the 'work flow 0' into the 'state' column of the work information (S26).

Next, the work flow engine generates a work item, copies necessary information from the work information to the work item (S27), transmits the work item to the work flow engine communications management device (S28), and terminates the current process.

Figure 28:
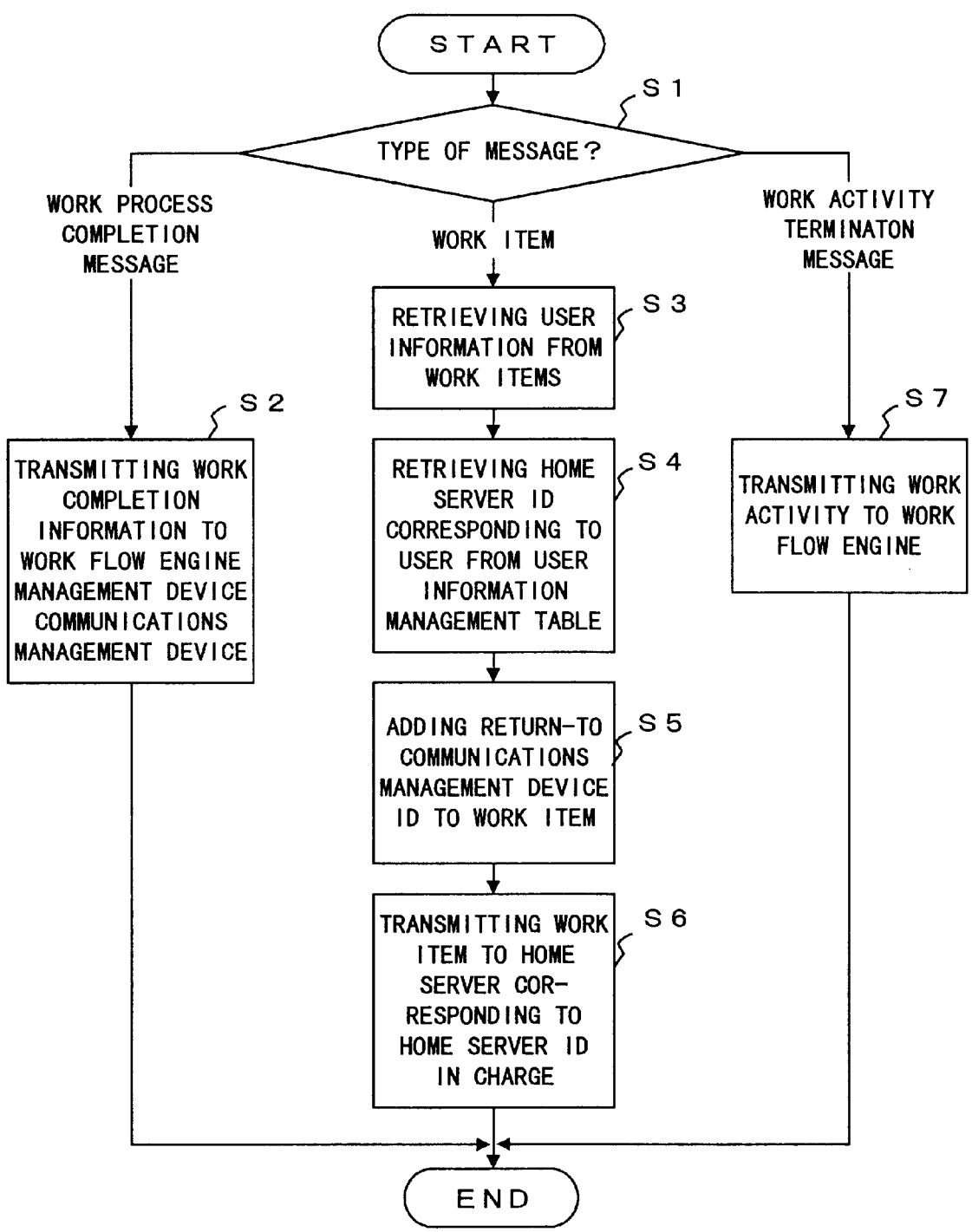
FIG. 28 is a flowchart showing communications management device for the work flow engine according to the first embodiment of the work flow management system of the present invention.

FIG. 28 is a flowchart of the process performed by the work flow engine communications management devices A and B (461', 462') according to the first embodiment of the work flow management system of the present invention shown in FIG. 21. The process is described below by referring to FIG. 28.

First, the work flow engine communications management device determines the type of the received message (S1). If it determines that the received message is a work process completion message from a work flow engine, then it performs the process in step S2. If the received message refers to a work item from a work flow engine, then the processes in and after step S3 are performed. If the received message is work activity termination information from a home server, then the process in step S7 is performed.

If the work flow engine communications management device determines as a result of the determination in step S1 that the received message is a work process completion message, then it transmits the message to the work flow engine management device communications management device (S2), thereby terminating the current process.

On the other hand, if the work flow engine communications management device determines as a result of the determination in step S1 that the received message refers to a work item, then it retrieves the information about the user (person-in-charge ID) for processing the work from the work item (S3), retrieves the ID of the home server corresponding to the user (home-server-in-charge ID) from the user information management table (S4), adds the returned-to communications management device ID (S5) to the work item, transmits the work item to the home server corresponding to the retrieved home-server-in-charge ID (S6), and terminates the current process.

When the work flow engine communications management device determines as a result of the determination in step S1 that the received message refers to work activity termination information, it transmits the message to the work flow engine (S7), thereby terminating the current process.

Described below is the internal configuration of the home servers A, B, and C (211, 212, 213) shown in FIG. 21.

Figure 29:
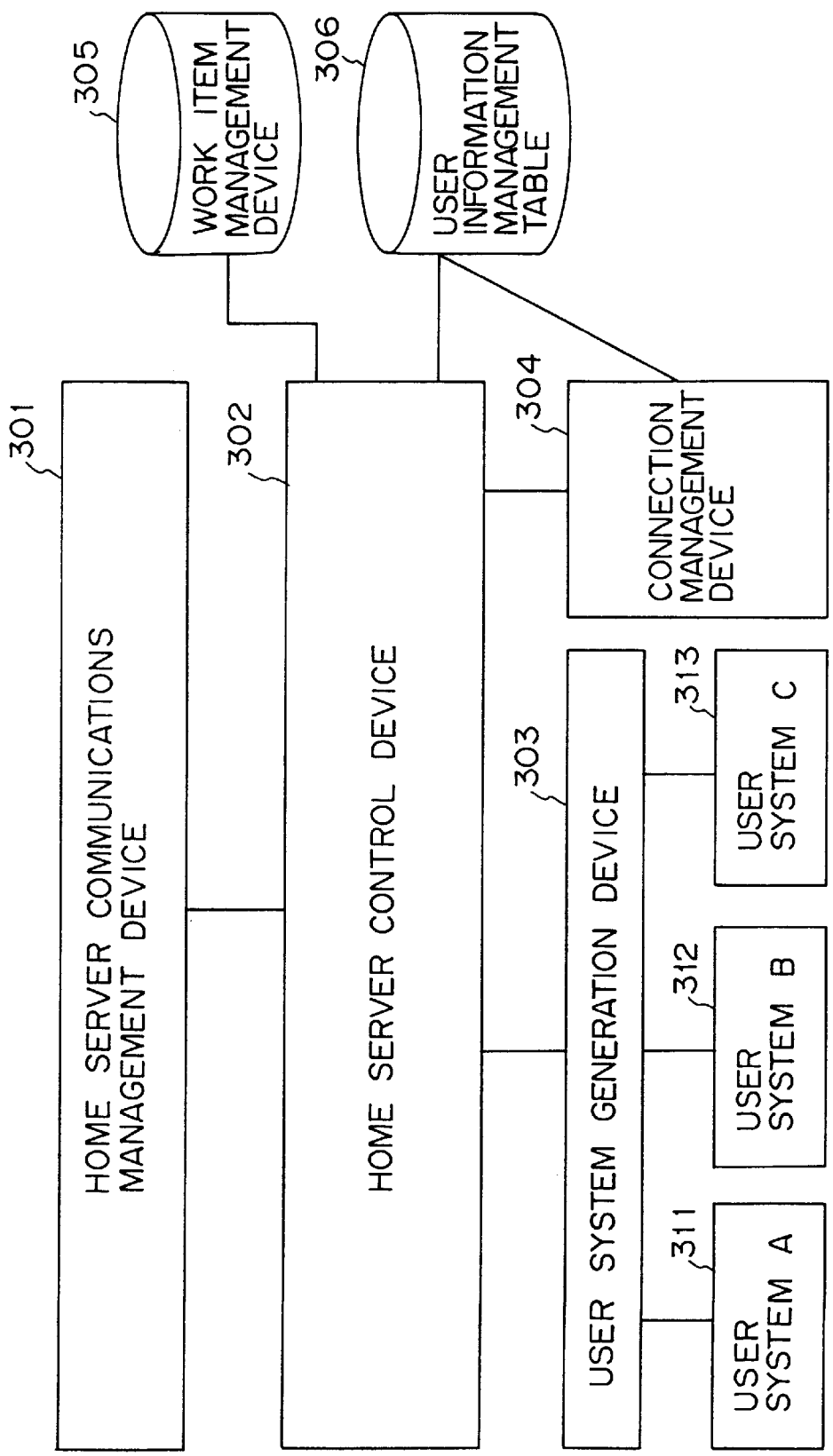
FIG. 29 shows the system configuration according to the first embodiment of the home server used in the work flow management system shown in FIG. 21.

FIG. 29 shows the system configuration according to the first embodiment of the home server used in the work flow management system shown in FIG. 21. This home server comprises a home server communications management device 301, a home server control device 302, a user system generation device 303, a connection management device 304, a work item management device 305, and a user information management table 306. In FIG. 29, three user systems A, B, and C (311, 312, 313) are generated.

The home server communications management device 301 controls the communications between the home server control device 302 and each of the communications management devices (461', 462', 463'), and distributes the transmitted information.

The home server control device 302 performs a process of generating each of the user systems (311, 312, 313) at a new connection request from the connection management device 304 to the home server of the user, a process of transmitting to the home server communications management device 301 a new work process generation request from each of the user systems (311, 312, 313) to the work flow engine management device 40'; a process of storing the work item transmitted from the each of the work flow engines (42, 43) through the home server communications management device 301 in the work item management device 305; a process of transmitting to the home server communications management device 301 the work activity termination state transmitted from each of the user systems (311, 312, 313) to the work flow engines (42, 43); a process of updating the contents stored in the work item management device 305, etc.

The user system generation device 303 generates a new user system from the work item transmitted according to an instruction from the home server control device 302.

The connection management device 304 checks whether or not the user is an authorized user when it receives a new connection request from the user to the home server through the user program. If it is an authorized user, then the new connection request is transmitted to the home server control device 302.

The work item management device 305 stores the work item which the user belonging to this home server takes charge of and is transmitted from the work flow engine (42, 43). It also retrieves a work item for each user from the stored work item using the user ID (person-in-charge ID) as a retrieval key. FIG. 30 shows an example of a work item stored in the work item management device 305. As shown in FIG. 30, the work item management device 305 stores a work ID of each work item; a work flow ID indicating the progress of the work process having the work ID; a work flow name corresponding to the work flow ID; a person-in-charge ID of the work flow; a work flow ID of the next work activity in the work flow; and an ID of the work flow engine in charge of the management of the work process. Although not shown in FIG. 30, a work item generated and transmitted from the work flow engine also contains necessary information in processing each work activity (for example, the format of a slip and the specification of a product generated in the next work activity, etc.). The work item management device 305 stores such information for each work item.

The user information management table 306 stores a user ID, a user name, a password, etc., of a user belonging to the home server. The information is stored by preliminarily copying the information stored in the user information management table C 203 in the work flow engine management device communications management device 463'.

With the configuration shown in FIG. 29, the user first operates a user program in the client corresponding (belonging) to the home server, and inputs his or her user ID and password. The connection management device 304 checks the input user ID and password using the user information management table 306. If the user belongs to the home server, a new user connection request is transmitted to the home server control device 302.

The home server control device 302 retrieves all work items of the work activity which the user takes charge of from the work items stored in the work item management device 305, and instructs the user system generation device 303 to generate a user system by transmitting the retrieved work items to the user system generation device 303. Thus, a user system is generated. In this example, a user system A 311 is generated.

The user processes a work item contained in the user system A 311 through a user program. When the process is completed, a work termination request is transmitted to the home server control device 302.

At this time, the home server control device 302 removes the work item of the work activity whose process has been completed from the work item management device 305 and the user system A 311, and transmits through the home server communications management device 301 the information about the termination of the work activity to the work flow engine of the main server in charge of the management of the work activity.

When the user generates a new work process in the user system A 311, the home server control device 302 transmits a new work process generation message to the work flow engine management device of the main server through the home server communications management device 301.

Furthermore, when a work item is transmitted from the work flow engine of the main server, the home server control device 302 adds the transmitted work item to the work item management device 305 and stores it therein.

FIG. 31 is a flowchart of the process performed by the home server control device 302 according to the first embodiment of the home server shown in FIG. 29. The process is described below by referring to FIG. 31.

The home server control device determines the type of the process request of the received information (S1, S3, S5, S7). If a new user connection request has been issued by the user who operates a user program, then the home server control device performs the new user connecting process (S2). If a new work process generation request has been issued from the user system, then it performs the new work process generating process (S4). If a work item generated by a work flow engine of the main server has been received, then it performs a work item adding process (S6). If a work activity termination request has been transmitted from the user system, then it performs the work activity terminating process (S8). After the termination of each process, a process of determining the type of process request is repeated on the subsequently received information.

Figure 32:
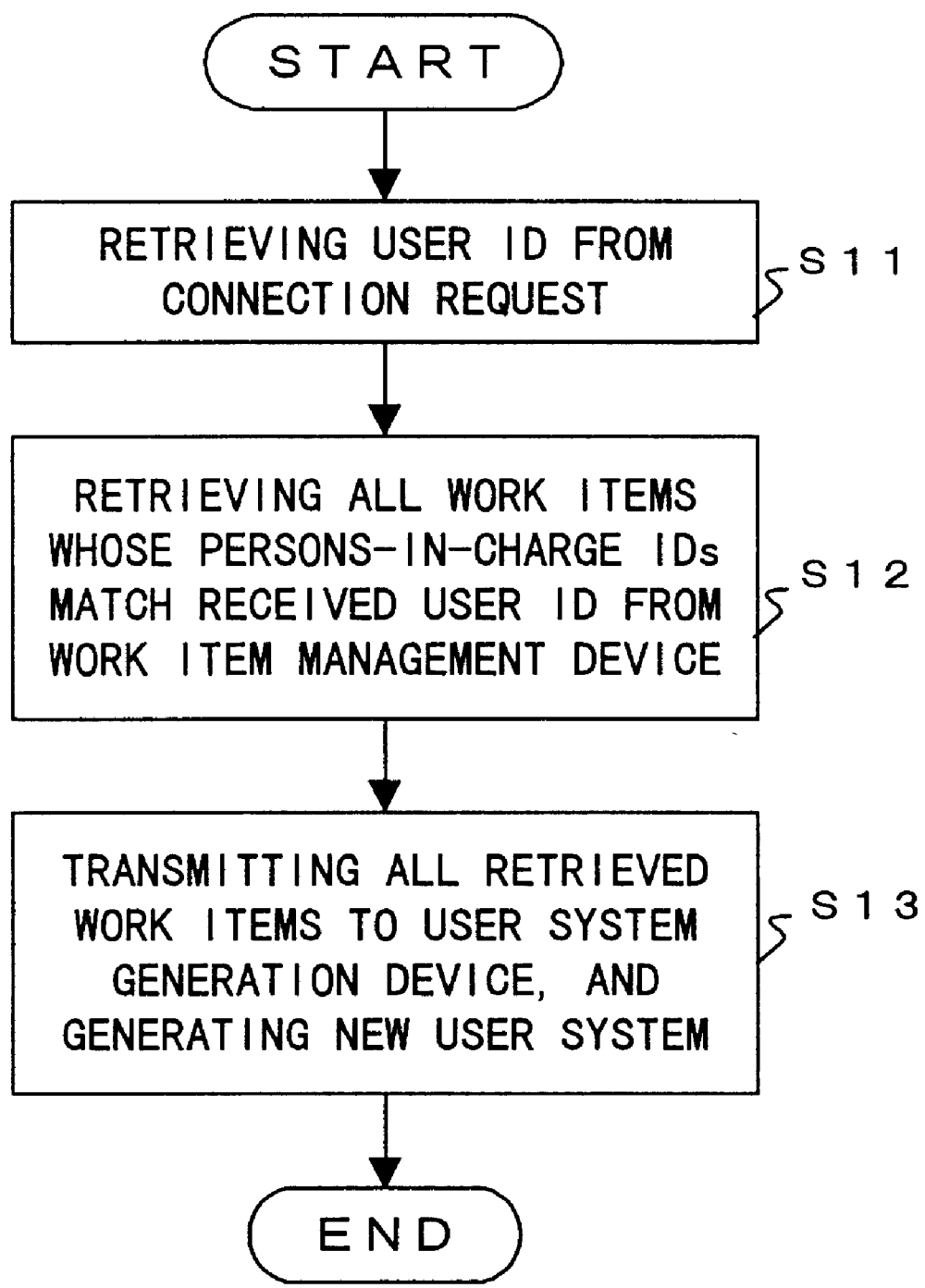
FIG. 32 is a flowchart showing the new user connecting process shown in FIG. 31.

FIG. 32 is a flowchart of a new user connecting process performed by the home server control device 302 indicated as the process in step S2 shown in FIG. 31. The process is described below by referring to FIG. 32.

First, the home server control device retrieves a user ID from the information about a new connection request from a user who operates a user program (S11), and retrieves all work items having the person-in-charge ID corresponding to the user ID from the work item management device (S12).

Then, the home server control device transmits all the retrieved work items to the user system generation device, generates a new user system (S13), and terminates the current process.

Figure 33:
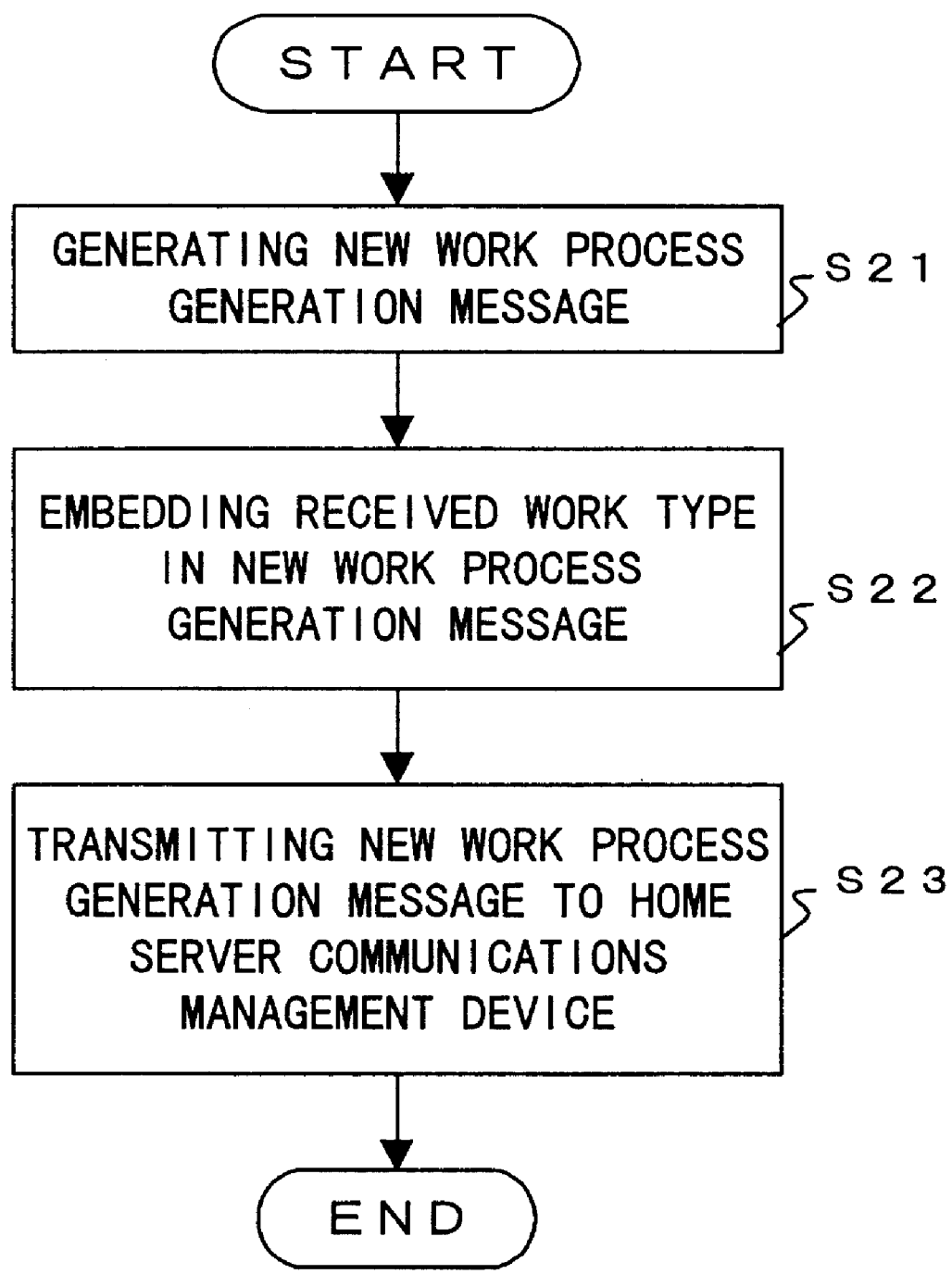
FIG. 33 is a flowchart showing the new work process generating process shown in FIG. 31.

FIG. 33 is a flowchart of the new work process generating process performed by the home server control device 302 as shown as the process in step S4 in FIG. 31. The process is described below by referring to FIG. 33.

The home server control device generates a new work process generation message (S21), embeds the work type indicated by the new work process generation request from the user system into the message (S22), transmits the new work process generation message to the home server communications management device (S23), and terminates the current process.

Figure 34:
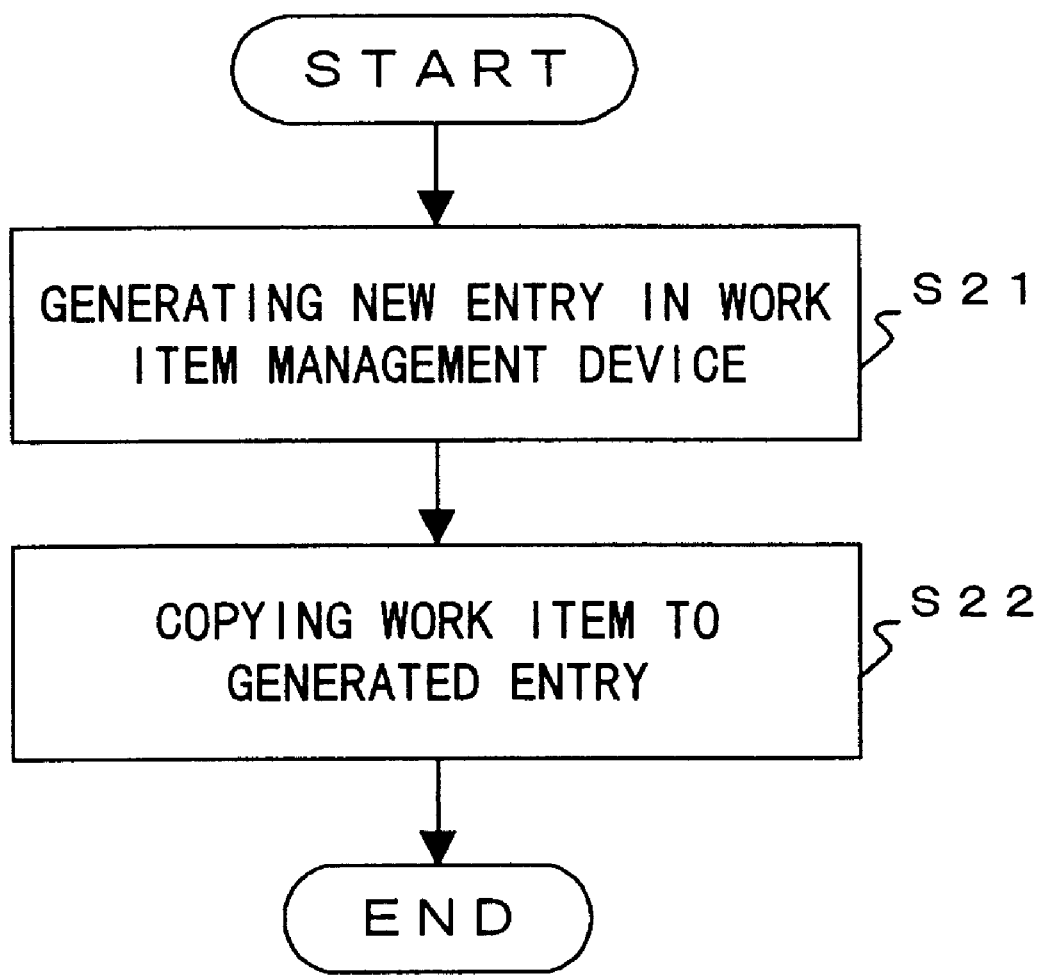
FIG. 34 is a flowchart showing the work item adding process shown in FIG. 31.

FIG. 34 is a flowchart of the work item adding process performed by the home server control device 302 as shown as the process in step S6 in FIG. 31. The process is described below by referring to FIG. 34.

The home server control device generates a new entry in the work item management device (S31), copies the received work item to the generated entry (S32), and terminates the current process.

FIG. 35 is a flowchart of the work activity terminating process performed by the home server control device 302 indicated as the process in step S8 in FIG. 31. The process is described below by referring to FIG. 35.

First, the home server control device obtains the work ID of the work process corresponding to the work activity which has terminated according to the received information about the work activity termination state (S41), and obtains the storage position in the work item management device which stores the work item corresponding to the work ID (S42).

Then, the home server control device removes the entry of the work item from the work item management device (S43), further removes the work item corresponding to the completed work activity from the user system which issued the work activity termination request (S44), transmits the received work activity termination state to the home server communications management device (S45), and terminates the process.

FIG. 36 is a flowchart of the process performed by the home server communications management device 301 according to the first embodiment of the home server shown in FIG. 29. The process is described below by referring to FIG. 36.

First, the home server communications management device determines the type of the received message (S1). If the received message is a new work process generation message from the home server control device as a determination result, then the process in step S2 is performed. If the received message refers to the information about the work activity termination state from the home server control device, then the processes in and after step S3 are performed. If the received message is a work item generated by the work flow engine of the main server, then the process in step S5 is performed.

When the home server communications management device determines as a result of the determination in step S1 that the received message is a new work process generation message, it transmits the message to the work flow engine management device communications management device (S2), and terminates the current process.

On the other hand, when the home server communications management device determines as a result of the determination in step S1 that the received message refers to the information about a work activity termination state, it retrieves the ID of the work flow engine in charge from the information about the work activity termination state (S3), and transmits the received information about the work activity termination state to the work flow engine communications management device corresponding to the ID of the work flow engine in charge (S4), thereby terminating the current process.

When the home server communications management device determines as a result of the determination in step S1 that the received message is a work item, it transmits the received work item to the home server control device (S5), and terminates the current process.

Figure 37:
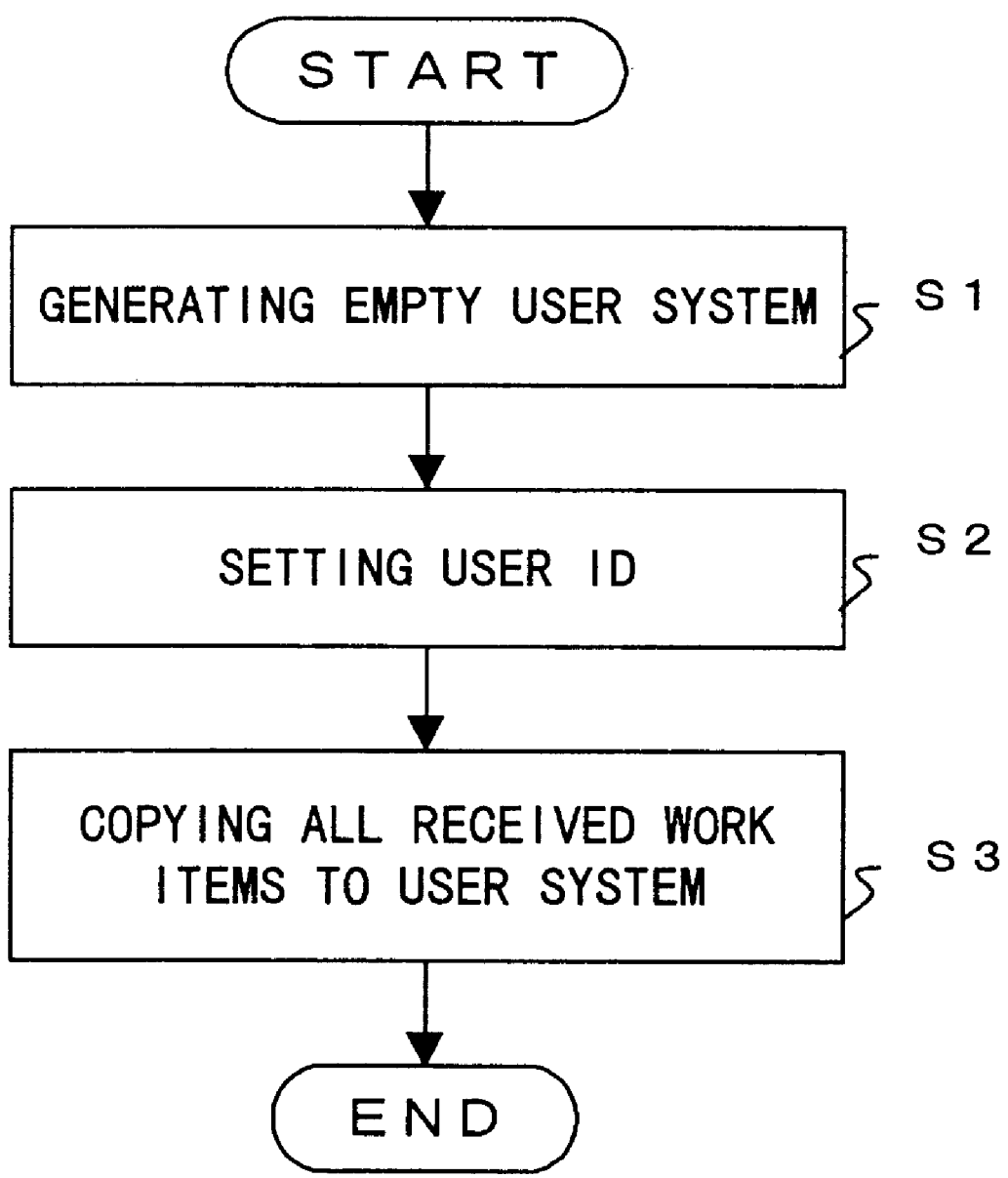
FIG. 37 is a flowchart showing the user system generation device according to the first embodiment of the home server.

FIG. 37 is a flowchart of the process performed by the user system generation device 303 according to the first embodiment of the home server shown in FIG. 29. The process is described below by referring to FIG. 37.

When a user system generation device receives an instruction from a home server control device, it generates an empty user system (S1), sets in the user system the user ID of the user operating a user program (S2), then copies all work items transmitted from the home server control device to the user system (S3), completes the user system, and terminates the process.

Figure 38:
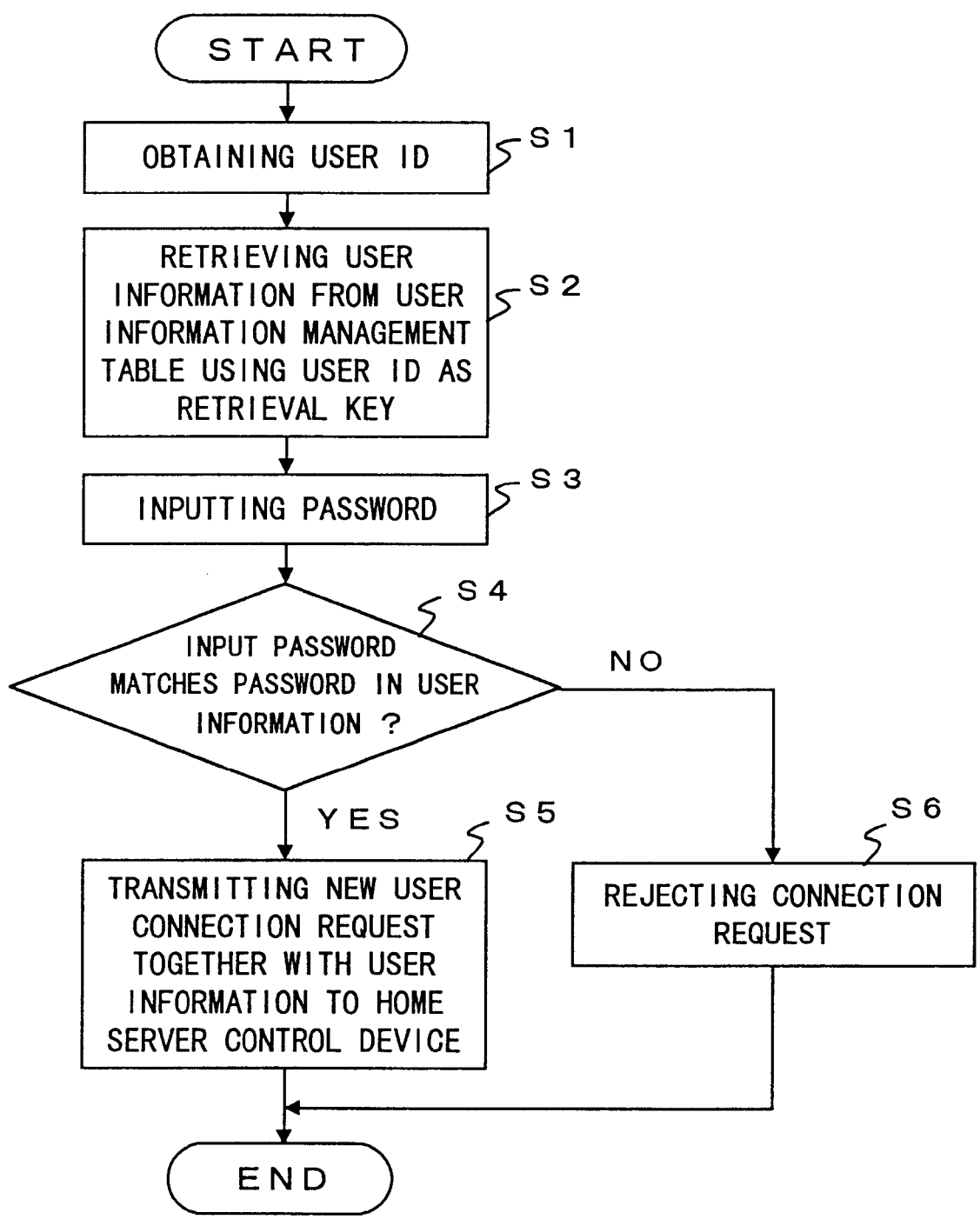
FIG. 38 is a flowchart showing the connection management device according to the first embodiment of the home server.

FIG. 38 is a flowchart of the process performed by the connection management device 304 according to the first embodiment of the home server shown in FIG. 29. The process is described below by referring to FIG. 38.

First, the connection management device obtains the user ID input by the user operating a user program (S1), searches the user information management table using the user ID as a retrieval key, and retrieves the user information about the user (S2).

Then, the connection management device obtains a password input by the user operating a user program (S3), and determines whether or not the input password matches the password indicated by the user information (S4).

When the connection management device determines as a result of the determination in step S4 that the input password matches the password indicated by the user information, it transmits a new user connection request together with the user information to the home server control device (S5), and terminates the process.

On the other hand, when the connection management device determines as a result of the determination in step S4 that the input password does not match the password indicated by the user information, it rejects the user connection request (S6), thereby terminating the process.

Figure 39:
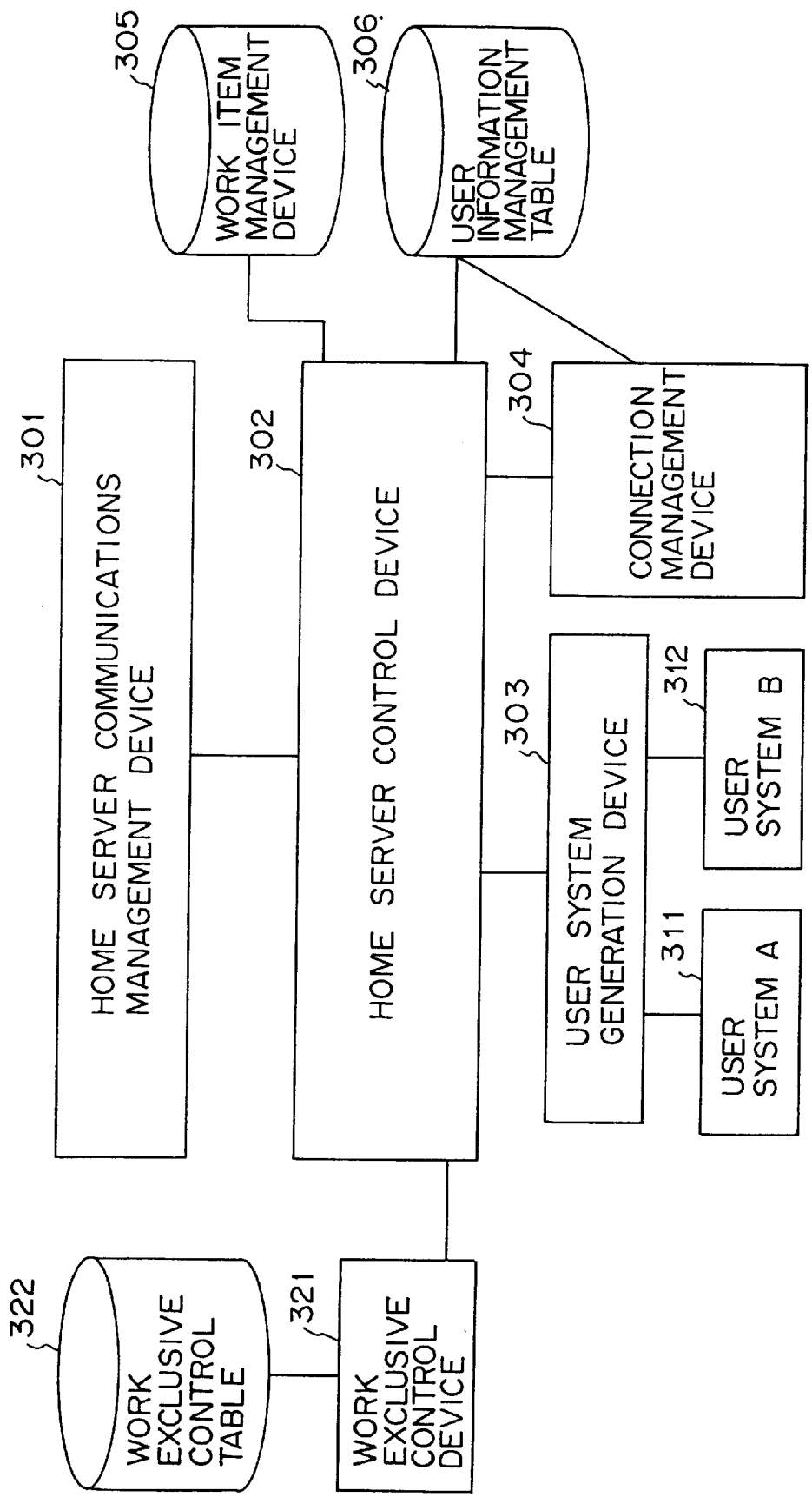
FIG. 39 shows the system configuration according to the second embodiment of the home server used in the work flow management system shown in FIG. 21.

FIG. 39 shows the system configuration according to the second embodiment of the home server used in the work flow management system shown in FIG. 21.

In FIG. 39, the components also used in the system configuration according to the first embodiment of the home server shown in FIG. 29 are assigned the common identification numbers.

The configuration according to the second embodiment of the home server shown in FIG. 39 is different from the configuration according to the first embodiment of the home server shown in FIG. 29 in that it includes a work exclusive control device 321 and a work exclusive control table 322. Although the numbers of user systems are different between these configurations, it is not an essential difference because only the numbers of the user systems generated by the user system generation device 303 are different between the configurations (the difference in number of user systems also appears in another embodiment of the home server as described later).

In the example in each of the above described work processes, the number of persons in charge of a work activity in a work flow is limited to one. However, in an actual work process, there can be a plurality of persons in charge of a work activity such as an approval by proxy, etc. In such a case, when a person in charge starts processing a work activity, another person in charge has to be controlled not to start the work activity to prevent a plurality of persons from concurrently performing the same work activity. The control in the work flow management is referred to as work exclusive control.

The work exclusive control has been performed by a work flow engine. Therefore, the work exclusive control has been a load of the work flow engine. Additionally, the work flow engine has to spend some time in notifying a user who performs the work activity of the permission or rejection of the start of the activity.

The feature of the second embodiment of the home server shown in FIG. 39 resides in that the work exclusive control is performed by a home server, thereby attenuating the load of the work flow engine when the work exclusive control is performed, and thus improving the response in notifying the user who performs the work activity of the process result of the exclusive control.

In FIG. 39, the work exclusive control device 321 searches the work exclusive control table 322 for a specific work activity to determine whether or not a user has started processing the work activity and return a determination result to the home server control device 302.

The work exclusive control table 322 stores the state of the progress of a work activity started by any person in charge. FIG. 40 shows an example of the work exclusive control table. As shown in FIG. 40, the work exclusive control table shows the work ID, the state (current work flow), and the work flow name of the work process of the work activity started by any person in charge, the ID of the person in charge of the work activity of the current work flow, and the process state of the work activity of the current work flow. The process state can be 'in process' indicating the state in which a person in charge is actually performing a process, and 'in suspension' indicating the state in which a person in charge has started performing a process, but has suspended the process for any reason.

With the configuration shown in FIG. 39, when a user starts processing a work activity using, for example, the user system A 311, a process start request is transmitted to the home server control device 302. The home server control device 302 requests the work exclusive control device 321 to allow the home server control device 302 to start processing the work activity. The work exclusive control device 321 refers to the work exclusive control table 322 and checks whether or not another person in charge has started processing the work activity. If it determines that the process has not been started by any other person in charge, then it transmits a notification of the permission to start the process to the home server control device 302, and adds the information about the newly started work activity to the work exclusive control information stored in the work exclusive control table 322. If the work activity has already been started, then the home server control device 302 is notified of the rejection of the start of the process. The home server control device 302 notifies the user system A 311 of the notification from the work exclusive control device 321.

When the process of the work activity started by the user through the user system A 311 is suspended, the suspension of the process is announced to the work exclusive control device 321 through the home server control device 302, and the work exclusive control device 321 updates the state of the process of the work activity stored in the work exclusive control table 322.

Furthermore, when the process of a work activity performed by a user is completed in, for example, the user system A311, a work activity termination state is transmitted to the home server control device 302. The home server control device 302 requests the work exclusive control device 321 to perform the work activity terminating process. The work exclusive control device 321 performs the work activity terminating process, and removes the work exclusive control information about the work activity stored in the work exclusive control table 322.

In FIG. 39, the processes performed by the home server communications management device 301, the user system generation device 303, and the connection management device 304 are the same as the processes performed by the respective devices according to the first embodiment of the home server shown by the flowcharts in FIGS. 36, 37, and 38. In FIG. 39, the contents of the information stored in the work item management device 305 and the user information management table 306 are the same as the contents according to the first embodiment of the home server.

FIG. 41 is a flowchart of the process performed by the work exclusive control device 321 according to the second embodiment of the home server shown in FIG. 39. The process is described below by referring to FIG. 41.

First, the work exclusive control device retrieves a work ID from the work item transmitted together with, for example, a process request from the home server control device (S1).

Next, the work exclusive control device determines the type of the requested process (S2). As a determination result, if the requested precess is a work activity suspension request from the user operating a user system, then the processes in and after step S3 are performed. If the requested process is a work activity process start request from the home server control device, then the processes in and after step S11 are performed. If the requested process is a work activity termination request from the home server control device, then the processes in and after step S21 are performed.

If the work exclusive control device determines as a result of the determination in step S2 that it has received a process suspension request from a user, then it retrieves the corresponding work exclusive control information from the work exclusive control table using the retrieved work ID as a retrieval key (S3), writes 'in suspension' in the process state column (S4), and terminates the current process.

On the other hand, if the work exclusive control device determines as a result of the determination in step S2 that it has received a process start request from the home server control device, then it retrieves corresponding work exclusive control information from the work exclusive control table using the retrieved work ID as a retrieval key (S11), and determines whether or not the work exclusive control information has been detected (S12).

When the work exclusive control device determines as a result of the determination in step S12 that the work exclusive control information has not been detected, it generates a new entry on the work exclusive control table (S13), copies the work ID, the state, the work flow name, and the person-in-charge ID from the work item transmitted together with the process request (S14), and then performs the processes in and after the step S17 described later.

On the other hand, when the work exclusive control device determines as a result of the determination in step S12 that the work exclusive control information has been detected, it determines whether or not the process state in the detected work exclusive control information indicates 'in process' (S15).

When the work exclusive control device determines as a result of the determination in step S15 that the process state in the detected work exclusive control information indicates 'in process', it informs the home server control device that the process start request on the work activity is rejected (S16), and terminates the current process.

On the other hand, when the work exclusive control device determines as a result of the determination in step S15 that the process state in the detected work exclusive control information has not indicated 'in process', it performs the processes in and after step S17.

The work exclusive control device writes 'in process' as the process state in the work exclusive control information (S17), notifies the home server control device that the process start request for the work activity is accepted (S18), and terminates the current process.

If the work exclusive control device determines as a result of the determination in step S2 that it has received a process termination request from the home server control device, then it retrieves corresponding work exclusive control information from the work exclusive control table using the retrieved work ID as a retrieval key (S21), removes the retrieved work exclusive control information from the work exclusive control table (S22), and terminates the current process.

Figure 42:
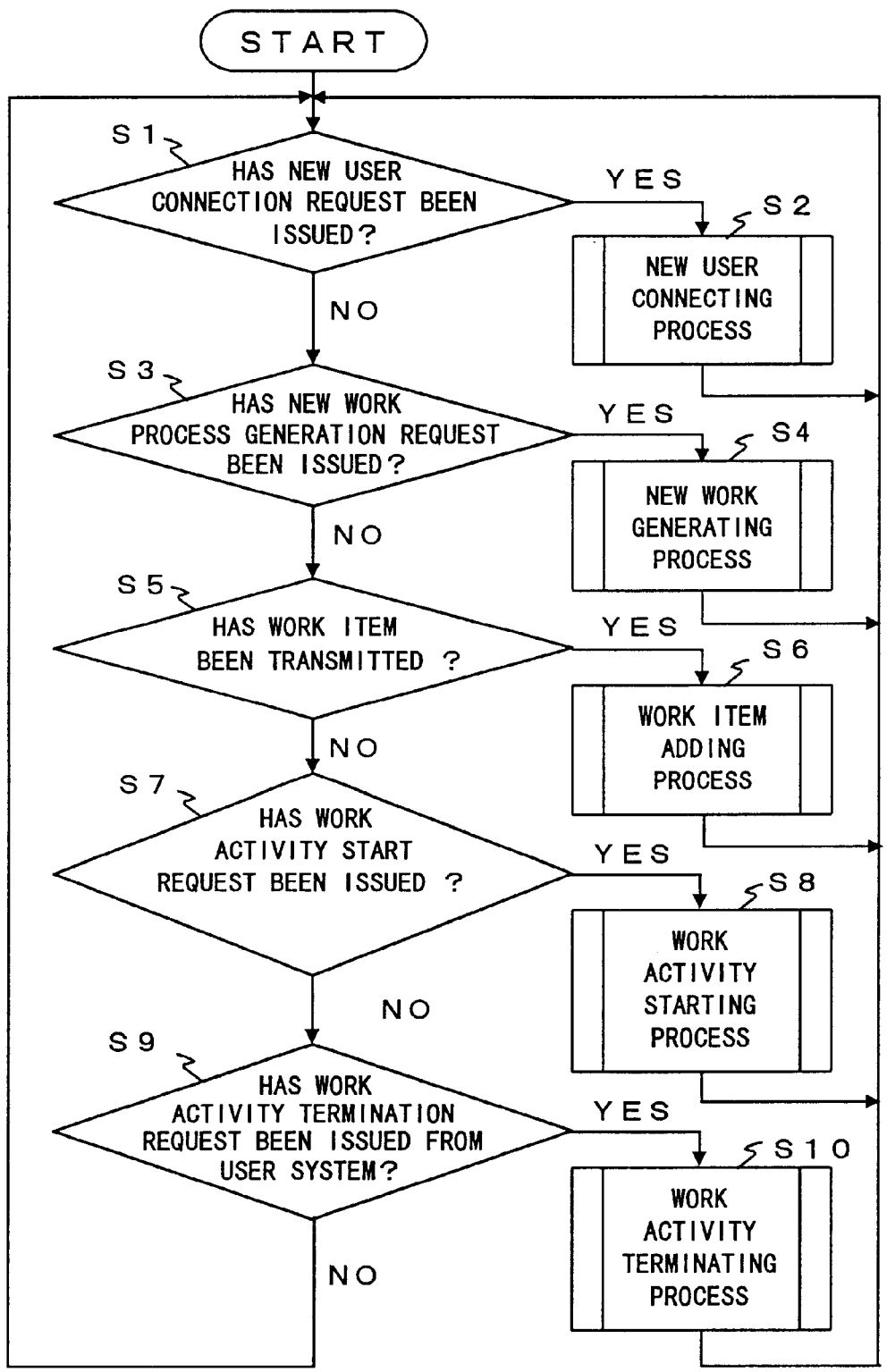
FIG. 42 is a flowchart showing the home server control device according to the second embodiment of the home server.

FIG. 42 is a flowchart of the process performed by the home server control device 302 according to the second embodiment of the home server shown in FIG. 39. The process is described below by referring to FIG. 42.

The home server control device determines the type of the process request in the received information (S1, S3, S5, S7, S9). If, as a determination result, a user operating a user program has issued a new user connection request, then a new user connecting process is performed (S2). If a new work process generation request has been issued from a user system, then a new work process generating process is performed (S4). If a work item generated in a work flow engine of the main server is transmitted, then a work item adding process is performed (S6). If a work activity starting process request has been issued from a user system, then a work activity starting process (S8) is performed. If a work activity termination request has been issued from a user system, then a work activity terminating process (S10) is performed. After the termination of each process, a process of determining the type of a process request is repeated on the subsequent information.

If a work activity process suspension request is received from a user system, although not shown in FIG. 42, the home server control device transmits the request as is to the work exclusive control device.

In each process shown in FIG. 42, the new user connecting process (S2), the work process generating process (S4), and the work item adding process (S6) are the same as the processes performed by the home server control device according to the first embodiment of the home server in the flowcharts in FIGS. 32, 33, and 34 respectively.

Figure 43:
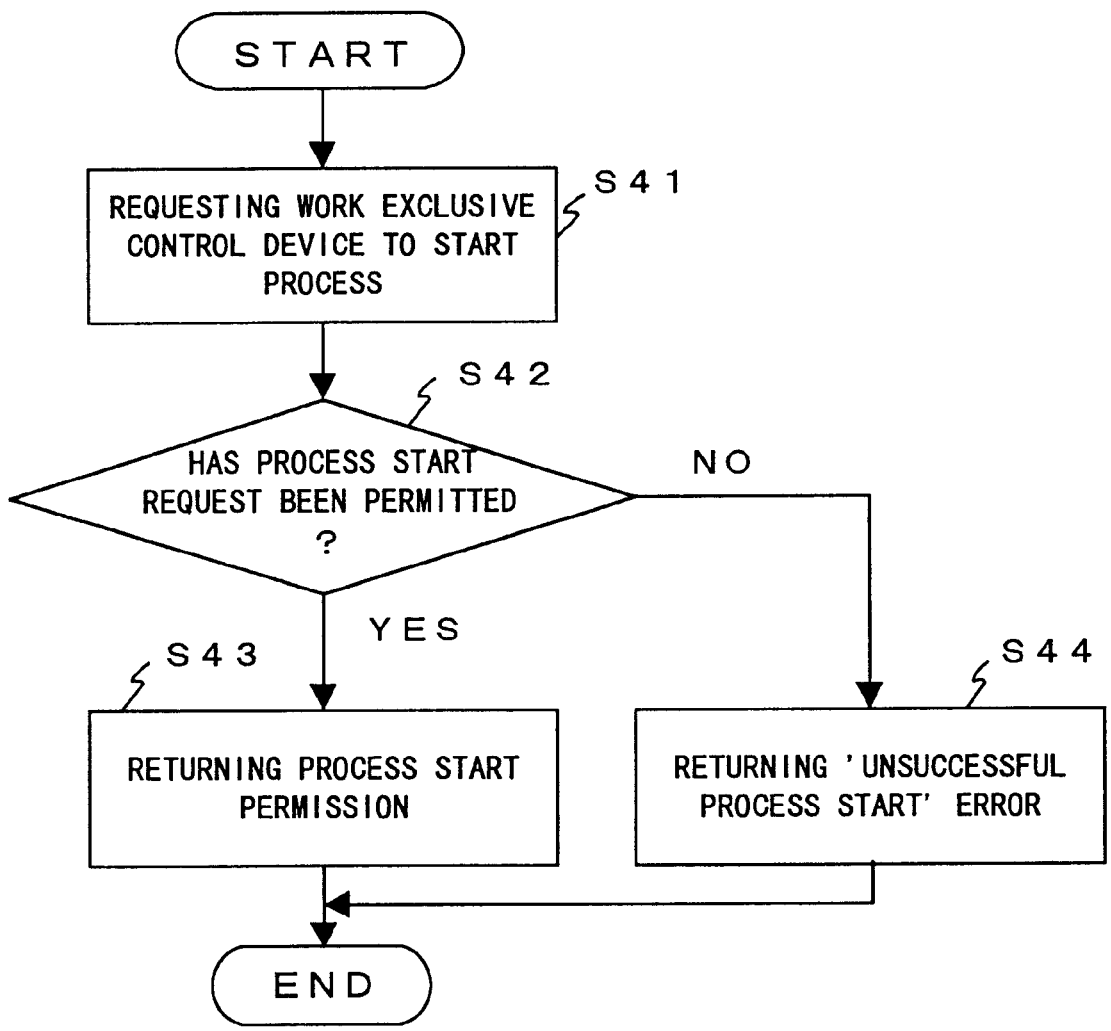
FIG. 43 is a flowchart of the work activity starting process shown in FIG. 42.

FIG. 43 is a flowchart of the work activity starting process performed by the home server control device 302 shown as the process in step S8 in FIG. 42. The process is described below by referring to FIG. 43.

First, the home server control device requests the work exclusive control device to start a process (S41).

Then, after the work exclusive control device performs the starting process, the home server control device determines whether or not the start of the process has been allowed (S42). When the home server control device determines as a result of the above described determination that the start of the process has been allowed, it returns a permission for a work activity process start (S43), and terminates the current process. When the home server control device determines as a result of the above described determination that the start of the process has not been allowed (that is, rejected), it returns an error message 'unsuccessful process start' (S44), thereby terminating the current process.

Figure 44:
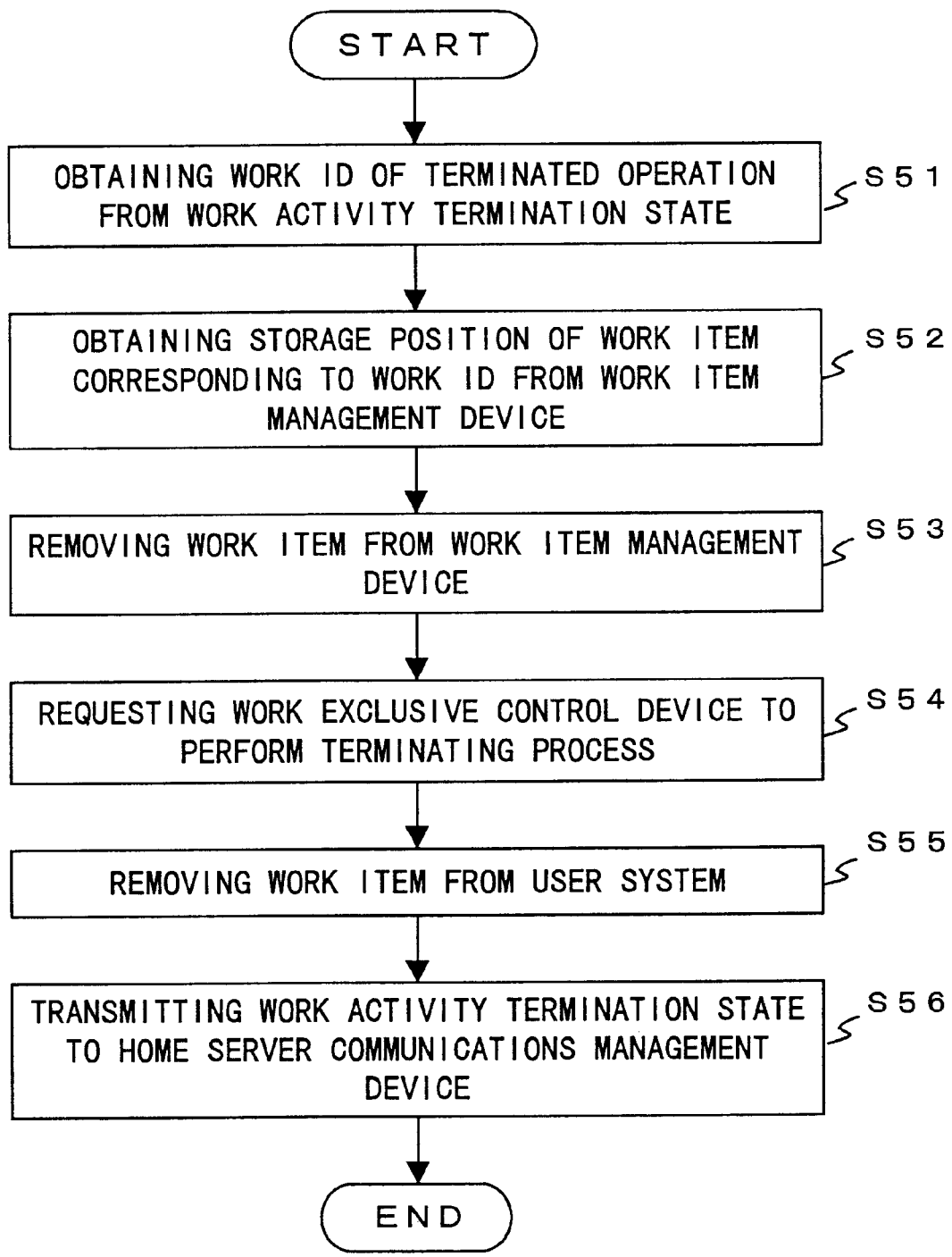
FIG. 44 is a flowchart showing the work activity terminating process shown in FIG. 42.

FIG. 44 is a flowchart of the work activity terminating process performed by the home server control device 302. The process is described below by referring to FIG. 44.

First, the home server control device obtains the work ID of the work terminated according to the information about the received work activity termination state (S51), and obtains the storage position in the work item management device which stores the work item corresponding to the work ID (S52).

Then, the home server control device removes the work item from the work item management device (S53), requests the work exclusive control device to perform a terminating process (S54), removes the work item relating to the work activity terminated by the user system which has issued the work activity process termination request (S55), transmits the received work activity termination state to the home server communications management device (S56), and terminates the process.

Figure 45:
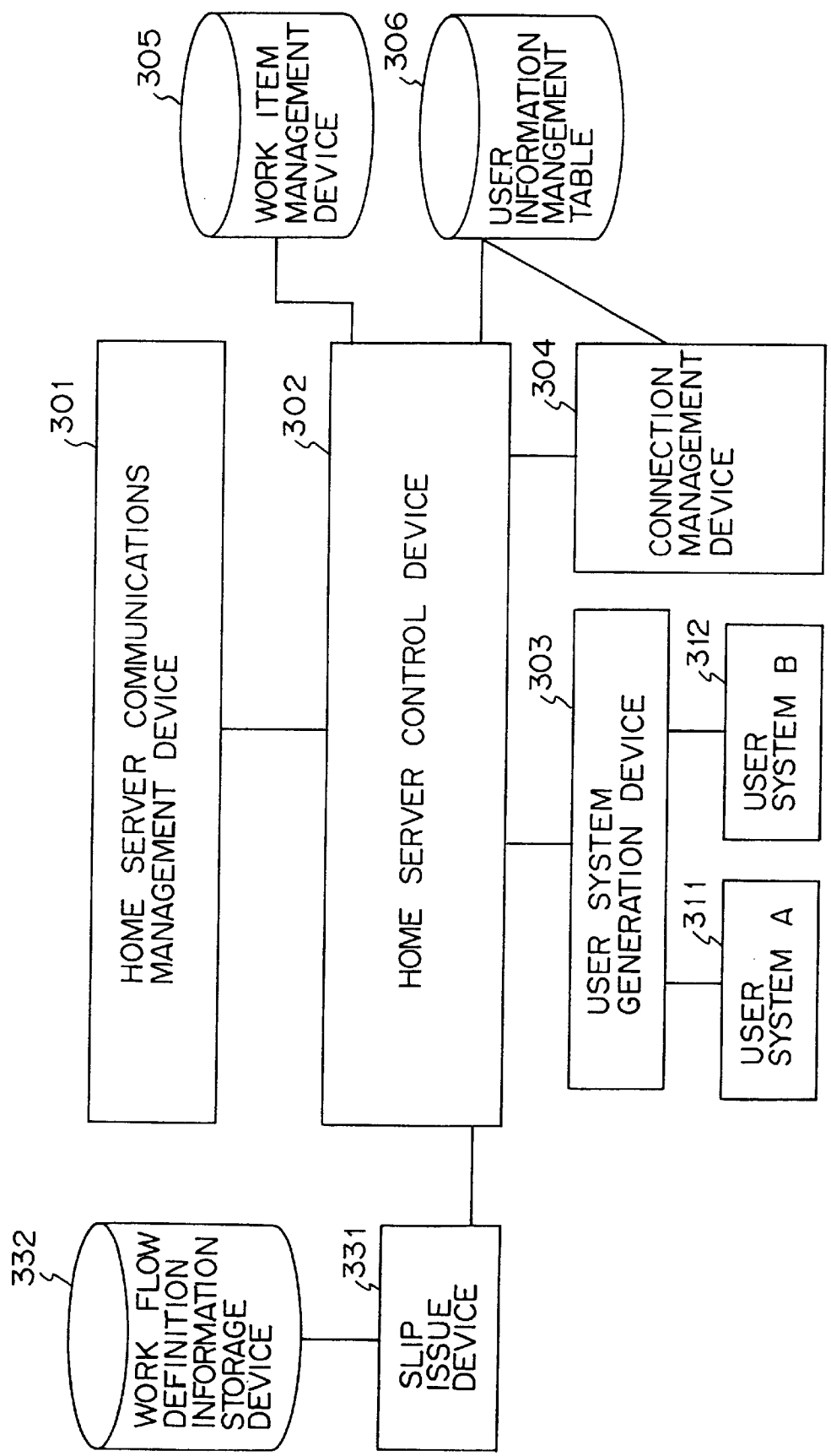
FIG. 45 shows the system configuration according to the third embodiment of the home server used in the work flow management system shown in FIG. 21.

FIG. 45 shows the system configuration according to the third embodiment of the home server used in the work flow management system shown in FIG. 21.

In FIG. 45, the components also shown in the system configuration according to the first embodiment of the home server shown in FIG. 29 are assigned the common identification numbers.

The configuration according to the third embodiment of the home server shown in FIG. 45 is different from the configuration according to the first embodiment of the home server shown in FIG. 29 in that it includes a slip issue device 331 and a work flow definition information storage device 332.

In the above described work flow management system, when a user generates a new work process in the user system, the user system first issues a new work process generation request to the main server. Then, a new work process is generated in the work flow engine in the main server, and a work item (format of slip, etc.) required to process the first (work flow 0) work activity of the work process is generated. Then, the work item is received by the user system so that the user can start the first work activity in the work flow of a series of work processes. Therefore, a considerably long time is necessary for a user to actually start the first work activity.

With the above described problem taken into account, the feature of the third embodiment of the home server shown in FIG. 45 is to generate a temporary work item (referred to as a slip issuing process) for the first work activity when a new work process is generated in the home server. Based on this feature, the load of the work flow engine in generating a new work process can be attenuated, and the wait time in the user system from the issue of a user's new work process generation request to the actual start of the first work activity can be successfully shortened.

In FIG. 45, the slip issue device 331 generates a temporary work item from the work flow definition information stored in the work flow definition information storage device 332 at an instruction from a user.

The work flow definition information storage device 332 stores work flow definition information, and preliminarily stores in the home server the necessary information in the work flow definition information stored in the work flow definition information storage device provided in each work flow engine in the main server. Information stored in the common database in the main server may be required to generate a temporary work item. If such a temporary work item is to be generated, the above described information should be preliminarily stored in the work flow definition information storage device 332.

With the configuration shown in FIG. 45, for example, when the user generates a new work process in the user system A 311, a slip issue request is first transmitted to the slip issue device 331 through the home server control device 302. The slip issue device 331 generates a temporary work item from the work flow definition information stored in the work flow definition information storage device 332, and transmits it to the user system A 311. The user system A 311 processes the first work activity in the work flow using the temporary work item, and transmits the process result to the home server control device 302. When the home server control device 302 transmits a new work process generation request to the work flow engine of the main server, it attaches the temporary work item to the new work process generation request, and then transmits them. The work flow engine of the main server which receives the new work process generation request generates a formal work item after adding the attached temporary work item to the work information. Thus, the subsequent work activities are transferred.

In FIG. 45, the processes performed by the home server communications management device 301, the user system generation device 303, and the connection management device 304 are similar to the processes performed by the devices according to the first embodiment of the home server in the flowchart shown in FIGS. 36, 37, and 38 respectively. In FIG. 45, the contents of the information stored in the work item management device 305 and the user information management table 306 are also similar to those according to the first embodiment of the home server.

Figure 46:
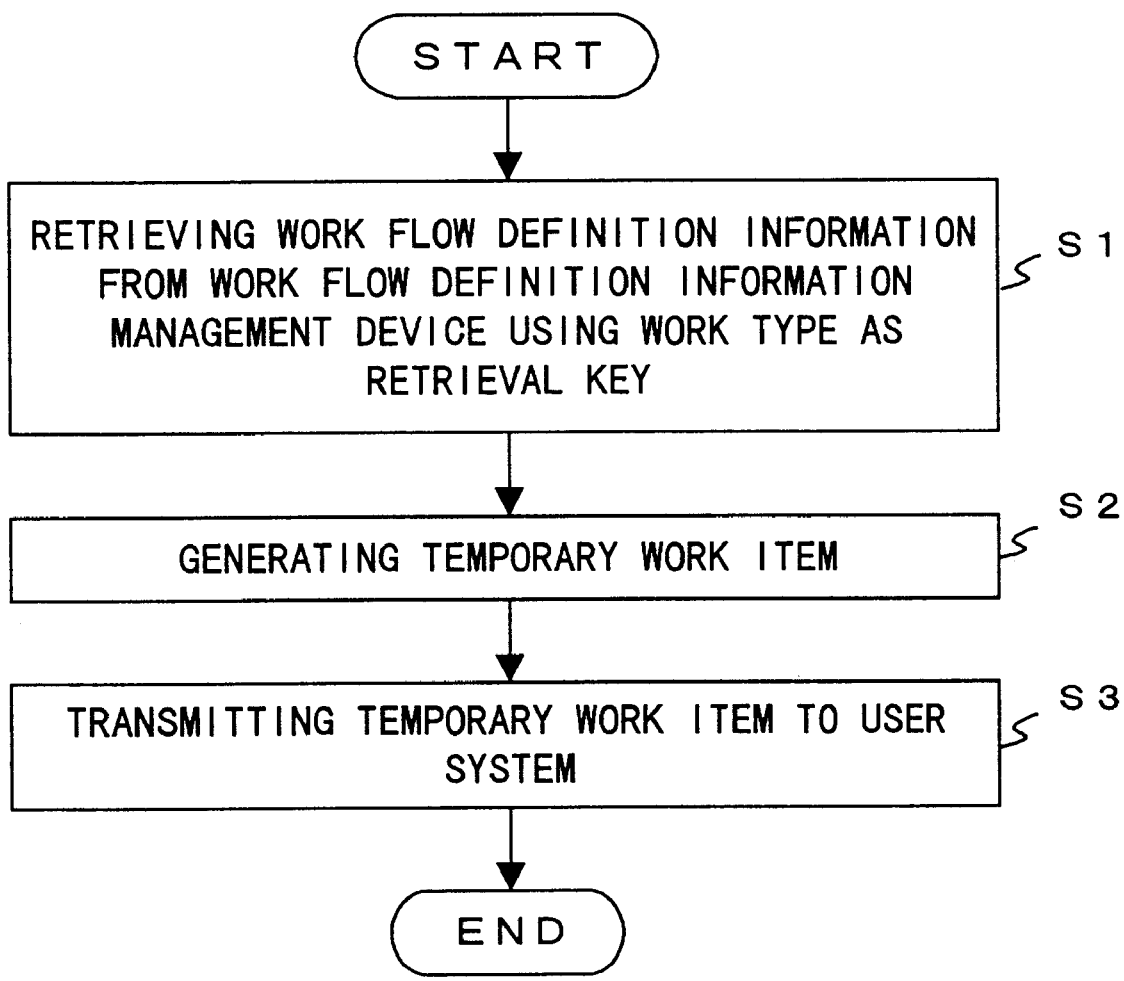
FIG. 46 is a flowchart showing the slip issuing device according to the third embodiment of the home server.

FIG. 46 is a flowchart of the process performed by the slip issue device 331 according to the third embodiment of the home server shown in FIG. 45. The process is described below by referring to FIG. 46.

When the slip issue device receives an instruction from the user operating a user system, it retrieves the work flow definition information stored in the work flow definition information storage device using the work type contained in the instruction as a retrieval key (S1). Based on the retrieval result, it generates a temporary work item (S2), transmits the generated work item to the user system (S3), and terminates the process.

The process performed by the home server control device 302 shown in FIG. 45 is similar to the process performed by the home server control device according to the first embodiment of the home server shown in the flowchart in FIG. 31. In the four processes shown as subroutines in the flowchart in FIG. 31, the new user connecting process, the work item adding process, and the work terminating process are performed as shown by the processes in FIGS. 32, 34, and 35. However, the new work process generating process is performed by adding a new process to the process in the flowchart shown in FIG. 33.

Figure 47:
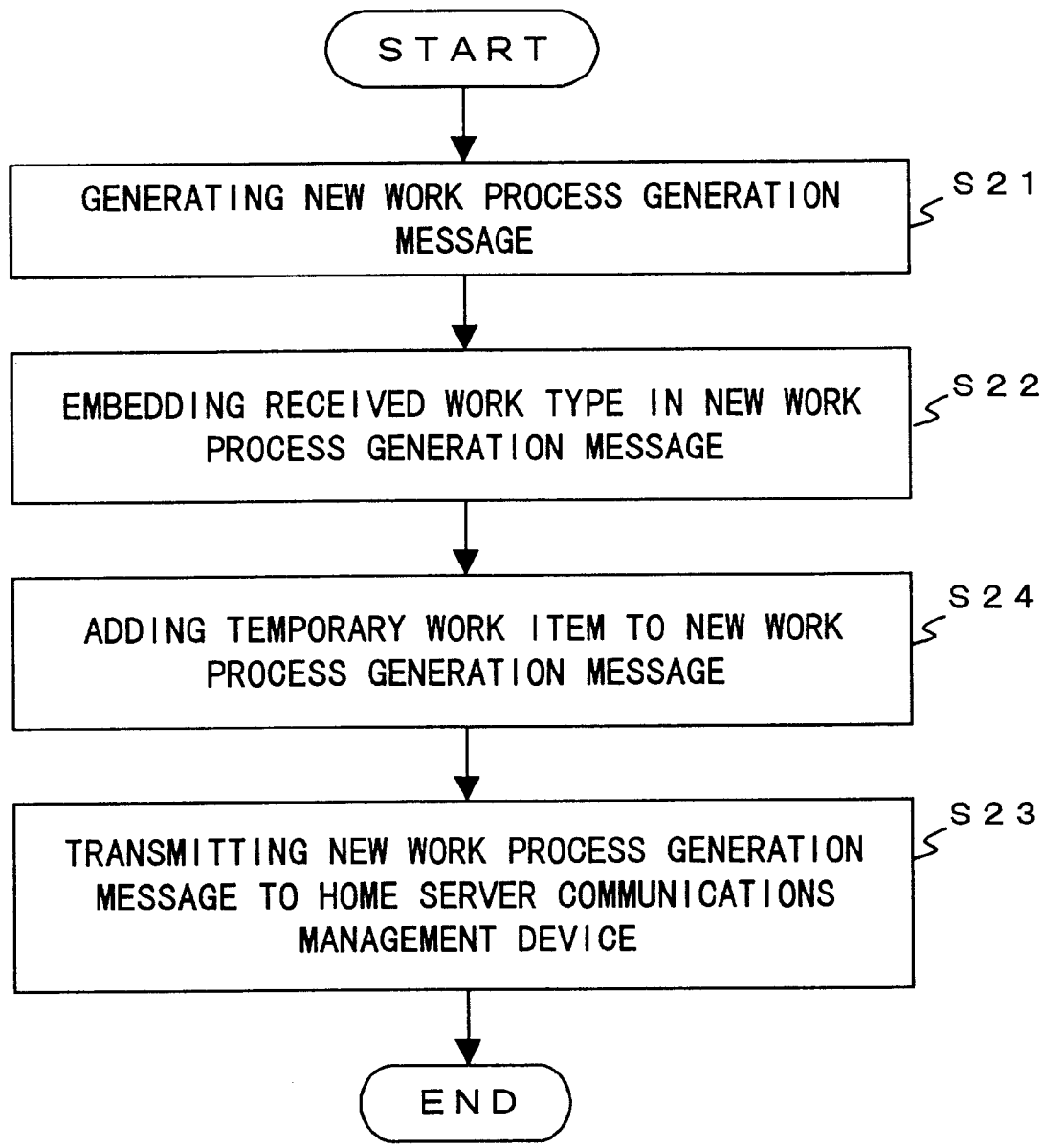
FIG. 47 is a flowchart showing the new work process generating process performed by the home server control device according to the third embodiment of the home server.

FIG. 47 is a flowchart of the new work process generating process performed by the home server control device 302 according to the third embodiment of the home server. In FIG. 47, the process steps also shown in the flowchart of the new work process generating process performed by the home server control device 302 according to the first embodiment of the home server shown in FIG. 33 are assigned common identification numbers.

FIG. 47 is different from FIG. 33 in that a work type is embedded in the generated new work process generation message, then a temporary work item generated by the slip issue device is further added (S24), and the result is transmitted to the home server communications management device.

When the home server shown in FIG. 45 is used in the work flow management system shown in FIG. 21, an amendment should be made to the process performed by the work flow engines A and B (42, 43) according to the first embodiment of the work flow management system shown in the flowchart in FIG. 27.

Figure 48:
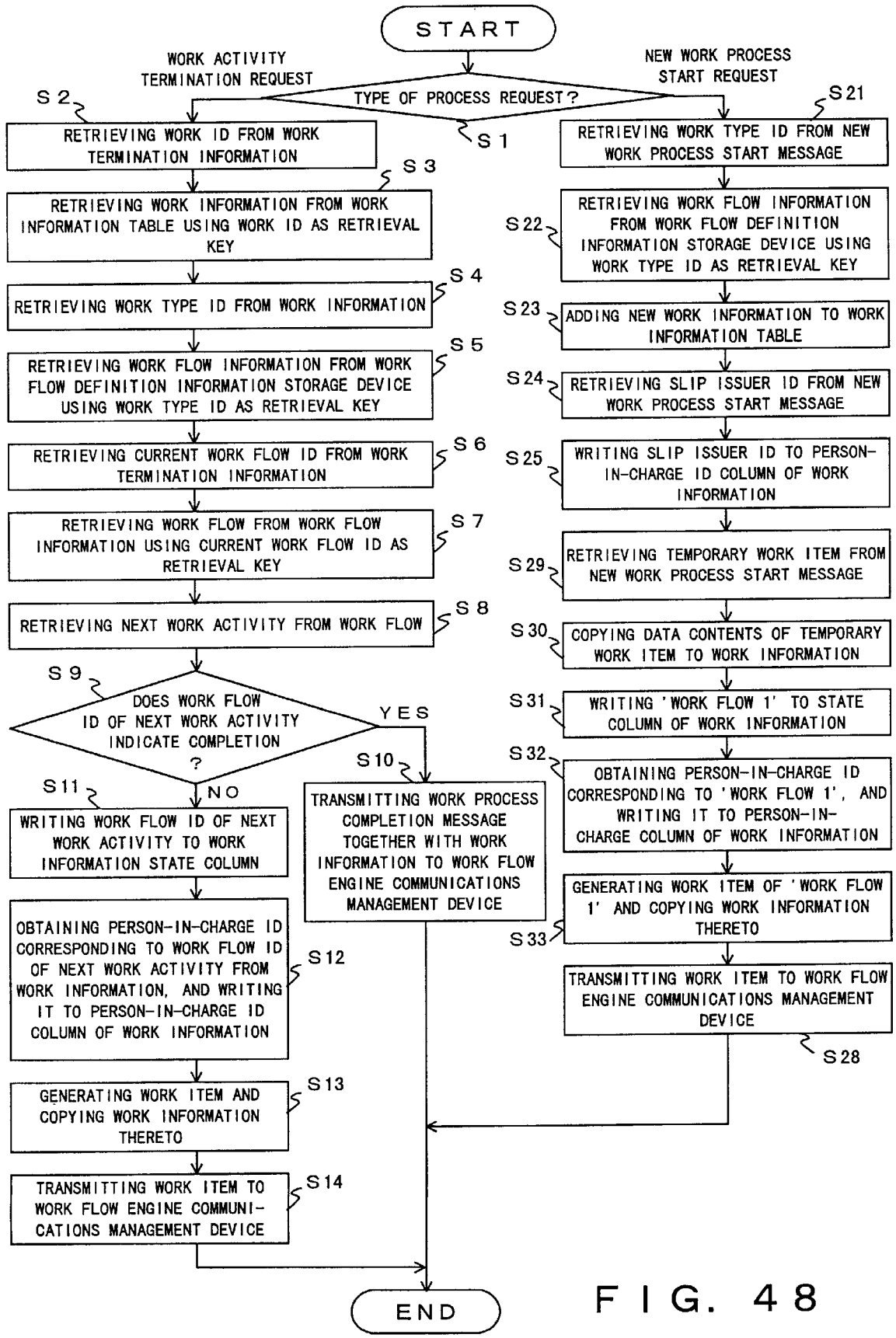
FIG. 48 is a flowchart showing the work flow engine when the third embodiment of the home server shown in FIG. 45 is applied to the first embodiment of the work flow management system of the present invention.

FIG. 48 is a flowchart of the process performed by the work flow engines A and B (42, 43) when the third embodiment of the home server shown in FIG. 45 is applied to the first embodiment of the work flow management system of the present invention. In FIG. 48, the process steps also shown in the flowchart in FIG. 27 are assigned the common numbers.

The processes shown in FIG. 48 are the same as those shown in FIG. 27 in the processes by the work flow engine performed when a work activity termination request is received from the home server. In the process by the work flow engine performed when a new work process start request is received from the home server, the process of writing 'work flow 0' to the state column of the work information (S26), generating a work item through the work flow engine, and copying the work information thereto (S27) are removed. Instead, the temporary work item contained in the received new work process start message is retrieved (S29), and the contents of the data indicated by the retrieved temporary work item are copied to the work information (S30). Then, 'work flow 1' is written to the state column of the work information (S31), and the ID of the person in charge of the work activity of the 'work flow 1' of the work process specified by the start request is obtained and written to the person-in-charge column of the work information (S32). The work item of the 'work flow 1' is generated and copied to the work information (S33).

Figure 49:
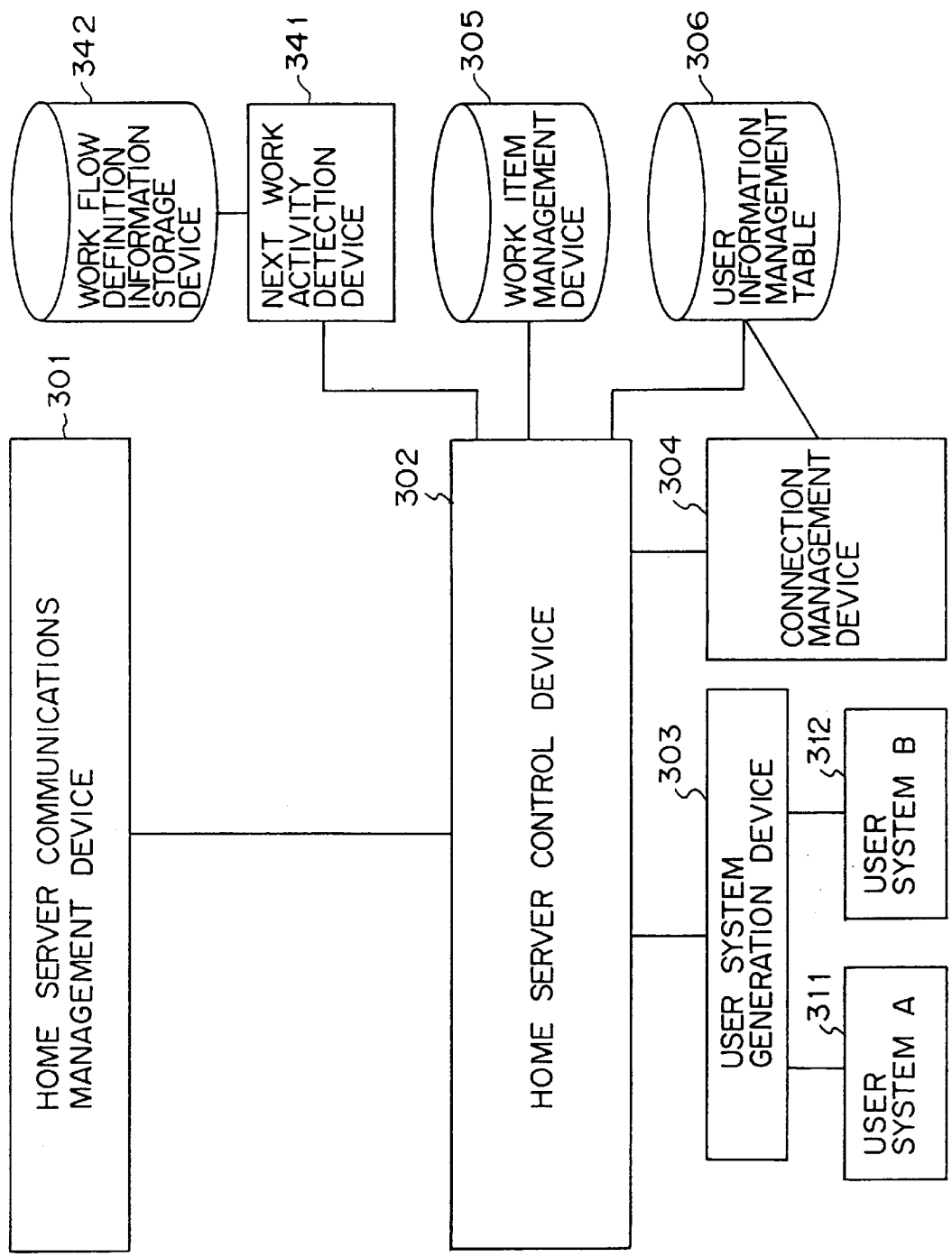
FIG. 49 shows the system configuration according to the fourth embodiment of the home server used in the work flow management system shown in FIG. 21.

FIG. 49 shows the system configuration according to the fourth embodiment of the home server used in the work flow management system.

In FIG. 49, the components also shown in the system configuration according to the first embodiment of the home server shown in FIG. 29 are assigned the common identification numbers.

The configuration according to the fourth embodiment of the home server shown in FIG. 49 is different from the configuration according to the first embodiment of the home server shown in FIG. 29 in that it comprises a next work activity detection device 341 and a work flow definition information storage device 342.

In the above described work flow management system, all work activities that have been terminated are transferred by the work flow engine. Therefore, a work item is transmitted between the user system and the work flow engine even if a person in charge who has terminated a work activity is the person in charge of the next work activity, and even if it is certain that the work activity and the next work activity are processed in the same user system. As a result, a considerably long time is required from the termination of a work activity by the user in the user system to the start of the next work activity which the same user takes charge of.

To solve the above described problem, according to the fourth embodiment of the home server shown in FIG. 49, the person in charge of the terminated work activity is compared with the person in charge of the next work activity in the home server. When they match each other, the work flow engine does not transfer the next work activity. This is an essential feature of the present embodiment. Based on this feature, the load of the work flow engine can be reduced in a transfer process when a person in charge of a work activity is the person in charge of the next work activity. Furthermore, the wait time of the user from the termination of a work activity to the start of the next work activity can be successfully shortened in the user system.

In FIG. 49, the next work activity detection device 341 detects the work activity after the terminated work activity at a process request from the home server control device 302, determines whether or not the person in charge of the terminated work activity is the person in charge of the next work activity, and notifies the home server control device 302 of the determination result.

The work flow definition information storage device 342 stores the work flow definition information, and preliminarily stores the work flow definition information stored in the work flow definition information storage device of each work flow engine of the home server as with the work flow definition information storage device 332 shown in FIG. 45.

With the configuration shown in FIG. 49, for example, when a user terminates a work activity in a work flow in the user system A 311, a work activity termination request is transmitted from the user system A 311 to the home server control device 302. Then, the home server control device 302 requests the next work activity detection device 341 to detect the next work activity.

At the request, the next work activity detection device 341 detects the work activity after the terminated work activity by referring to the work flow definition information stored in the work flow definition information storage device 342, determines whether or not the person in charge of the terminated work activity is the person in charge of the detected next work activity, and returns the determination result to the home server control device 302.

Based on the determination result returned from the next work activity detection device 341, the home server control device 302 manages to start the process on the next work activity in the user system A 311 if the person in charge of the terminated work activity is the person in charge of the detected next work activity, and notifies the work flow engine in charge of the management of the work activity in the main server through the home server communications management device 301 that there is no need of transferring the work item of the next work activity.

In FIG. 49, the processes performed by the home server communications management device 301, the user system generation device 303, and the connection management device 304 are similar to the processes by the devices according to the first embodiment of the home server shown in the flowcharts in FIGS. 36, 37, and 38 respectively. In FIG. 49, the contents of the information stored in the work item management device 305 and the user information management table 306 are also similar to the information stored according to the first embodiment of the home server.

FIG. 50 is a flowchart of the process performed by the next work activity detection device 341 according to the fourth embodiment of the home server shown in FIG. 49. The process is described below by referring to FIG. 50.

When the next work activity detection device receives a process request from the home server control device, the next work activity detection device retrieves the work type ID from the received work item (S1), retrieves the work flow definition information storage device using the retrieved work type ID as a retrieval key, and obtains the corresponding work flow information (S2).

Then, the next work activity detection device retrieves the current work flow ID from the work item (S3), retrieves the work flow of the entire work process from the previously retrieved work flow information (S4), and furthermore retrieves the work flow ID of the work activity after the current work activity from the retrieved work flow (S5).

Then, the next work activity detection device determines whether or not the retrieved work flow ID of the next work activity indicates the completion of the work process (S6). When it determines that the work flow ID of the next work activity does not refer to the completion of the work process, the processes in and after step S7 are performed. When it determined that the work flow ID of the next work activity refers to the completion of the work process, the process in step S11 is performed.

When the next work activity detection device determines as a determination result in step S6 that the work flow ID of the next work activity does not refer to the completion of the work process, it retrieves the information about the person in charge corresponding to the work flow ID of the next work activity from the previously retrieved work flow information (S7), and then determines whether or not the person in charge of the current work activity is the person in charge of the next work activity (S8). If it is determined that the person in charge of the current work activity is the person in charge of the next work activity, then the processes in and after step S9 are performed. If it is determined that the person in charge of the current work activity is not the person in charge of the next work activity, then the process in step S11 is performed.

When the next work activity detection device determines as a determination result in step S8 that the person in charge of the current work activity is the person in charge of the next work activity, then it writes the next work flow ID to the 'state' column of the work item (S9), returns the information indicating 'no return' to the home server control device (S10), and terminates the current process.

On the other hand, if the next work activity detection device determines as a determination result in step S6 that the work flow ID of the next work activity refers to the completion of the work process, or as a determination result in step S8 that the person in charge of the current work activity is not the person in charge of the next work activity, then it returns the information indicating 'to be returned' to the home server control device (S11), and terminates the current process.

The process performed by the home server control device 302 shown in FIG. 49 is similar to the process performed by the home server control device according to the first embodiment of the home server shown in the flowchart in FIG. 31. In the four processes shown as subroutines in the flowchart in FIG. 31, the new user connecting process, the new work generating process, and the work item adding process are performed as shown by the processes in FIGS. 32, 33, and 34. However, the work activity terminating process is performed by adding a new process to the process in the flowchart shown in FIG. 35.

Figure 51:
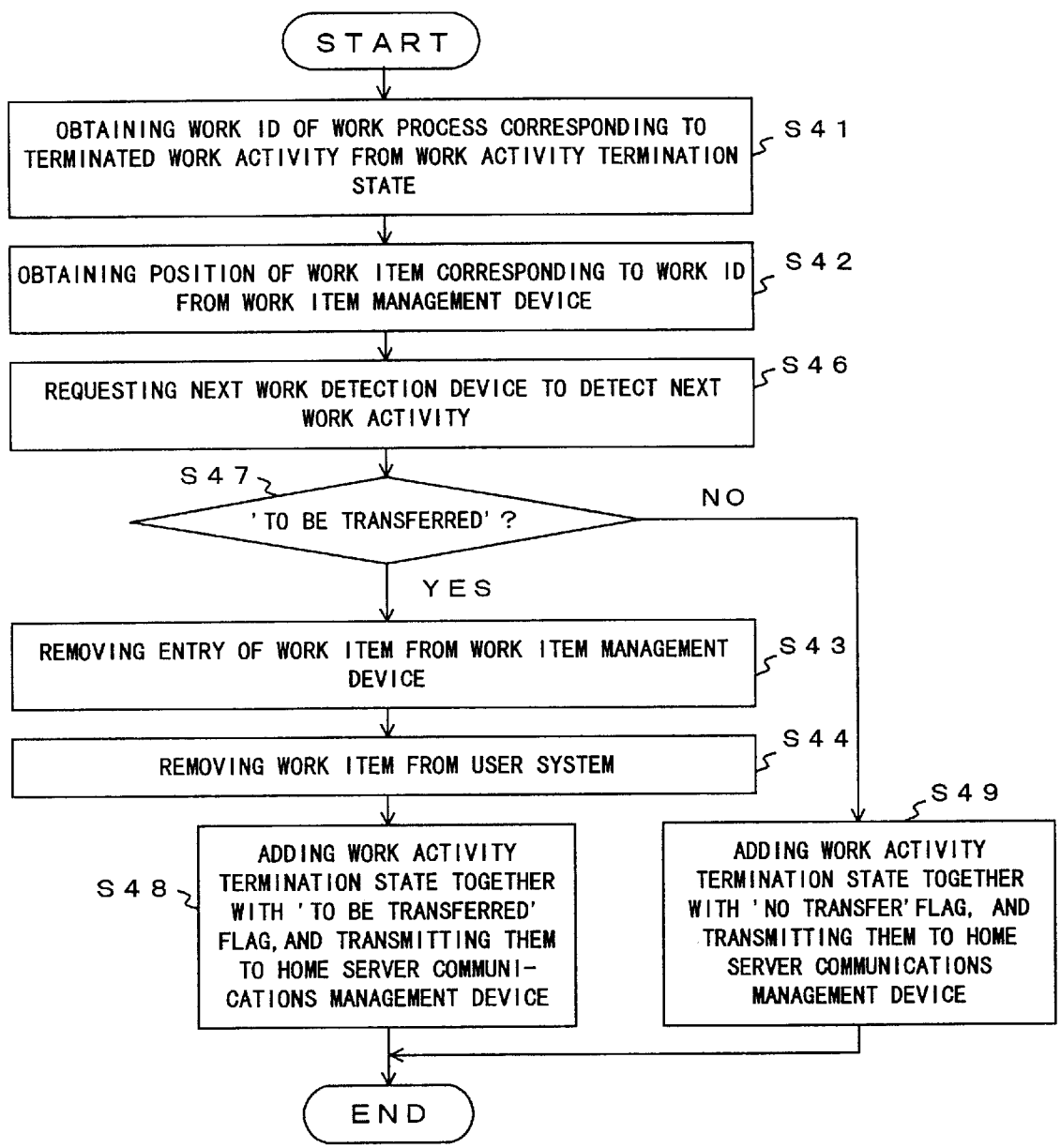
FIG. 51 is a flowchart showing the process performed when the work activity is completed by the home server control device according to the fourth embodiment of the home server.

FIG. 51 is a flowchart of the work activity terminating process performed by the home server control device 302 according to the fourth embodiment of the home server. In FIG. 51, the process steps also shown in the flowchart of the work terminating process performed by the home server control device 302 according to the first embodiment of the home server shown in FIG. 35 are assigned common identification numbers. The work activity terminating process is described below by referring to FIG. 51.

The home server control device obtains the work ID of the work process about the terminated work activity from the information about the received work activity termination state (S41), obtains the storage position in the work item management device storing the work item corresponding to the work ID (S42), and then requests the next work activity detection device to detect the next work activity (S46).

Then, the home server control device determines whether or not the result of detecting the next work activity by the next work activity detection device indicates 'to be transferred' (S47).

When the home server control device determines as a determination result in step S47 that the result of detecting the next work activity indicates 'to be transferred', it removes the entry of the work item from the next work activity detection device (S43), furthermore removes the terminated work item from the user system which issued the work activity termination request (S44), adds to the received work activity termination state a 'to be transferred' flag indicating that the work item should be transferred by the work flow engine, transmits them to the home server communications management device (S48), and terminates the process.

On the other hand, if the home server control device determines as a determination result in step S47 that the result of detecting the next work activity does not refer to 'to be transferred', then it adds to the received work activity termination state a 'no transfer' flag indicating that it is not necessary to transfer the work item by the work flow engine, transmits them to the home server communications management device (S49), and terminates the process.

Figure 52:
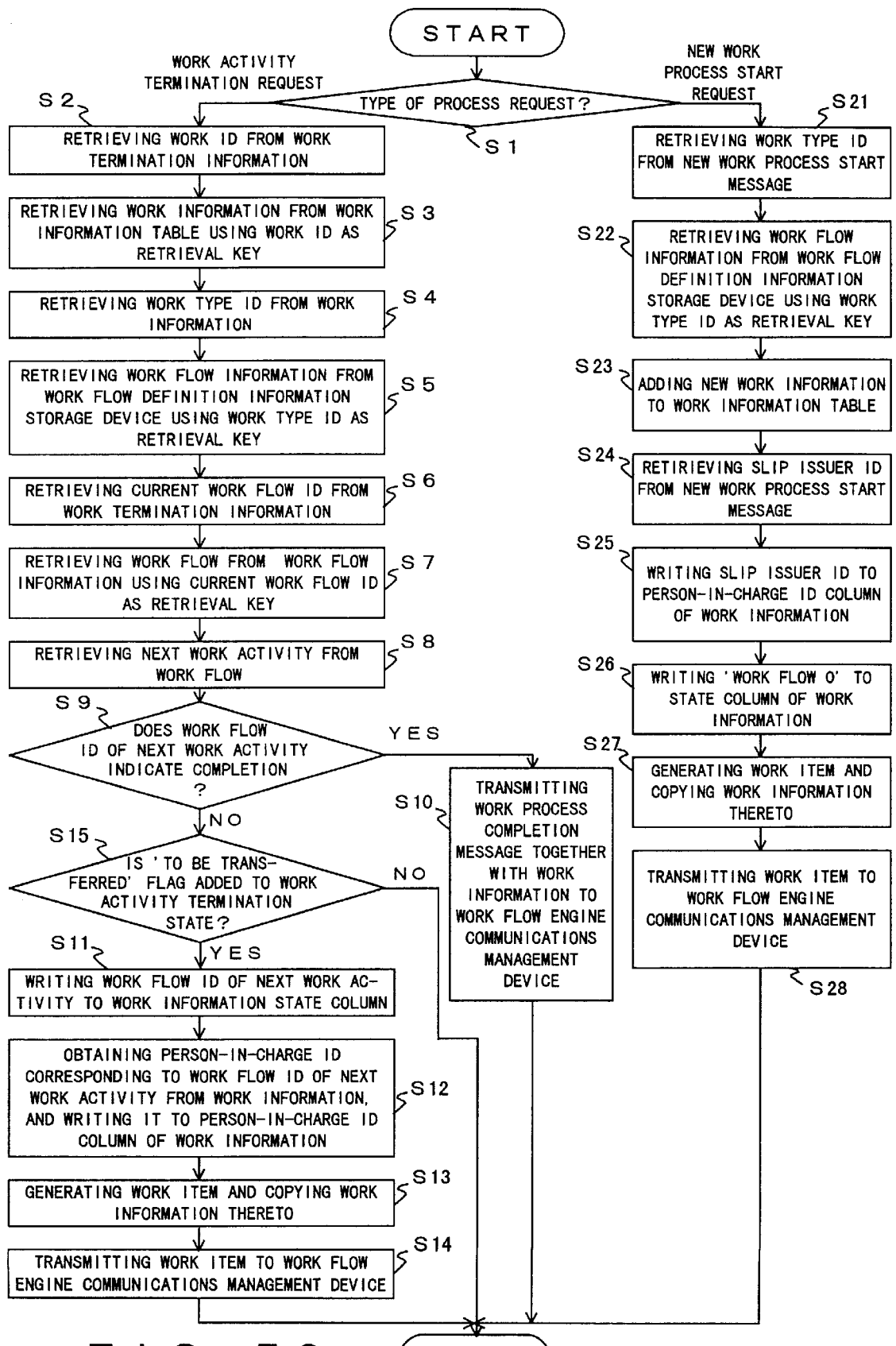
FIG. 52 is a flowchart showing the work flow engine when the fourth embodiment of the home server shown in FIG. 49 is applied to the first embodiment of the work flow management system of the present invention.

FIG. 52 is a flowchart of the process performed by the work flow engines A and B (42, 43) when the fourth embodiment of the home server shown in FIG. 49 is applied to the first embodiment of the work flow management system of the present invention. In FIG. 52, the steps also shown in the flowchart in FIG. 27 are assigned the common numbers.

In FIGS. 52 and 27, the process performed by the work flow engine when a new work process start request is received from the home server is commonly used. In FIG. 52, the process performed by the work flow engine when a work activity termination request is received from the home server is different from the process in FIG. 27 only in that one determination process is added.

In FIG. 52, when a work activity termination request is received, the work flow engine performs the processes from step S1 to step S8 as shown in FIG. 27.

Then, the work flow engine determines whether or not the process contents corresponding to the work flow ID of the retrieved next work activity indicate the completion of the work process (S9). If the process contents indicate the completion of the work process, then the process in step S10 is performed as shown in FIG. 27. If the process contents do not indicate the completion of the work process, then the determination in step S15 is made.

When the work flow engine determines as a result of the determination in step S9 that the process contents of the next work activity do not indicate the completion of the work process, it determines whether or not the 'to be transferred' flag is added to the work activity termination state (S15).

When the work flow engine determines as a result of the determination in step S15 that a 'to be transferred' flag is added to the work activity termination state, it generates and transfers a work item for the next work activity in steps S11 through S14, and terminates the current process.

On the other hand, when the work flow engine determines as a result of the determination in step S15 that a 'to be transferred' flag is not added to the work activity termination state, it terminates the current process without taking any action.

Figure 53:
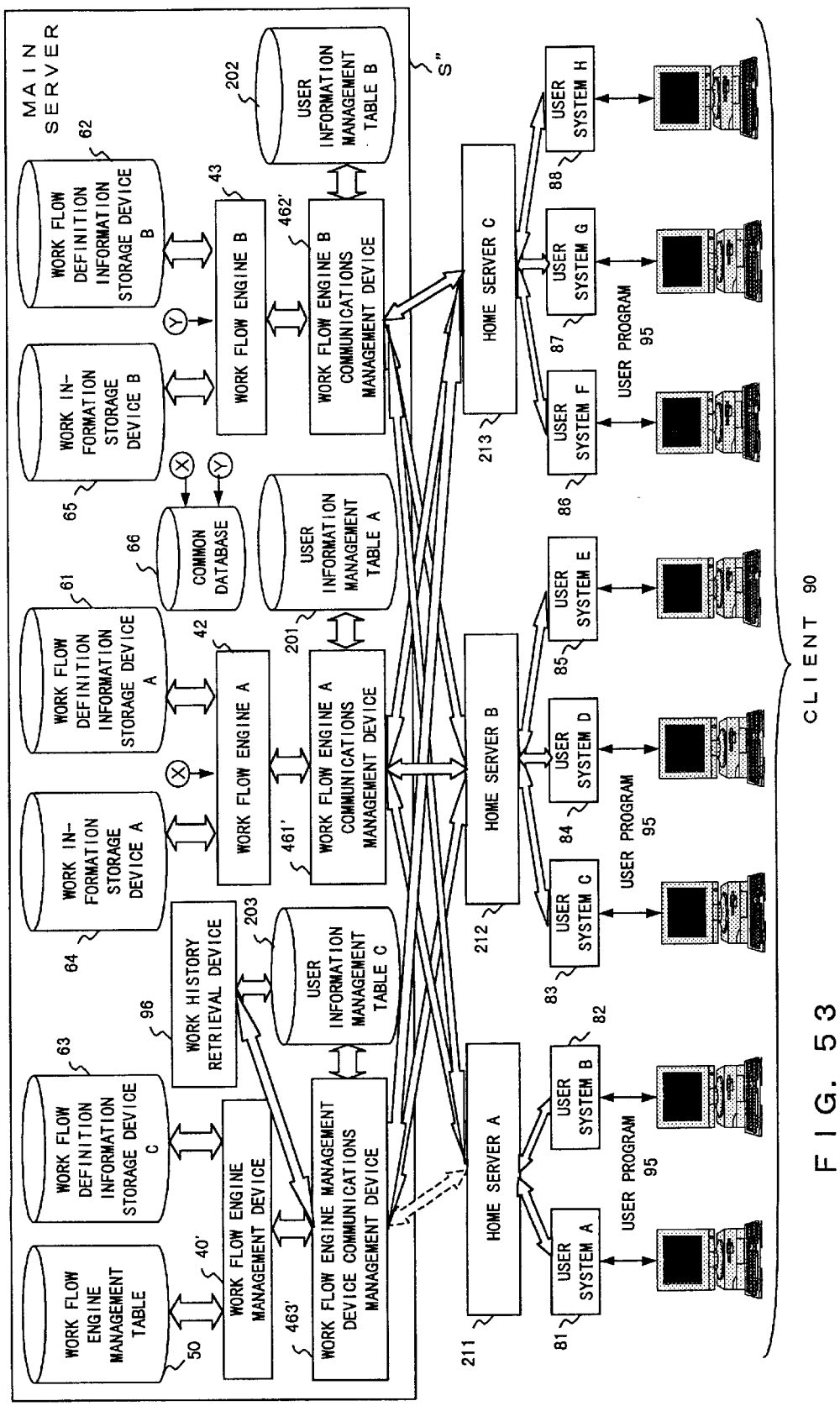
FIG. 53 shows the entire configuration according to the second embodiment of the work flow management system of the present invention.

FIG. 53 shows the entire configuration according to the second embodiment of the work flow management system of the present invention.

Figure 54:
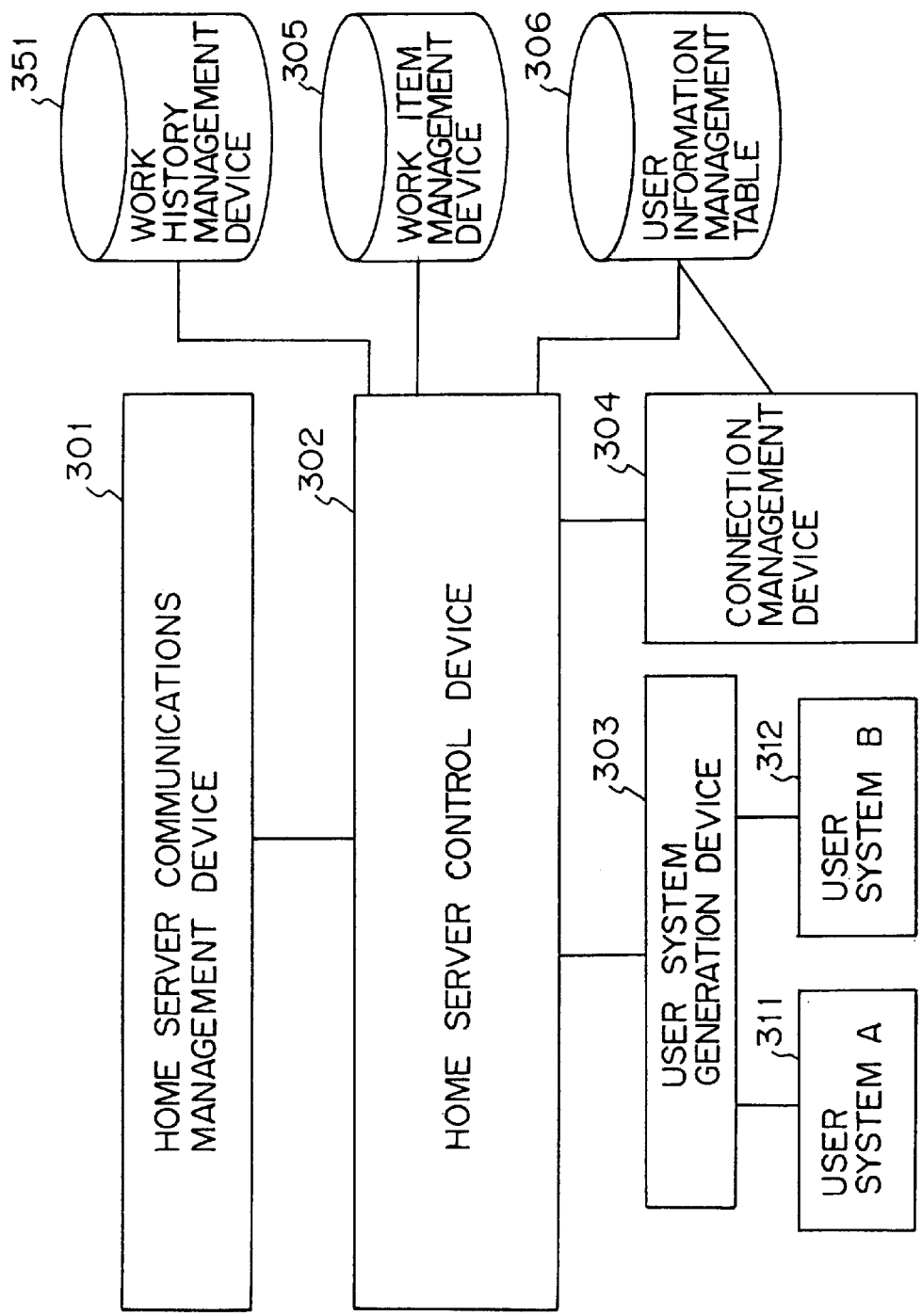
FIG. 54 shows the system configuration of the home server used in the work flow management system shown in FIG. 52.

FIG. 54 shows the system configuration of the home server used in the work flow management system shown in FIG. 53.

In FIG. 53, the components also shown in the entire configuration according to the first embodiment of the work flow management system shown in FIG. 21 are assigned the common numbers. In FIG. 54, the components also shown in the system configuration according to the first embodiment of the home server shown in FIG. 29 are assigned the common numbers.

The configuration according to the second embodiment of the work flow management system shown in FIG. 53 is different from the configuration according to the first embodiment of the work flow management system shown in FIG. 21 in that a work history retrieval device 96 is provided in the main server S". The configuration of the home server shown in FIG. 54 is different from the configuration according to the first embodiment of the home server shown in FIG. 29 in that the home server comprises a work history management device 351.

One of the efficient functions of the work flow management system is to retrieve a work history. This function refers to the confirmation of each user's history about a terminated work activity.

In the conventional work flow management system having a single work flow engine, the work flow engine retrieves the work history. Therefore, the speed of the entire management of work flows can be considerably reduced by frequent retrieval of work histories.

With the work flow management apparatus having a plurality of work flow engines, each work flow engine can retrieve work histories. However, each of the work flow engines has the possibility that it is in charge of the work activity of a specific user. Therefore, it is necessary for all work flow engines to retrieve the work history of a specific user, thereby assigning a heavy load onto the work flow engines.

Thus, there is a suggestion that a work flow management apparatus should store and retrieve a work history. However, if the work flow management apparatus has to manage the entire storage and retrieval of work histories, it has a heavy load in processing the work flow engine management apparatus when a number of user systems simultaneously issue work history retrieval requests, thereby taking a long time in retrieving a work history.

In the work flow management system using a home server shown in FIG. 54, the history of the work activity performed by a user belonging to the home server is stored in the home server to which the user belongs, and the process of retrieving a work history is performed by the home server. This is an important feature of the present invention. Based on this feature, the load of a process of each element of the main server can be reduced when a work history is retrieved.

In FIG. 53, the work history retrieval device 96 retrieves a home server to which the user retrieving a history belongs from the user information management table C 203 based on the ID of the user retrieving the history, instructs the home server to retrieve the history, and notifies the user system of the home server which issued the history retrieval request of the history retrieval result from the home server.

In FIG. 54, the work history management device 351 stores the history of the work activity performed by the user in the user system belonging to the home server.

FIG. 55 shows an example of history information stored in the work history management device 351. As shown in FIG. 55, the history information stored in the work history management device 351 can be, for each work activity in each work flow, the work ID of a work process, the state (work flow ID), the work flow name, the person-in-charge ID, the ID of a work flow engine in charge, the history number (a serial number recorded when a work history is stored), etc.

With the configuration shown in FIGS. 53 and 54, when a user terminates a work activity of a work flow, for example, in the user system A 311, the home server control device 302 stores the history of the terminated work activity in the work history management device 351 as an additional step to the above described work activity terminating process.

Furthermore, for example, when the user system B 312 issues a retrieval request for the work history of a specific user, the request is transmitted to the work history retrieval device 96 in the main server S". The work history retrieval device 96 refers to the user information management table C 203 to detect the home server to which the specific user belongs, and transmits the work history retrieval request to the home server.

When the home server control device 302 receives a work history retrieval request, it refers to the work history management device 351 to detect the stored work activity history of the specific user, and returns the work history retrieval result to the work history retrieval device 96 in the main server S".

When the work history retrieval device 96 receives the work history retrieval result, it transmits the retrieval result to the user system B 312 which issued the retrieval request.

Described below is the process performed by each component according to the second embodiment of the work flow management system of the present invention shown in FIG. 53.

In FIG. 53, the processes performed by the work flow engine management device 40', each of the work flow engines (42, 43), and each of the work flow engine communications management devices (461', 462') are similar to the processes performed by each of the components according to the first embodiment of the work flow management system of the present invention shown in the flowcharts in FIGS. 25, 27, and 28. In FIG. 53, the contents of the information stored in the work flow engine management table 50, the work information storage devices (64, 65), the work flow definition information storage device (61, 62), the common database 66, and each of the user information management tables (201, 202, 203) are also similar to the contents according to the first embodiment of the work flow management system of the present invention.

Figure 56:
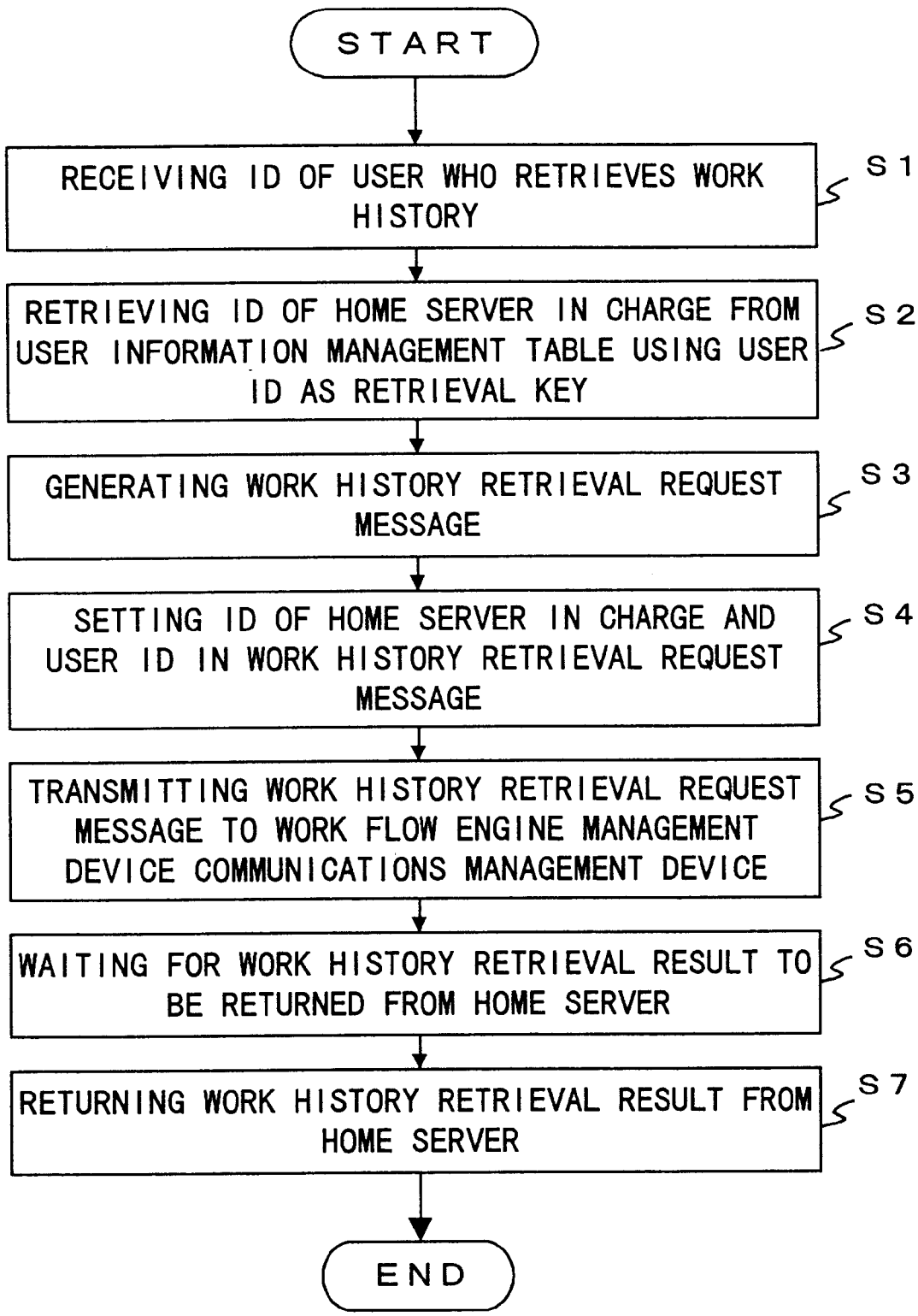
FIG. 56 is a flowchart showing the work history retrieval device according to the second embodiment of the work flow management system of the present invention.

FIG. 56 is a flowchart of the process performed by the work history retrieval device 96 according to the second embodiment of the work flow management system of the present invention shown in FIG. 53. The process is described by referring to FIG. 56.

First, the work history retrieval device receives the ID of the user who retrieves a work history (S1), and retrieves from the user information management table the home server to which the user belongs (the home server in charge of the retrieving process) using the received user ID as a retrieval key (S2).

Then, the work history retrieval device generates a work history retrieval request message (S3), sets the ID of the home server in charge and the user ID in the message (S4), transmits the work history retrieval request message to the work flow engine management device communications management device (S5), and waits for a retrieval result of the work history to be returned from the home server (S6).

After the work history retrieval device receives a history retrieval result, it returns the work history retrieval result to the user system of the home server which issued the work history retrieval request (S7), and terminates the current process.

Figure 57:
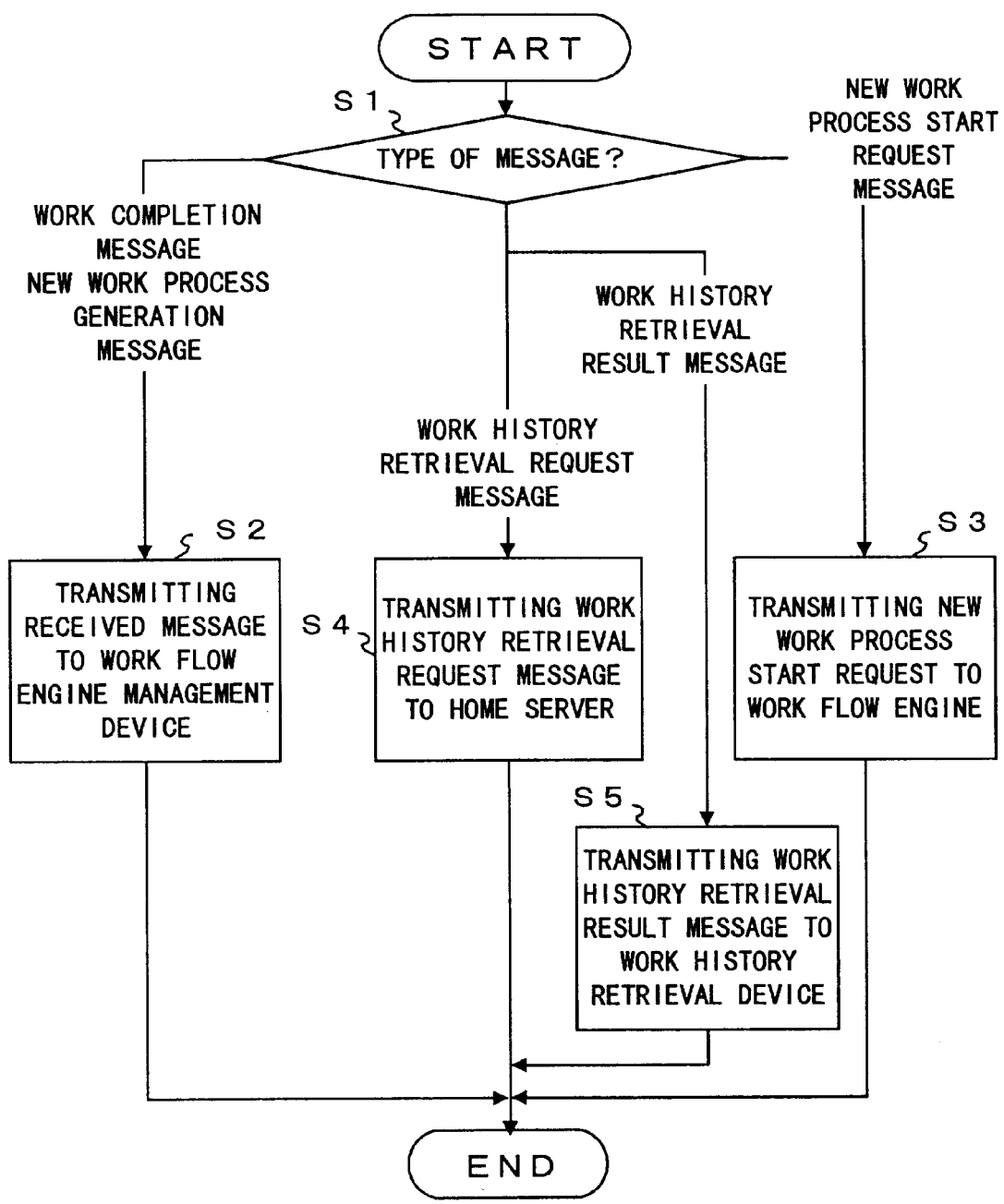
FIG. 57 is a flowchart showing communications management device for the work flow engine management device according to the second embodiment of the work flow management system of the present invention.

FIG. 57 is a flowchart of the process performed by the work flow engine management device communications management device 463' according to the second embodiment of the work flow management system of the present invention shown in FIG. 53. The process is described below by referring to FIG. 57.

First, the work flow engine management device communications management device determines the type of the received message (S1). When it determines as the determination in step S1 that the received message is a work completion message from the work flow engine or a new work process generation message from the home server, it performs the process in step S2. If the received message is a new work process start request message from the work flow engine management device, then the process in step S3 is performed. If the received message is a work history retrieval request message from the work history retrieval device, the process in step S4 is performed. If the received message is a work history retrieval result message from the home server, the process in step S5 is performed.

If the work flow engine management device communications management device determines as a determination result in step S1 that the received message is a work process completion message or a new work process generation message, then it transmits the message to the work flow engine management device (S2), and terminates the current process.

On the other hand, if the work flow engine management device communications management device determines as a determination result in step S1 that the received message is a new work process start request message, then it transmits the message to the work flow engine corresponding to the ID of the work flow engine in charge specified in this message (S3), and terminates the current process.

When the work flow engine management device communications management device determines as a determination result in step S1 that the received message is a work history retrieval request message, it transmits the message to the home server corresponding to the ID of the home server in charge specified in the message (S4), and terminates the current process.

If the work flow engine management device communications management device determines as a determination result in step S1 that the received message is a work history retrieval result message, then it transmits the message to the work history retrieval device (S5), and terminates the current process.

Described below is the process performed by each component of the home server shown in FIG. 54.

In FIG. 54, the processes performed by the user system generation device 303 and the connection management device 304 are similar to the processes performed by the respective devices according to the first embodiment of the home server shown in the flowcharts in FIGS. 37 and 38. Furthermore, the contents of the information stored in the work item management device 305 and the user information management table 306 are similar to the contents according to the first embodiment of the home server.

Figure 58:
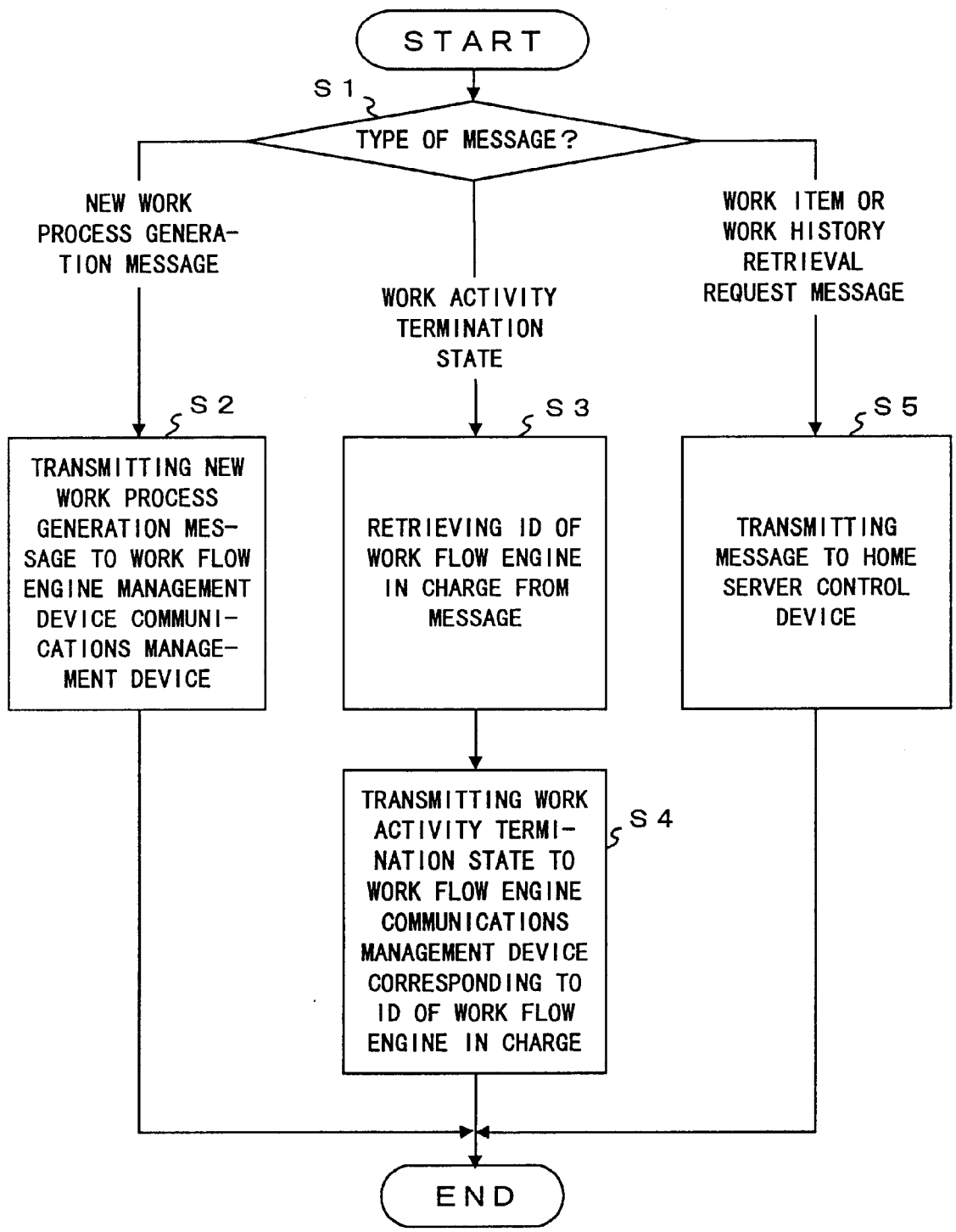
FIG. 58 is a flowchart showing the home server communications management device of the home server shown in FIG. 54.

FIG. 58 is a flowchart of the process performed by the home server communications management device 301 shown in FIG. 54. The process is described by referring to FIG. 58.

First, the home server communications management device determines the type of the received message (S1). If it determines that the received message is a new work process generation message from the home server control device, it performs the process in step S2. If the received message is the information about the work activity termination state from the home server control device, then the processes in and after step S3 are performed. If the received message is a work item generated by the work flow engine of the main server or a work history retrieval request message generated by the work history retrieval device, then the process in step S5 is performed.

When the home server communications management device determines as a determination result in step S1 that the received message is a new work process generation message, it transmits the message to the work flow engine management device communications management device (S2), and terminates the current process.

If the home server communications management device determines as a determination result in step S1 that the received message is the information about the work activity termination state, it retrieves the ID of the work flow engine in charge from the information about the work activity termination state (S3), transmits the received information about the work activity termination state to the work flow engine communications management device corresponding to the ID of the work flow engine in charge (S4), and terminates the current process.

If the home server communications management device determines as a determination result in step S1 that the received message is a work item or a work history retrieval request message, then it transmits the received message to the home server control device (S5), and terminates the current process.

Figure 59:
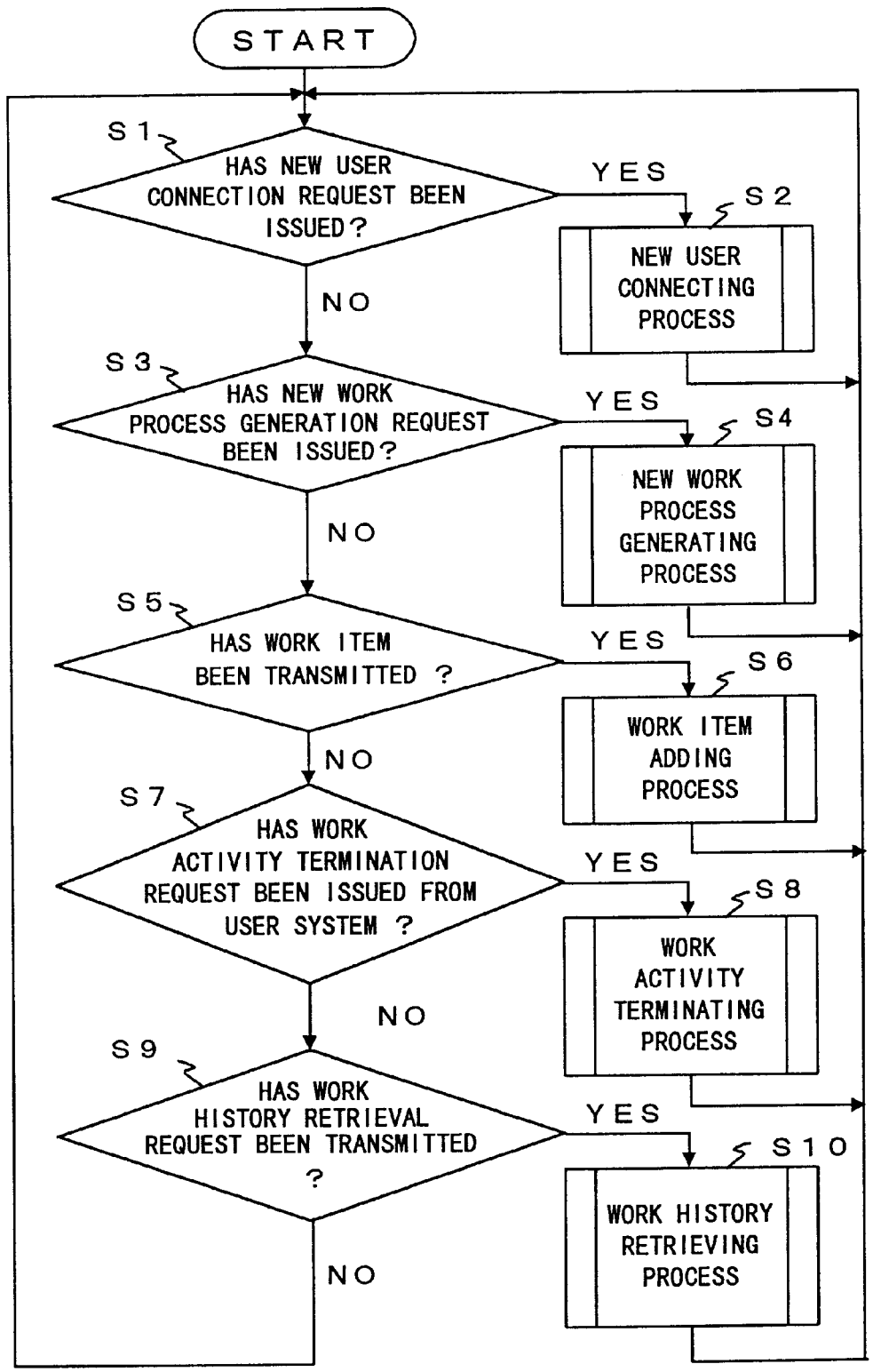
FIG. 59 is a flowchart showing the home server control device of the home server shown in FIG. 54.

FIG. 59 is a flowchart of the process performed by the home server control device 302 of the home server shown in FIG. 54. The process is described by referring to FIG. 59.

The home server control device determines the type of the received information (S1, S3, S5, S7, and S9). As a result of the determination, if a new user connection request has been issued from the user operating a user program, then a new user connecting process is performed (S2). If a new work process generation request has been issued from a user system, then a new work process generating process is performed (S4). If a work item generated by the work flow engine of the main server has been transmitted, then a work item adding process is performed (S6). If a work activity termination request has been transmitted from a user system, then a work activity terminating process (S8) is performed. If a work history retrieval request generated by the work history retrieval device has been transmitted, then a work history retrieving process is performed (S10). After terminating each of the processes, the process request type determining process is repeatedly performed on the subsequent information.

In the processes shown in FIG. 59, the new user connecting process (S2), the work process generating process (S4), and the work item adding process (S6) are similar to the processes performed by the home server control device according to the first embodiment of the home server used in the first embodiment of the work flow management system of the present invention shown in FIGS. 32, 33, and 34 respectively.

Figure 60:
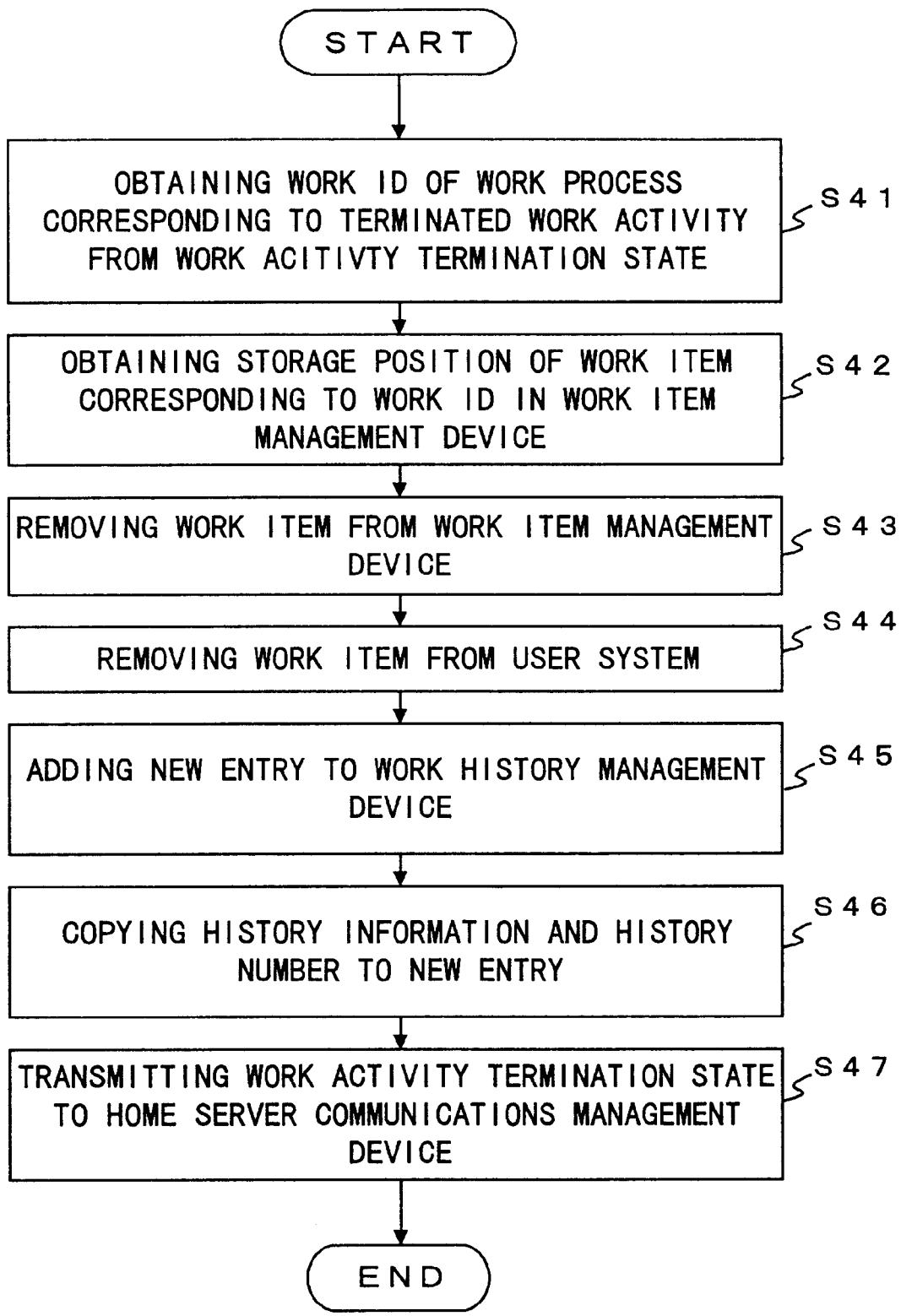
FIG. 60 is a flowchart of the work activity terminating process shown in FIG. 59.

FIG. 60 is a flowchart of the work activity terminating process performed by the home server control device 302 shown as the step S8 in FIG. 59. The process is described by referring to FIG. 60.

First, the home server control device obtains the work ID of the terminated work from the received information about the work activity termination state (S41), and obtains the storage position in the work item management device storing the work item corresponding to the work ID (S42).

Then, it removes the work item from the work item management device (S43), and removes the work item about the work activity from the user system which issued the work activity termination request (S44).

The home server control device then adds a new entry to the work history management device (S45), copies to the added entry the history information and the history number about the terminated work activity (S46), transmits the received work termination state to the home server communications management device (S47), and terminates the process.

FIG. 61 is a flowchart of the work history retrieving process performed by the home server control device 302 shown as the step S10 in FIG. 59. The process is described by referring to FIG. 61. The home server control device retrieves the work history information from the work history retrieval device using the user ID to be retrieved as a retrieval key, and returns the retrieval result to the main server (S51), and terminates the process.

The process relating to the present invention performed by both or either of the main server and the home server forming part of the work flow management system using the above described home server can also be performed by a common computer. To attain this, a program for directing a computer to perform the process performed by each of the components forming the above described main server and the home server is prepared, and the program is executed by the computer.

Figure 62:
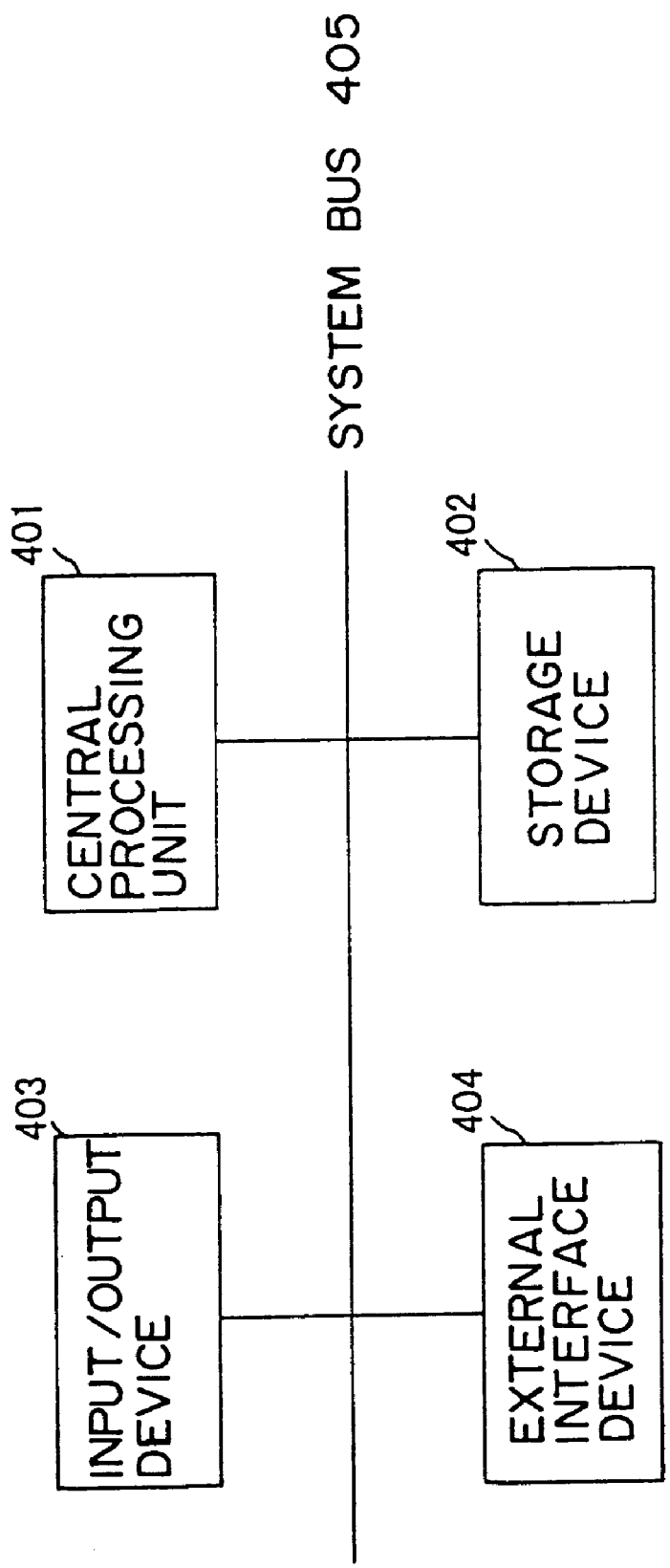
FIG. 62 shows an example of the internal configuration of a common computer.

FIG. 62 shows an example of the internal configuration of a common computer for performing a process relating to the above described present invention. The computer shown in FIG. 62 comprises a central processing unit 401 for controlling the entire operation of the computer based on the program; a storage device 402 such as semiconductor memory, a hard disk device, etc. for storing the program executed by the central processing unit 401 and the data obtained by the operation and process performed by the central processing unit 401; an input/output device 403 such as a keyboard through which a program and data processed by the central processing unit 401 is input, a storage medium reading device, a printer, a display, etc. for outputting the operation process result performed by the central processing unit 401; and an external interface device 404 for transmitting data to and from a device such as another computers etc. through a network. Each component can transmit data to and from another component through a system bus 405.

A program for performing a process by each component forming part of both or either of the above described main server and the home server using the computer as shown in FIG. 62 is stored in a computer-readable storage medium. The read program is stored in the storage device 402, and executed by the central processing unit 401.

Figure 63:
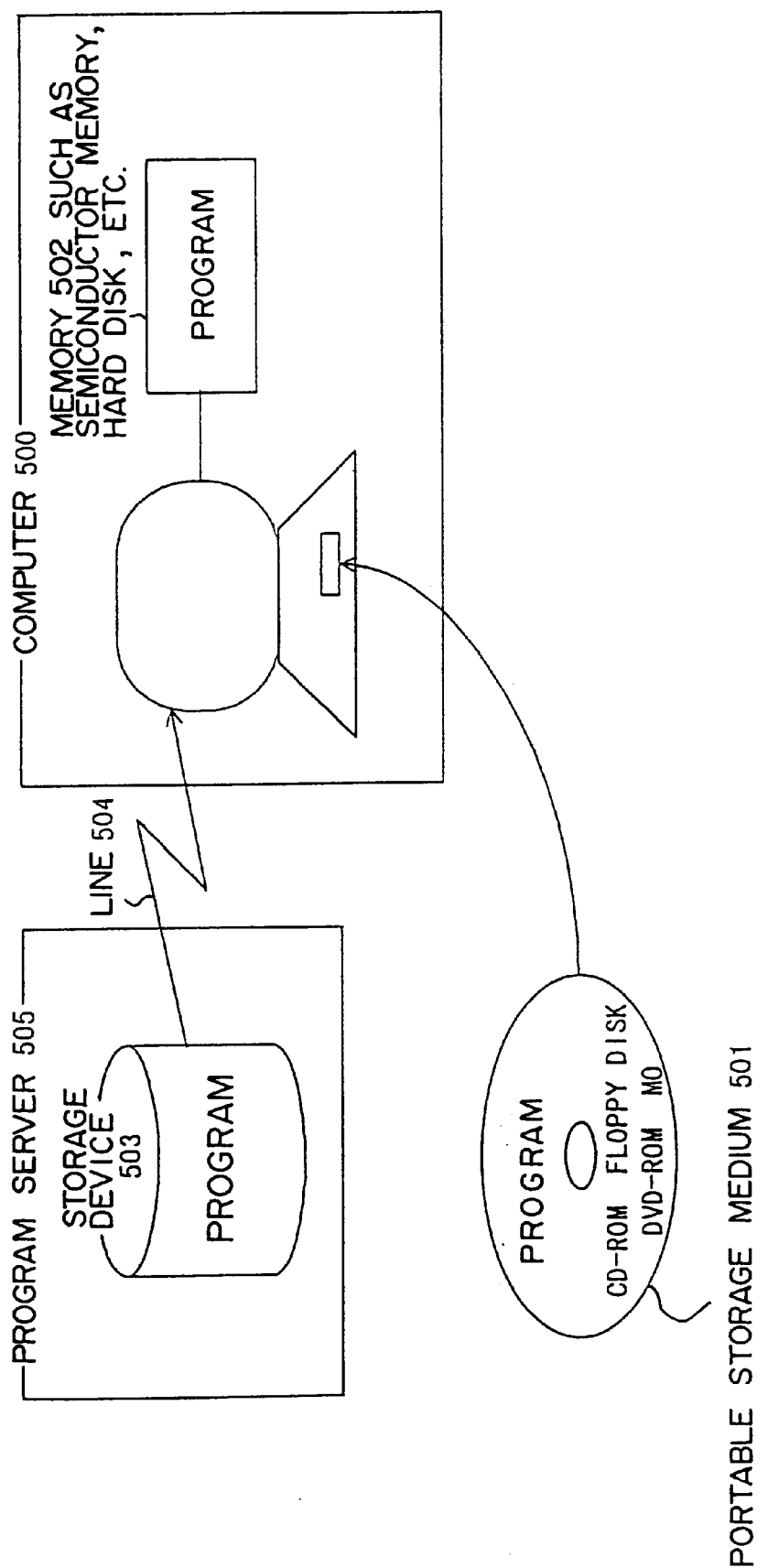
FIG. 63 shows an example of a computer-readable storage medium.

FIG. 63 shows an example of a computer-readable storage medium for storing the above described program. As shown in FIG. 63, an example of an applicable storage medium can be a portable storage medium 501 readable by a storage medium reading device in a computer 500 such as CD-ROM, DVD-ROM, a floppy disk, an MO (optical magnetic disk), etc.; memory 502 such as a semiconductor memory, a hard disk device, etc. in the computer 500; a storage device 503 provided in a program server 505 for transmitting a program to the computer 500 through a line 504, etc.

The above described work flow management program storage medium 74 according to the present invention shown in FIG. 8 can be a storage medium as shown as an example in FIG. 63 in addition to the example above. The program stored in the work flow management program storage medium 74 is read by a common computer as shown in the example in FIG. 62 and stored in the storage device 402. When the program is executed by the central processing unit 401, the processes performed by each component according to each embodiment of the work flow management apparatus of the present invention can be performed by a computer.

As described above in detail, according to the present invention, a work flow and work information can be transferred between work flow engines at a high speed. Therefore, the load of a work flow engine can be distributed, or work can be backed up or substituted quickly. As a result, access is not concentrated on a specific work flow engine with a large amount of work to be managed without lowering a transfer speed. Furthermore, since a backup work flow engine can be easily provided, a faulty work flow engine can be quickly switched to another work flow engine. As a result, a reliable work flow management apparatus can be realized.

Furthermore, according to the present invention, a work flow engine for managing the work activity after the next work activity can be predicted, and work information and a work flow can be transferred to the work flow engine at a high speed and can be processed by the work flow engine. Therefore, work can be efficiently performed.

Additionally, according to the present invention, a home server is provided between the main server having a work flow engine and the user system operated by a user. As a result, the user can provide a plurality of user systems for performing the work activities which the user takes charge of. Thus, the processes can be performed on the work activities by a plurality of users in parallel, thereby improving the efficiency of the entire work.

Then, the load of the work flow engine can be reduced by performing exclusive control of a work activity in processing the work activity by a plurality of users in parallel by a home server.

Furthermore, a response to a user when a new work process is generated can be quickly obtained by performing a slip issuing process by a home server when the new work process is generated.

Also in a home server, when the person in charge of a terminated work activity is the person in charge of the next work activity, the load of a transferring process on a work flow engine can be reduced by notifying the work flow engine of the main server that the next work activity should not be transferred. Furthermore, the wait time from the termination of a work activity by a user to the start of the next work activity can be shortened.

Additionally, the process load of the main server can be reduced by storing in a home server the history of the work activity performed by the user belonging to the home server and by processing the work history retrieving process by the home server.

What is claimed is:

1. A system having a main server and a home server, a user belonging only to the home server, for managing a series of operations according to a predefined work flow, and supporting a process of the series of operations performed by a plurality of users, said system comprising:

said main server to generate work information about a next operation after a current operation according to the work flow, work information about the current operation, and process information, which is not received directly from the user but only from said home server, about the operations performed by the user, and transfers work information about the next operation to the home server to which a user in charge of the next operation belongs, said home server to store the work information, which is generated only at said main server and which is transferred from said main server, provides the work information for each user in charge of the operation, and transmits process information about the operation only to said main server, wherein said home server does not generate and does not transfer the work information.

2. A system having a main server and home servers, users belonging only to the home servers, for managing a series of operations according to a predefined work flow, and supporting a process of the series of operations performed by a plurality of users, said system comprising:

a main server, said main server comprising
a work flow definition storage unit to store a definition of the work flow;
a first work information storage unit to store work information necessary to perform the series of operations;
a user information management unit to manage user information indicating a home server to which a user belongs; and
a work flow support unit to generate work information about a next operation in the work flow based on the work flow stored in said work flow definition storage unit, the work information stored in said first work information storage unit, and process information, which is not received directly from the user but only from said home server, about an operation performed by a user belonging only to the home server, and transferring work information about the next operation to a home server to which a user in charge of the next operation belongs according to the user information stored in said user information management unit; and a home server, said home server comprising
a second work information storage unit to store work information, which is generated only at said main server and which is transferred from said main server;
a work information providing unit to provide each user with work information, stored in said second work information storage unit, about an operation which the user takes charge of; and
a work process information transmission unit to transmit process information about the operation performed by the user only to the main server, wherein said home server does not comprise said workflow support unit which said main server comprises.

3. The system according to claim 2 wherein:
said main server comprises a plurality of said work flow support units;
each of said work flow support units comprises said work flow definition storage unit and said first work information storage unit; and
said main server further comprises a work flow support unit management unit to manage said work flow support unit such that process loads of said work flow support unit can be averaged.

4. The system according to claim 2 wherein:
a plurality of users can take charge of one of a series of operations in the work flow; and
said home server further comprises a work exclusive control unit to reject, after a user belonging to the home server starts the operation which the user takes charge, a start of the operation by another user in charge of the operation.

5. The system according to claim 2 wherein:
said home server further comprises a new work information providing unit to generate work information necessary to perform a first operation of the series of operations in the work flow at a request from a user belonging to the home server, and to provide the generated information for the user.

6. The system according to claim 2 wherein:
said home server further comprises:
a secondary work flow definition storage unit to store a definition of a work flow similar to the definition stored in said work flow definition storage unit in said main server;
a next operation detection unit to detect a user in charge of a next operation after an operation performed by a user belonging to the home server from the definition of the work flow stored in said secondary work flow definition storage unit, and instructing the main server to stop transferring the work information about the next operation when the user who performs the operation is the detected user in charge of the next operation, and
a work flow support unit of said main server stops transferring the work information about the next operation at an instruction to stop transferring the work information from said main server.

7. The system according to claim 2 wherein:
said main server further comprises:
a work history retrieval instruction unit to instruct said home server to which a specific user belongs to retrieve a history of the work performed by the specific user, and said home server comprises:

a work history management unit to manage the history of the operation performed by the user belonging to the home server; and a work history retrieval unit to retrieve the history of the operation performed by the specific user from the histories of the operations managed by said work history management unit.

8. A main server in a system having the main server and a home server, a user belonging only to the home server, for managing a series of operations based on a predefined work flow and supporting the process of the series of operations to be performed among a plurality of users wherein:

said main server generates work information about a next operation according to the work flow, the work information about the operations, and process information, which is not received directly from the user but only from the home server, about the operations performed by the user, and transfers the work information to a home server to which a user in charge of the next operation belongs, wherein the home server does not generate and does not transfer the work information.

9. A main server in a work flow management system having the main server and a home server, a user belonging only to the home server, for managing a series of operations based on a predefined work flow and supporting the process of the series of operations to be performed among a plurality of users, comprising:

a work flow definition storage unit to store a definition of the work flow;

a first work information storage unit to store work information necessary to perform the series of operations;

a user information management unit to manage user information indicating a home server to which a user belongs; and a work flow support unit to generate work information about a next operation in the work flow based on the work flow stored in said work flow definition storage unit, the work information stored in said first work information storage unit, and process information, which is not received directly from the user but only from the home server, about an operation performed by a user belonging to the home server, and transferring work information about the next operation to a home server to which a user in charge of the next operation belongs according to the user information stored in said user information management unit, wherein said home server does not comprise said workflow support unit which said main server comprises.

10. The main server according to claim 9 wherein:

said main server comprises a plurality of said work flow support units;

each of said work flow support units comprises said work flow definition storage unit and said first work information storage unit; and said main server further comprises a work flow support unit management unit to manage said work flow support unit such that process loads of said work flow support unit can be averaged.

11. A work flow management system comprising:

a main server; and a home server, a user belonging only to the home server, for managing a series of operations based on a pre-defined work flow and supporting the process of the series of operations to be performed among a plurality of users, wherein said home server stores work information, which is generated only at said main server and which is transferred from said main server, provides the work information for each user in charge of the operation, and transmits process information about the operation to said main server, wherein the process information is not received directly from the user but only from the home server, and said home server does not generate and does not transfer the work information.

12. A work flow management system comprising:

a main server; and a home server, a user belonging only to the home server, for managing a series of operations based on a pre-defined work flow and supporting the process of the series of operations to be performed among a plurality of users, said home server comprising a second work information storage unit to store work information required to perform the operations, the work information of which is generated at said main server and which is transferred from said main server;

a work information providing unit to provide each user with work information, stored in said second work information storage unit, about an operation which the user takes charge of; and a work process information transmission unit to transmit process information about the operation performed by the user, the process information not being received directly from the user but only from the home server, wherein said home server does not generate and does not transfer the work information.

13. A computer-readable storage medium storing a main server program for directing a computer to perform functions of a main server used in a work flow management system having the main server and a home server, a user belonging only to the home server, for managing a series of operations according to a predefined work flow, and supporting a process of the series of operations performed by a plurality of users wherein the main server program directs the computer to perform:

a work flow definition storing step for storing a definition of the work flow;

a work information storing step for storing work information necessary to perform the series of operations;

a user information managing step for managing user information indicating a home server to which a user belongs; and a work flow supporting step for generating work information about a next operation in the work flow based on a definition of the work flow, the work information, and process information, not received directly from the user but only from the home server, about an operation performed by a user belonging to the home server, and transferring work information, which is transmitted only from said home server, about the next operation to a home server to which a user in charge of the next operation belongs according to the user information, wherein the home server does not generate and does not transfer the work information.

14. A computer-readable storage medium storing a home server program for directing a computer to perform functions of a home server used in a work flow management system having a main server and the home server, a user belonging only to the home server, for managing a series of operations according to a predefined work flow, and supporting a process of the series of operations performed by a plurality of users wherein the home server program directs the computer to perform:

a work information storing step for storing work information required to perform the operations, the work information of which is generated at said main server and which is transferred from said main server;

a work information providing step for providing each user with work information about an operation which the user takes charge of; and a work process information transmitting step for transmitting process information, not received directly from the user but only from said home server, about the operation performed by the user to the main server, wherein said home server does not generate or transfer the work information.

15. A main server in a work flow management system having the main server and a home server, a user belonging only to the home server, for managing a series of operations based on a predefined work flow and supporting the process of the series of operations to be performed among a plurality of users, comprising:

work flow definition storage means for storing a definition of the work flow;

first work information storage means for storing work information necessary to perform the series of operations;

user information management means for managing user information indicating a home server to which a user belongs; and work flow support means for generating work information about a next operation in the work flow based on the work flow stored in said work flow definition storage means, the work information stored in said first work information storage means, and process information, which is not received directly from the user but only from the home server, about an operation performed by a user belonging to the home server, and transferring work information about the next operation to a home server to which a user in charge of the next operation belongs according to the user information stored in said user information management means, wherein the home server does not generate and does not transfer the work information.

16. A home server in a work flow management system having a main server and the home server, a user belonging only to the home server, for managing a series of operations based on a predefined work flow and supporting the process of the series of operations to be performed among a plurality of users, comprising:

second work information storage means for storing work information required to perform the operations, the work information of which is generated at said main server and which is and transferred from said main server;

work information providing means for providing each user with work information, stored in said second work information storage means, about an operation which the user takes charge of; and work process information transmission means for transmitting process information not received directly from the user but only from the home server about the operation performed by the user to the main server, wherein said home server does not generate and does not transfer the work information.

* * * * *